United States Patent
Tsubata

(10) Patent No.: US 8,471,972 B2
(45) Date of Patent: Jun. 25, 2013

(54) ACTIVE MATRIX SUBSTRATE, LIQUID CRYSTAL PANEL, LIQUID CRYSTAL DISPLAY DEVICE, LIQUID CRYSTAL DISPLAY UNIT, TELEVISION RECEIVER

(75) Inventor: Toshihide Tsubata, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 348 days.

(21) Appl. No.: 13/055,453

(22) PCT Filed: Jul. 9, 2009

(86) PCT No.: PCT/JP2009/062541
§ 371 (c)(1),
(2), (4) Date: Jan. 21, 2011

(87) PCT Pub. No.: WO2010/021210
PCT Pub. Date: Feb. 25, 2010

(65) Prior Publication Data
US 2011/0128455 A1    Jun. 2, 2011

(30) Foreign Application Priority Data

Aug. 18, 2008 (JP) ................................ 2008-209700

(51) Int. Cl.
G02F 1/1343  (2006.01)
(52) U.S. Cl.
USPC .............................. 349/39; 349/48; 349/144
(58) Field of Classification Search
USPC ........................................................ 349/48
See application file for complete search history.

(56) References Cited

U.S. PATENT DOCUMENTS 6,756,953 B1    6/2004  Tokioka et al.
7,692,730 B2 *  4/2010  Nakanishi et al. .............. 349/48
2006/0023137 A1  2/2006  Kamada et al.
2007/0040977 A1  2/2007  Kurosawa et al.
2008/0062340 A1  3/2008  Um et al.
2008/0252828 A1* 10/2008 Shin et al. ..................... 349/106
2009/0167739 A1  7/2009  Tsubata
2011/0134099 A1  6/2011  Tsubata

FOREIGN PATENT DOCUMENTS

| JP | 6-118909 A | 4/1994 |
| JP | 8-179341 A | 7/1996 |
| JP | 9-15641 A  | 1/1997 |
| JP | 2000-241798 A | 9/2000 |

(Continued)

OTHER PUBLICATIONS

Applicant brings the attention of the Examiner to the following pending U.S. Appl. No. 13/057,472 published as US2011-0134099A1 which is U.S. National stage of WO2010/024049.
International Search Report (ISR) issued in PCT/JP2009/062544 (International application of related U.S. Appl. No. 13/057,472 mentioned above) mailed in Oct. 2009 for Examiner consideration.

(Continued)

Primary Examiner — Richard Kim
(74) Attorney, Agent, or Firm — Chen Yoshimura LLP

(57) ABSTRACT

An active matrix substrate includes a data signal line (15x), a storage capacity wiring (18x), scan signal lines (16a, 16b), a transistor (12a) connected to the data signal line (15x) and the scan signal line (16a), a transistor (12b) connected to the storage capacity wiring (18x) and the scan signal line (16b), and pixel electrodes (17 a, 17b) formed in a pixel (101) area. The pixel electrode (17a) is connected to the data signal line (15x) through the transistor (12a), and the pixel electrode (17b) is connected to the pixel electrode (17a) through a capacitor (C101) and connected to the storage capacity wiring (18x) through the transistor (12b).

56 Claims, 57 Drawing Sheets

FOREIGN PATENT DOCUMENTS

| | | |
|---|---|---|
| JP | 2001-281628 A | 10/2001 |
| JP | 2002-297100 A | 10/2002 |
| JP | 2006-39290 A | 2/2006 |
| JP | 2006-330201 A | 12/2006 |
| JP | 2008-65333 A | 3/2008 |
| WO | 2008/015813 A1 | 2/2008 |
| WO | 2010/024049 A1 | 3/2010 |

OTHER PUBLICATIONS

International Search Report (ISR) issued in PCT/JP2009/062541 (International application) mailed in Sep. 2009 for Examiner consideration.

* cited by examiner

Liquid crystal panel

ACTIVE MATRIX SUBSTRATE, LIQUID CRYSTAL PANEL, LIQUID CRYSTAL DISPLAY DEVICE, LIQUID CRYSTAL DISPLAY UNIT, TELEVISION RECEIVER

BACKGROUND OF THE INVENTION

1. Technical Field

The present invention relates to an active matrix substrate provided with a plurality of pixel electrodes in one pixel area and to a liquid crystal display device using such an active matrix substrate (pixel division system).

2. Background Art

In order to improve the viewing angle dependency of a gamma characteristic of a liquid crystal display device (for example, to control whitening problems of a screen), a liquid crystal display device that controls a plurality of subpixels provided in one pixel at different brightness to display a halftone by area gradation of the subpixels (pixel division system; see Patent Document 1, for example) has been proposed.

In an active matrix substrate described in Patent Document 1, as shown in FIG. 55, a pixel area is established between two adjacent gate bus lines 112; a pixel electrode 121a is arranged at an upper edge of the pixel area (a section adjacent to the gate bus line); a pixel electrode 121b is arranged in the middle thereof; a pixel electrode 121c is arranged at a lower edge thereof (a section adjacent to the next gate bus line); the pixel electrodes 121a, 121c are connected to a source-lead-out wiring 119 led out from a source electrode 116s of a transistor 116; a control electrode 118 connected to the source-lead-out wiring 119 overlaps the pixel electrode 121b via an insulating layer; and the middle pixel electrode 121b is capacitively coupled to the pixel electrodes 121a, 121c, respectively (capacitance coupling type pixel division system). In a liquid crystal display device using the above-mentioned active matrix substrate, each of subpixels corresponding to the pixel electrodes 121a, 121c can be designated as a bright subpixel, while a subpixel corresponding to the pixel electrode 121b can be designated as a dark subpixel. As a result, it becomes possible to display a halftone by area gradation of the aforementioned two bright subpixels and one dark subpixel. Here, as in the case of the pixel electrode 121b, a pixel electrode that is connected to (capacitively coupled to) pixel electrodes into which normal pixel data is written (in this example, the pixel electrodes 121a, 121c) and that becomes floating during normal writing is referred to as "pixel electrode in floating state" or "capacitance coupling electrode" in the present specification.

In the above-described liquid crystal display device using the capacitance coupling type pixel division system, it is known that a burn-in occurs at the subpixels including the pixel electrode 121b due to electric charges accumulated in the pixel electrode 121b that is capacitively coupled. This burn-in becomes particularly apparent when the pixel electrode 121b is arranged in the floating state.

Specifically, as shown in FIG. 56, a pixel electrode 61b is directly connected to a source line 55 via a transistor 56, and as the transistor 56 is turned on in every frame, the pixel electrode 61b and a data bus line 55 are electrically connected. Therefore, an electric charge accumulated in the pixel electrode 61b while the transistor 56 is off flows to the source line 55 when the transistor 56 is on. As a result, direct current voltage components rarely remain in the pixel electrode 61b, thereby making it unlikely that the burn-in occurs therein. On the other hand, in the pixel electrode 61a that is capacitively coupled to the pixel electrode 61b, an electric charge accumulated in the pixel electrode 61a remains even when the transistor 56 is turned on. Therefore, direct current voltage components remain in the pixel electrode 61a, which causes the burn-in to occur in the subpixels including the pixel electrode 61a.

As a method to solve this burn-in issue, Patent Document 1 discloses a configuration of an active matrix substrate that supplies a Cs potential to a capacitively-coupled pixel electrode in floating state via a transistor connected to the gate line in the previous row. Specifically, as shown in FIG. 57, a pixel electrode 121b, which is in floating state and is capacitively coupled to a pixel electrode 121a, is connected to an auxiliary capacitance bus line 113 via a transistor 421 connected to the gate line of the previous row 112 (n−1). According to this configuration, transistors 421, 422 are turned on before a display voltage is applied to the subpixel electrodes 121a, 121c and to a control electrode 118 via a transistor 116, and the potential of the pixel electrodes 121a, 121c that are connected to the pixel electrode 121b and the transistor 116 becomes the same as the potential of the auxiliary capacitance bus line 113. Therefore, the electric charge accumulated in the pixel electrode 121b flows to the auxiliary capacitance bus line 113. As a result, it becomes possible to suppress the accumulation of electric charge in the pixel electrode in floating state, thereby preventing the occurrence of burn-in in the subpixels including the aforementioned pixel electrode.

PRIOR ART DOCUMENTS

Patent Documents

Patent Document 1: Japanese Patent Application Laid-Open Publication No. 2006-39290 (published Feb. 9, 2006)

SUMMARY OF THE INVENTION

Problems to be Solved by the Invention

However, according to the configuration disclosed in Patent Document 1, a problem has been known that the workload of gate lines becomes heavy because each of the gate lines is shared between normal writing into a pixel electrode and discharging (refreshing) electric charge from a capacitively-coupled pixel electrode. Therefore, when the above-described configuration is applied to a liquid crystal display device that supports recent large-scale, high-definition feature or double-speed drive feature, negative influences on writing operation are anticipated, which may lead to the deterioration of display quality as a result.

The present invention proposes configurations according to which the occurrence of burn-in in subpixels can be reduced in a liquid crystal display device that uses a capacitance coupling type pixel division system and supports a large-scale, high-definition feature or double-speed drive feature.

Means of Solving the Problems

The present active matrix substrate includes a data signal line, a storage capacitance wiring, first and second scan signal lines, a first transistor connected to the data signal line and the first scan signal line, a second transistor connected to the storage capacitance wiring and the second scan signal line, and first and second pixel electrodes formed in one pixel area. The first pixel electrode is connected to the data signal line via the first transistor, while the second pixel electrode is connected to the first pixel electrode via a capacitance and also to the storage capacitance wiring via the second transistor.

In a liquid crystal display device using the present active matrix substrate, the respective pixel electrodes in one pixel area is connected to the data signal line and the storage capacitance line, respectively, via respective transistors that are connected to different scan signal lines. Therefore, it is possible to supply a signal potential to each of the pixel electrodes at different timings. Therefore, for example, before a signal potential for normal writing is supplied to one of pixel electrodes (first pixel electrode), a Cs potential (Vcom, for example) can be supplied to the other thereof (second pixel electrode) that is capacitively coupled to the first pixel electrode by electrically connecting the second pixel electrode to the storage capacitance wiring via a transistor.

As described above, prior to normal writing, it is possible to supply, without going through a capacitance, a Cs potential from a storage capacitance wiring to the pixel electrode (capacitance coupling electrode) that is capacitively coupled to a pixel electrode connected to a data signal line via a transistor, which then allows discharging (refreshing) of the electric charge accumulated in the pixel electrode that is capacitively coupled to the data signal line. As a result, the occurrence of burn-in in subpixels including the above-mentioned pixel electrode can be reduced. Additionally, unlike a conventional configuration, scan signal lines are not shared for writing of normal signals into a pixel electrode and for discharging (refreshing) of accumulated electric charges from a capacitively-coupled pixel electrode. Instead, scan signal lines are individually provided for the respective pixel electrodes. As a result, the workload of the scan signal lines is reduced, thereby allowing an application to a liquid crystal display device that supports large-scale, high-definition feature and/or double speed drive feature.

The present active matrix substrate may also be configured to have an additional third pixel electrode formed in the pixel area and electrically connected to the first pixel electrode.

The present active matrix substrate may also be configured to have an additional third pixel electrode formed in the pixel area, which is connected to the first pixel electrode via a capacitance and also is electrically connected to the second pixel electrode.

The present active matrix substrate may also be configured to have an additional third transistor connected to the second scan signal line, with the first pixel electrode being further connected to the storage capacitance wiring via the third transistor.

The present active matrix substrate may also be configured to have an additional third transistor connected to the second scan signal line, with the third pixel electrode being further connected to the storage capacitance wiring via the third transistor.

The present active matrix substrate may also be configured to have an additional third transistor connected to the second scan signal line, with the first pixel electrode being further connected to the storage capacitance wiring via the third transistor.

The present active matrix substrate may also be configured such that the second transistor is formed so that each of conductive electrodes thereof does not overlap the second scan signal line.

The present active matrix substrate may also be configured such that the second and third transistors are formed so that each of conductive electrodes thereof does not overlap the second scan signal line.

The present active matrix substrate may also be configured such that the storage capacitance wiring forms a storage capacitance with the first pixel electrode.

The present active matrix substrate may also be configured such that the storage capacitance wiring further forms a storage capacitance with the second pixel electrode.

The present active matrix substrate may also be configured to have a storage capacitance electrode formed in the same layer as conductive electrodes of the first and second transistors. The storage capacitance electrode may be electrically connected to the first pixel electrode and also may overlap the storage capacitance wiring via a gate insulating film.

The present active matrix substrate may also be configured to have a coupling capacitance electrode formed in the same layer as conductive electrodes of the first and second transistors. The coupling capacitance electrode may be electrically connected to the first pixel electrode, may overlap the second pixel electrode via an interlayer insulating film, and also may overlap the storage capacitance wiring via a gate insulating film.

The present active matrix substrate may also be configured such that the pixel area is divided into two sections by the storage capacitance wiring crossing the pixel area; that the first pixel electrode is arranged at one section of the divided pixel area and the third pixel electrode is arranged at the other section thereof; and that the second pixel electrode is arranged between the first and third pixel electrodes.

The present active matrix substrate may also be configured such that the pixel area is divided into two sections by the storage capacitance wiring crossing the pixel area; that the second pixel electrode is arranged at one section of the divided pixel area and the third pixel electrode is arranged at the other section thereof; and that the first pixel electrode is arranged between the second and third pixel electrodes.

The present active matrix substrate may also be configured such that the first through third pixel electrodes are arranged such that at least a portion of the first pixel electrode is adjacent to the first scan signal line; that at least a portion of the third pixel electrode is adjacent to the second scan signal line; and that at least one edge of the second pixel electrode is adjacent to the first scan signal line while the other edge thereof is adjacent to the second scan signal line.

The present active matrix substrate may also be configured such that the first through third pixel electrodes are arranged such that at least a portion of the second pixel electrode is adjacent to the first scan signal line; that at least a portion of the third pixel electrode is adjacent to the second scan signal line; and that at least one edge of the first pixel electrode is adjacent to the first scan signal line while the other edge thereof is adjacent to the second scan signal line.

The present active matrix substrate may also be configured such that the active matrix substrate includes a coupling capacitance electrode that overlaps the second pixel electrode via an interlayer insulating film; that a first lead-out wiring led out from a conductive electrode of the first transistor is connected to the coupling capacitance electrode within the same layer; that the first lead-out wiring is connected to the first pixel electrode via a contact hole; that a second lead-out wiring led out from one conductive electrode of the second transistor is connected to the storage capacitance wiring via a contact hole; and that a third lead-out wiring led out from the other conductive electrode of the second transistor is connected to the second pixel electrode via a contact hole.

The present active matrix substrate may also be configured such that the active matrix substrate includes a coupling capacitance electrode that overlaps the second pixel electrode via an interlayer insulating film; that a first lead-out wiring led out from a conductive electrode of the first transistor is connected to the coupling capacitance electrode within the same layer; that the first lead-out wiring is connected to the first pixel electrode via a contact hole; that a second lead-out wiring led out from one conductive electrode of the second transistor is connected to the storage capacitance wiring via a contact hole; that a third lead-out wiring led out from the other conductive electrode of the second transistor is connected to the second pixel electrode via a contact hole; and that an extended coupling capacitance electrode connected to the coupling capacitance electrode is connected to the third pixel electrode via a contact hole.

The present active matrix substrate may also be configured such that the active matrix substrate includes a coupling capacitance electrode that overlaps the second pixel electrode via an interlayer insulating film; that a first lead-out wiring led out from a conductive electrode of the first transistor is connected to the coupling capacitance electrode within the same layer; that the first lead-out wiring is connected to the first pixel electrode via a contact hole; that a second lead-out wiring led out from one conductive electrode of the second transistor is connected to the storage capacitance wiring via a contact hole; that a third lead-out wiring led out from the other conductive electrode of the second transistor is connected to the second pixel electrode via a contact hole; and that the third lead-out wiring is connected to the third pixel electrode via a contact hole.

The present active matrix substrate may also be configured such that the active matrix substrate includes a coupling capacitance electrode that overlaps the second pixel electrode via an interlayer insulating film; that a first lead-out wiring led out from a conductive electrode of the first transistor is connected to the coupling capacitance electrode within the same layer; that the first lead-out wiring is connected to the first pixel electrode via a contact hole; that a second lead-out wiring led out from one conductive electrode of the second transistor is connected to the storage capacitance wiring via a contact hole; that a third lead-out wiring led out from the other conductive electrode of the second transistor is connected to the second pixel electrode via a contact hole; and that a fourth lead-out wiring led out from a conductive electrode of the third transistor is connected to the first pixel electrode via a contact hole.

The present active matrix substrate may also be configured such that the active matrix substrate includes a coupling capacitance electrode that overlaps the second pixel electrode via an interlayer insulating film; that a first lead-out wiring led out from a conductive electrode of the first transistor, a fourth lead-out wiring led out from a conductive electrode of the third transistor, and the coupling capacitance electrode are connected within the same layer; that the first lead-out wiring is connected to the first pixel electrode via a contact hole; that the fourth lead-out wiring is connected to the third pixel electrode via a contact hole; that a second lead-out wiring led out from one conductive electrode of the second transistor is connected to the storage capacitance wiring via a contact hole; and that a third lead-out wiring led out from the other conductive electrode of the second transistor is connected to the second pixel electrode via a contact hole.

The present active matrix substrate may also be configured such that the active matrix substrate includes a coupling capacitance electrode that overlaps the second pixel electrode via an interlayer insulating film; that a first lead-out wiring led out from a conductive electrode of the first transistor is connected to the coupling capacitance electrode within the same layer; that the first lead-out wiring is connected to the first pixel electrode via a contact hole; that a second lead-out wiring led out from one conductive electrode of the second transistor is connected to the storage capacitance wiring via a contact hole; that a third lead-out wiring led out from the other conductive electrode of the second transistor is connected to the second pixel electrode via a contact hole; that the third lead-out wiring is connected to the third pixel electrode via a contact hole; and that a fourth lead-out wiring led out from a conductive electrode of the third transistor is connected to the first pixel electrode via a contact hole.

The present active matrix substrate may also be configured such that the second lead-out wiring overlaps the second pixel electrode via an interlayer insulating film, and that at least a portion of the interlayer insulating film is thinned.

The present active matrix substrate may also be configured such that at least a portion of a section of the interlayer insulating film overlapping the coupling capacitance electrode is thinned.

The present active matrix substrate may also be configured such that at least a portion of a section of the gate insulating film overlapping the storage capacitance electrode is thinned.

The present active matrix substrate may also be configured such that the interlayer insulating film is composed of an inorganic insulating film and an organic insulating film, and that the organic insulating film is removed from at least a portion of a section of the interlayer insulating film overlapping the coupling capacitance electrode.

The present active matrix substrate may also be configured such that the gate insulating film is composed of an inorganic insulating film and of an organic insulating film, and that the organic insulating film is removed from at least a portion of a section of the gate insulating film overlapping the storage capacitance electrode.

The present active matrix substrate may also be configured such that the organic insulating film may contain at least one of acrylic resin, epoxy resin, polyimide resin, polyurethane resin, novolak resin, and siloxane resin.

The present active matrix substrate may also be configured such that when the active matrix substrate is applied to a liquid crystal display device, subpixels including the first pixel electrode function as bright subpixels, while subpixels including the second pixel electrode function as dark subpixels.

The present active matrix substrate may also be configured such that when the active matrix substrate is applied to a liquid crystal display device, subpixels including the first and third pixel electrodes function as bright subpixels, while subpixels including the second pixel electrode function as dark subpixels.

The present active matrix substrate may also be configured such that when the active matrix substrate is applied to a liquid crystal display device, subpixels including the first pixel electrode function as bright subpixels, while subpixels including the second and third pixel electrodes function as dark subpixels.

The present active matrix substrate may also be configured such that the above-mentioned storage capacitance wiring includes an extended storage capacitance wiring branching off from the storage capacitance wiring, and that, as viewed in a plane, the extended storage capacitance wiring is disposed so as to overlap a portion of an edge of the second pixel electrode or to extend along the outer side thereof.

The present active matrix substrate may also be configured such that the above-mentioned storage capacitance wiring includes an extended storage capacitance wiring branching off from the storage capacitance wiring, and that, as viewed in a plane, the extended storage capacitance wiring is disposed so as to overlap a portion of an edge of the second and third pixel electrodes or to extend along the outer side thereof.

The present active matrix substrate may also be configured such that the extended storage capacitance wiring is composed of a first extension formed in the same layer as the storage capacitance wiring and a second extension, which is connected to the first extension via a contact hole and to an lead-out wiring led out from one conductive electrode of the second transistor.

The present active matrix substrate may also be configured such that a storage capacitance is formed between at least one of the first and second pixel electrodes provided in the pixel area in the current row and at least one of the first and second scan signal lines that correspond to the pixel area in the previous row.

The present active matrix substrate may also be configured such that when an extension direction of scan signal lines is regarded as the row direction, two scan signal lines correspond to two pixel areas aligned in the row direction; two pixel electrodes are aligned in the column direction in each of the pixel areas; a transistor that is connected to one of the two pixel electrodes adjacent in the row direction is connected to one of the two scan signal lines; and a transistor that is connected to the other of these two pixel electrodes is connected to the other of the two scan signal lines.

The present liquid crystal display device includes one of the above-described active matrix substrates and is configured such that the second scan signal line is selected at least once during display.

The present liquid crystal display device may also be configured such that when the second transistor is turned off, a common electrode potential is supplied to the storage capacitance wiring.

The present liquid crystal display device may also be configured such that when the second transistor is turned off, the first transistor stays on; or such that when the second transistor is turned off, the first transistor is turned off at the same time.

The present liquid crystal display device may also be configured such that when the second transistor is turned off, the potentials of the first and second pixel electrodes substantially become a common electrode potential.

The present liquid crystal display device may also be configured such that a first gate-on pulse signal supplied to the first scan signal line and a second gate-on pulse signal supplied to the second scan signal line become active during the same horizontal scanning period; that the pulse width of the second gate-on pulse signal is shorter than that of the first gate-on pulse signal; and that the second gate-on pulse signal becomes inactive before the first gate-on pulse signal becomes inactive.

The present liquid crystal display device may also be configured such that a first gate-on pulse signal supplied to the first scan signal line and a second gate-on pulse signal supplied to the second scan signal line become active during the horizontal scanning period immediately prior to a period during which a signal potential of a data signal to be displayed is supplied to the first pixel electrode; and that the second gate-on pulse signal becomes inactive while the first gate-on pulse signal is active.

The present liquid crystal display device may also be configured such that a second gate-on pulse signal supplied to the second scan signal line becomes active two or more horizontal scanning periods prior to a period during which a signal potential of a data signal to be displayed is supplied to the first pixel electrode; and that the second gate-on pulse signal remains inactive while a first gate-on pulse signal supplied to the first scan signal line is active.

The present liquid crystal display device may also be configured such that a second gate-on pulse signal supplied to the second scan signal line becomes active two or more horizontal scanning periods prior to a period during which a signal potential of a data signal to be displayed is supplied to the first pixel electrode; and that the second gate-on pulse signal remains inactive when a first gate-on pulse signal supplied to the first scan signal line becomes active.

The present liquid crystal display device may also be configured such that a common electrode potential is supplied to all pixel electrodes of one pixel area at least twice in each frame.

The present liquid crystal display device may also be configured such that in each frame, a common electrode potential is supplied to all pixel electrodes of one pixel area at least twice after two-thirds of a frame period has passed after a signal potential of a data signal to be displayed is supplied to the first pixel electrode.

The present liquid crystal display device may also be configured such that the polarity of a signal potential of a data signal to be supplied to each data signal line is reversed every horizontal scanning period; that when the polarity of the signal potential of the data signal is reversed, a supply of the data signals to each data signal line is terminated for a predetermined period, and each data signal line short-circuits to each other; and that the first and second transistors remain in the ON state during the above-mentioned predetermined period of time.

The present liquid crystal display device may also be configured such that the liquid crystal display device includes a scan signal line drive circuit that drives each of scan signal lines; and that first and second gate-on pulse signals to be supplied respectively to the first and second scan signal lines are generated using an output from a single stage of a shift register included in the above-mentioned scan signal line drive circuit.

The present liquid crystal display device may also be configured such that the scan signal line drive circuit includes the above-mentioned shift register, a plurality of logic circuits arranged in the column direction, and an output circuit, and that the pulse widths of the first and second gate-on pulse signals outputted from the output circuit are determined based on an output of the shift register and an output control signal that controls the output of the scan signal line drive circuit, both of which are inputted to the logic circuit.

The present liquid crystal display device may also be configured such that the polarity of a signal potential supplied to the first pixel electrode is reversed every frame.

The present liquid crystal display device may also be configured such that the polarity of a signal potential supplied to the first data signal line is reversed every horizontal scanning period.

The present liquid crystal display device may also be configured such that signal potentials having reversed polarities are supplied to a first data signal line and to a data signal line adjacent thereto, respectively, during each horizontal scanning period.

The present liquid crystal panel includes the above-described active matrix substrate. The present liquid crystal display unit includes the above-mentioned liquid crystal panel and a driver. The present liquid crystal display device includes the above-mentioned liquid crystal display unit and a light source device. The present television receiver includes the above-mentioned liquid crystal display device and also a tuner that receives television broadcasting.

Effects of the Invention

As described above, a liquid crystal display device using the present active matrix substrate is capable of discharging (refreshing) accumulated electric charges from a pixel electrode that is capacitively coupled to a pixel electrode connected to a data signal line via a transistor, thereby preventing the occurrence of burn-in in subpixels including the aforementioned pixel electrode. Therefore, it becomes possible to reduce the occurrence of burn-in in subpixels even for a liquid crystal display device that supports the large-scale, high-definition feature and/or the double-speed drive feature.

BRIEF DESCRIPTION OF THE DRAWINGS

FIG. 1 is a circuit diagram showing a configuration of a liquid crystal panel 5a.

FIG. 3 is a plan view showing another configuration of a liquid crystal panel 5a.

FIG. 58 is a plan view showing another configuration of a liquid crystal panel 5a.

DETAILED DESCRIPTION OF EMBODIMENTS

Figure 1:
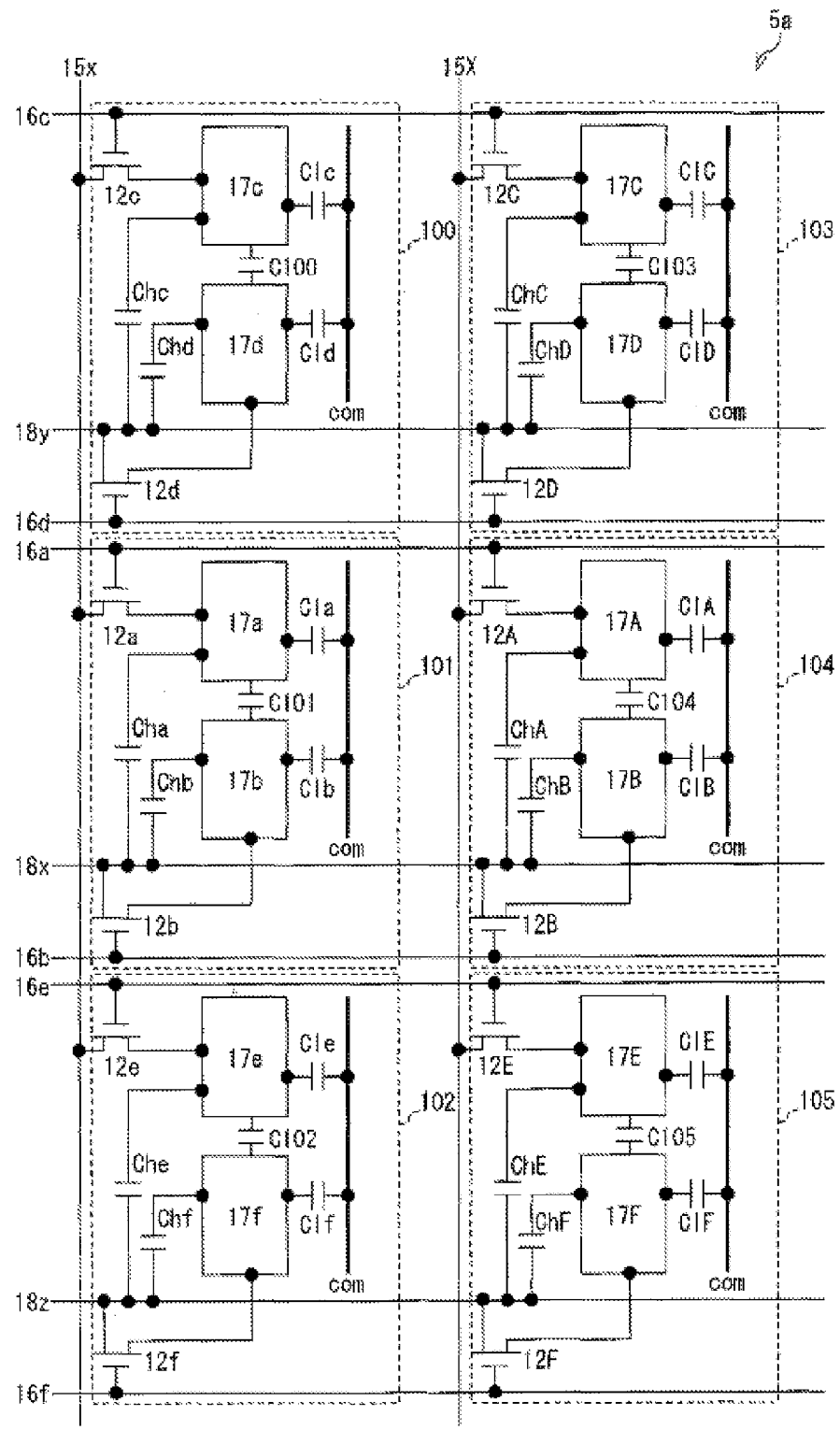

Preferred embodiments of the present invention are described using drawings as follows. For convenience of description, the extension direction of scan signal lines is referred to as the row direction in the following. Needless to say, however, the scan signal lines may be extended in either horizontal or vertical direction when a liquid crystal display device (or a liquid crystal panel or an active matrix substrate used therein) of the present invention is in use (viewed). Also, the channel characteristics (n-type, p-type) of transistors should not be limited to what is described in the following embodiments.

A liquid crystal panel of the present invention has structures in which in each of the pixels configured to include capacitively-coupled pixel electrodes, there are provided a scan signal line for normal writing of pixel data, a separate scan signal line for discharging electric charge, and transistors respectively provided for the corresponding scan signal line. As examples of configurations of the present liquid crystal panel, there are provided a first embodiment in which two transistors are formed in one pixel area, and a second embodiment in which three transistors are formed in one pixel area. For convenience of description, the same reference characters are given to components having the same functions in the both embodiments, and terms defined in the first embodiment are used in the second embodiment according to the same definition thereof unless otherwise noted.

First Embodiment

FIG. 1 is an equivalent circuit diagram showing a portion of a liquid crystal panel of a first embodiment. As shown in FIG. 1, a liquid crystal panel 5a includes data signal lines (15x, 15X) extending in the column direction (the up-down direction in the diagram); scan signal lines (16a to 16f) extending in the row direction (the left-right direction in the diagram); pixels (100 to 105) aligned in both row and column directions; storage capacitance wirings (18x to 18z); and a common electrode (an opposite electrode) "com." Each pixel has an identical configuration. Also, a pixel column containing the pixels 100 to 102 and a pixel column containing the pixels 103 to 105 are aligned adjacently.

In the liquid crystal panel 5a, one data signal line and two scan signal lines are provided in one pixel. Two pixel electrodes 17c, 17d provided in the pixel 100, two pixel electrodes 17a, 17b provided in the pixel 101, and two pixel electrodes 17e, 17f provided in the pixel 102 are aligned in one column. Two pixel electrodes 17C, 17D provided in the pixel 103, two pixel electrodes 17A, 17B provided in the pixel 104, and two pixel electrodes 17E, 17F provided in the pixel 105 are aligned in one column. The pixel electrodes 17c, 17C, the pixel electrodes 17d, 17D, the pixel electrodes 17a, 17A, the pixel electrodes 17b, 17B, the pixel electrodes 17e, 17E, and the pixel electrodes 17f, 17F are aligned adjacently to each other in the row direction, respectively.

Because each pixel has an identical configuration, the following mainly describes the configuration of the pixel 101 as an example.

In the pixel 101, the pixel electrodes 17a, 17b (first and second pixel electrodes) are connected to each other via a coupling capacitance C101; the pixel electrode 17a is connected to the data signal line 15x via a transistor 12a (first transistor) connected to a scan signal line 16a (first scan signal line); the pixel electrode 17b is connected to a storage capacitance wiring 18x via a transistor 12b (second transistor) connected to a scan signal line 16b (second scan signal line); a storage capacitance Cha is formed between the pixel electrode 17a and the storage capacitance wiring 18x; a storage capacitance Chb is formed between the pixel electrode 17b and the storage capacitance wiring 18x; a liquid crystal capacitance Cla is formed between the pixel electrode 17a and a common electrode "com"; and a liquid crystal capacitance Clb is formed between the pixel electrode 17b and the common electrode "com."

According to the above-described configuration, the pixel electrode 17b is capacitively coupled to the pixel electrode 17a into which a normal signal potential is written. Therefore, the potential of the pixel electrode 17b after the transistor 12a is turned off is determined by $Va \times (C\alpha/(C\alpha+Co))$ where the capacitance values are set as $Cla=Clb=Cl$, $Cha=Chb=Ch$, and $Co=Cl+Ch$, respectively; the capacitance value of C101 is $C\alpha$, and the potential at the pixel electrode 17a after the transistor 12a is turned off as Va. Thus, the subpixel including the pixel electrode 17a is a bright subpixel (hereinafter referred to as "bright") and the subpixel including the pixel electrode 17b is a dark subpixels (hereinafter referred to as "dark"). As a result, a liquid crystal display device using a pixel division system can be realized.

Also, in the liquid crystal display device using the pixel division system and including the above-mentioned liquid crystal panel 5a, each of the pixel electrodes 17a, 17b in a pixel area of the pixel 101 is connected to the data signal line 15x and the storage capacitance wiring 18x, respectively, via the transistors 12a, 12b, respectively, which are connected to the different scan signal lines 16a, 16b, respectively. Therefore, it is possible to directly supply an identical or different signal potential to each of the pixel electrodes 17a, 17b via the transistors 12a, 12b, respectively. In other words, it is possible to supply a signal potential to the pixel electrode 17b (hereinafter also referred to as a capacitance coupling electrode), which is capacitively coupled to the pixel electrode 17a that is connected to the data signal line 15x via the transistor 12a, from the storage capacitance wiring 18x without going through a capacitance. Also, the transistors 12a, 12b, which are connected to the pixel electrodes 17a, 17b, respectively, is connected to the different scan signal lines 16a, 16b, respectively. Therefore, it is also possible to arbitrarily set a timing at which a signal potential is supplied to the pixel electrodes 17a, 17b.

According to the configuration of the present invention, as described above, it becomes possible to electrically connect the capacitance coupling electrode (pixel electrode 17b) to the storage capacitance wiring 18x by turning the transistor 12b on. As a result, it also becomes possible to supply a signal potential from the storage capacitance wiring 18x to the pixel electrode 17b via the transistor 12b.

Here, when a normal signal potential is written into the pixel electrode 17a, for example, a signal potential (for example, a Vcom signal) is supplied from the storage capacitance wiring 18x to the pixel electrode 17b via the transistor 12b prior to the aforementioned writing of the normal signal potential. As a result, the signal potential (Vcom) is written into the capacitively-coupled pixel electrode 17b, thereby allowing electric charge accumulated in pixel electrodes to be discharged (refreshed). As a result, it is possible to suppress burn-in of the subpixels including the pixel electrode.

A liquid crystal display device according to the present invention is advantageous mainly because of the above-described configuration and unique advantages deriving therefrom. The following is the description of specific examples and driving methods of a liquid crystal panel 5a that constructs a liquid crystal display device of the present embodiment.

(Specific Example of Liquid Crystal Panel 1-1)

Figure 2:
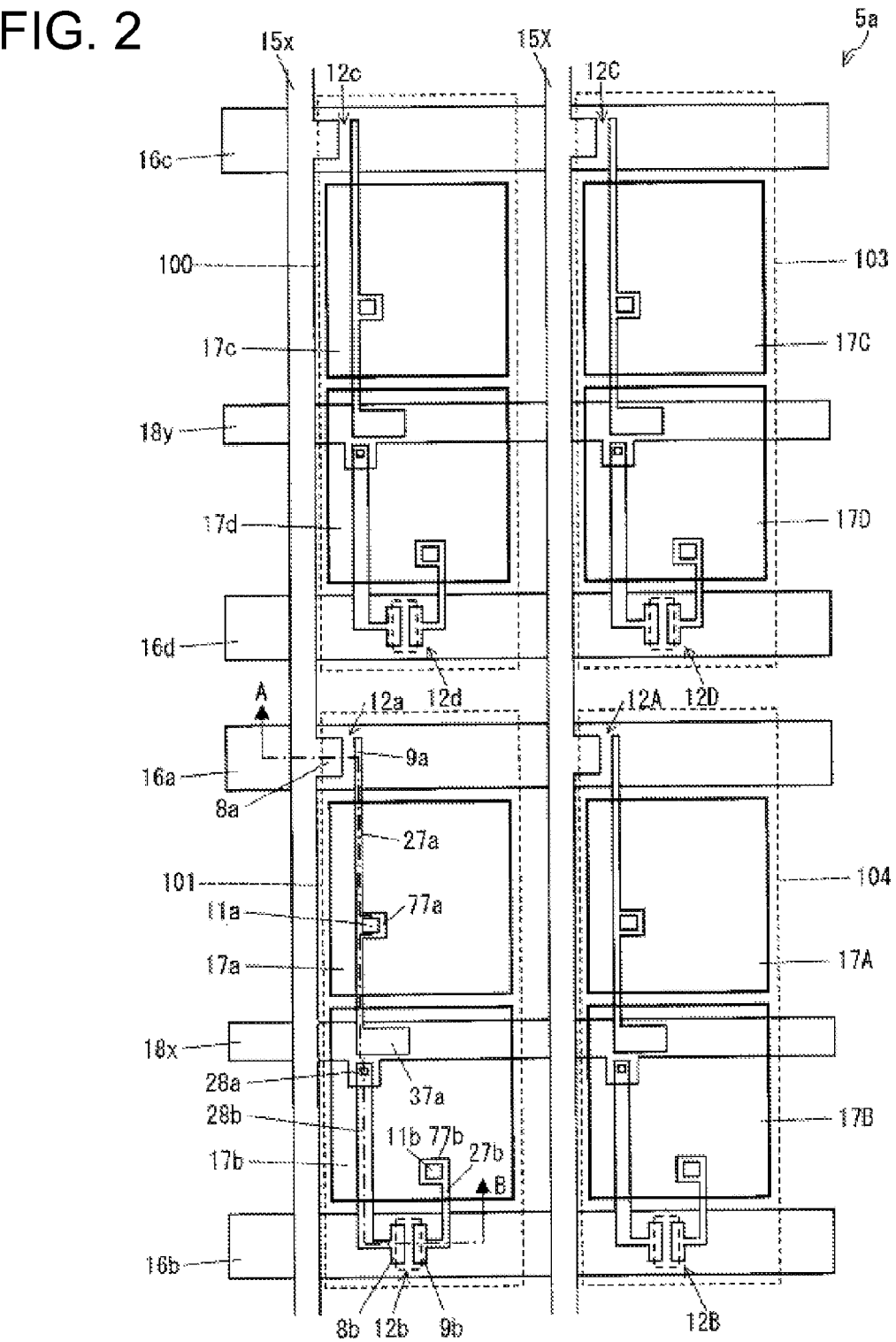
FIG. 2 is a plan view showing a configuration of a liquid crystal panel 5a (specific example 1-1).

A specific example 1-1 of a liquid crystal panel 5a is shown in FIG. 2. In the liquid crystal panel 5a in FIG. 2, a data signal line 15x is provided so as to align along pixels 100, 101; a data signal line 15X is provided so as to align along pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100, while a scan signal line 16d is arranged at the other edge thereof. Viewed planarly, pixel electrodes 17c, 17d are aligned in the column direction between the scan signal lines 16c, 16d. In the same manner, the scan signal line 16c is arranged at one edge of the pixel 103, while the scan signal line 16d is arranged at the other edge thereof. Viewed planarly, pixel electrodes 17C, 17D are aligned in the column direction between the scan signal lines 16c, 16d.

Additionally, a scan signal line 16a is arranged at one edge of the pixel 101, while a scan signal line 16b is arranged at the other edge thereof. Viewed planarly, pixel electrodes 17a, 17b are aligned in the column direction between the scan signal lines 16a, 16b. In the same manner, the scan signal line 16a is arranged at one edge of the pixel 104, while the scan signal line 16b is arranged at the other edge thereof. Viewed planarly, pixel electrodes 17A, 17B are aligned in the column direction between the scan signal lines 16a, 16b.

In the pixel 101, a source electrode 8a and a drain electrode 9a of a transistor 12a are formed over the scan signal line 16a, and a source electrode 8b and a drain electrode 9b of a transistor 12b are formed over the scan signal line 16b. The source electrode 8a is connected to the data signal line 15x. The drain electrode 9a is connected to a drain lead-out wiring 27a; the drain lead-out wiring 27a is connected to a contact electrode 77a and to a coupling capacitance electrode 37a; the contact electrode 77a is connected to the pixel electrode 17a via a contact hole 11a; and the coupling capacitance electrode 37a overlaps the pixel electrode 17b via an interlayer insulating film. As a result, a coupling capacitance C101 (see FIG. 1) between the pixel electrodes 17a, 17b is formed.

Also, the source electrode 8b of the transistor 12b is connected to a source lead-out wiring 28b, and the source lead-out wiring 28b is connected to the storage capacitance wiring 18x via a contact hole 28a. The drain electrode 9b is connected to a drain lead-out wiring 27b; the drain lead-out wiring 27b is connected to a contact electrode 77b; and the contact electrode 77b is connected to the pixel electrode 17b via a contact hole 11b.

Also, the coupling capacitance electrode 37a overlaps the storage capacitance wiring 18x via a gate insulating film, thereby forming a storage capacitance Cha (see FIG. 1), and also forming a storage capacitance Chb between the pixel electrode 17b and the storage capacitance wiring 18x (see FIG. 1). When the storage capacitance Chb is formed without a storage capacitance electrode in this way, a problem that a coupling capacitance electrode 37a short-circuits a storage capacitance electrode doesn't occur. Therefore, the possibility of short-circuit between the pixel electrodes 17a, 17b can be advantageously reduced. The configuration (geometry and alignment of each component and connection relation therebetween) of other pixels is identical to that of the pixel 101.

According to the aforementioned configuration, subpixels including the pixel electrode 17a are "bright" while subpixels including the pixel electrode 17b are "dark."

Figure 3:
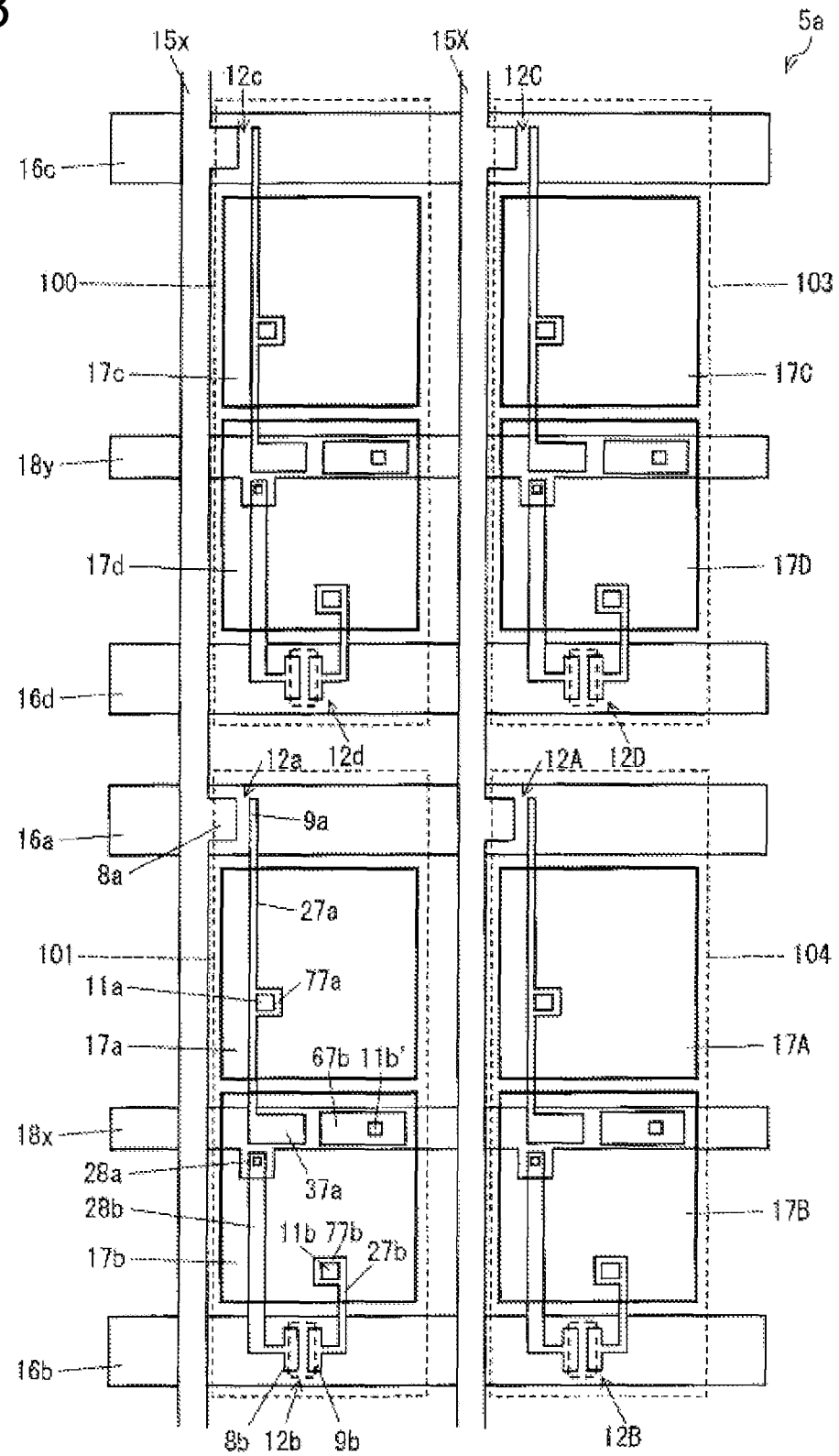

Alternatively, the above-mentioned storage capacitance Chb may be formed according to the configuration shown in FIG. 3. As shown in FIG. 3, a storage capacitance Chb is formed by a configuration in which a storage capacitance electrode 67b, which is formed in the same layer as a coupling capacitance electrode 37a, is connected to a pixel electrode 17b via a contact hole 11b'. When compared to the case shown in FIG. 2 where the storage capacitance Chb is formed between the pixel electrode 17b and the storage capacitance wiring 18x, this configuration requires a less (thinner) insulating film therebetween, thereby increasing a storage capacitance value. The larger storage capacitance value is preferred from the aspect of reliability. Additionally, because the aforementioned configuration requires a thinner insulating film to form a storage capacitance, the same configuration is also advantageous in that the width of the storage capacitance wiring 18x can be narrowed without changing the size of the storage capacitance value, thereby realizing the improvement of an aperture ratio without reducing reliability.

Figure 58:
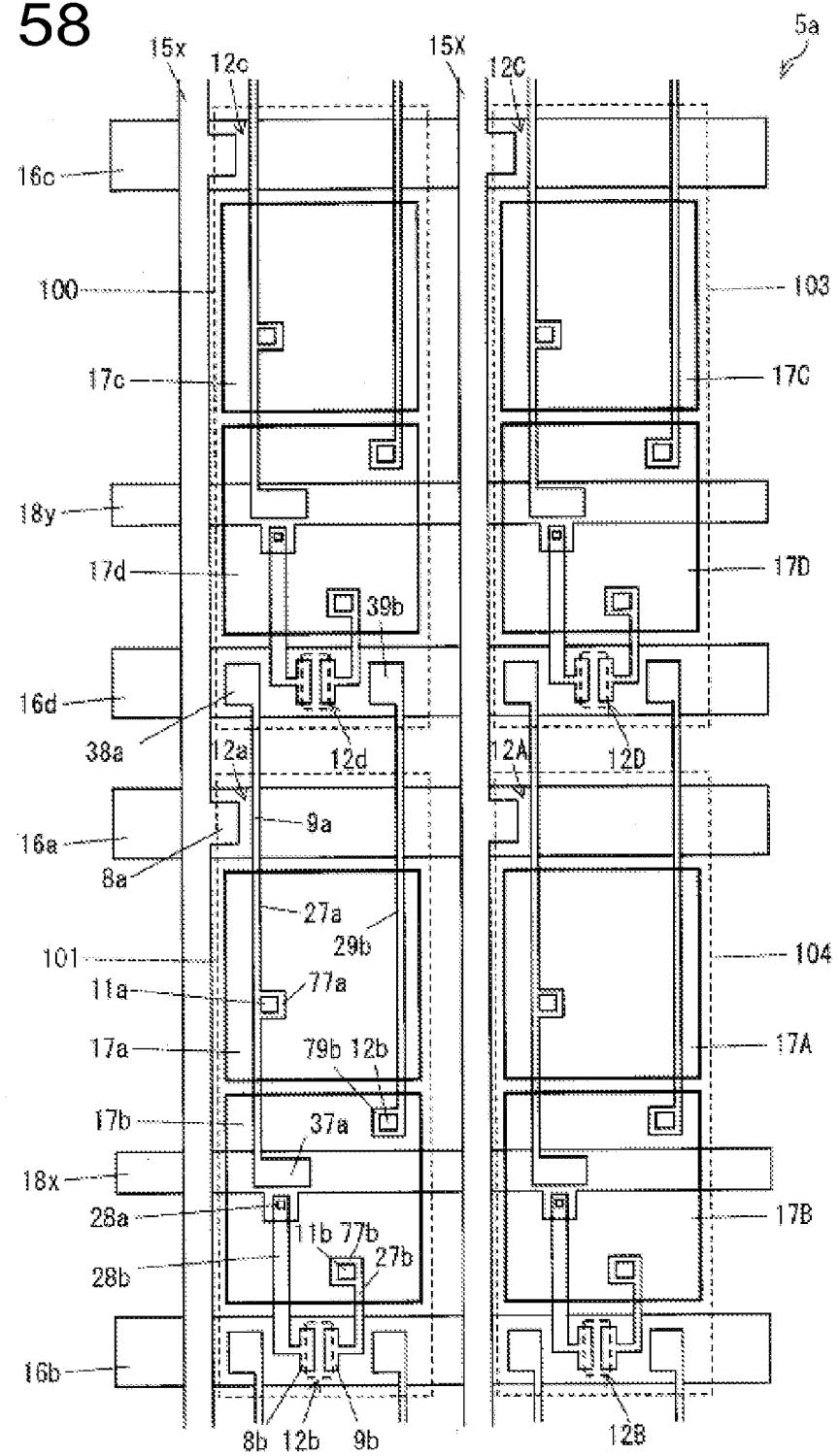

Also, the above-mentioned storage capacitances Cha, Chb may be formed according to the configuration shown in FIG. 58. Specifically, as shown in FIG. 58, a storage capacitance Cha is formed by a configuration in which a storage capacitance electrode 38a, which is formed in the same layer as a coupling capacitance electrode 37a, is connected to a drain lead-out wiring 27a and overlaps a scan signal line 16d via the gate insulating film. Further, a storage capacitance Chb is formed by a configuration in which a storage capacitance electrode 39b, which is formed in the same layer as the storage capacitance electrode 38a, overlaps a scan signal line 16d via a gate insulating film and is connected to a drain lead-out wiring 29b; the drain lead-out wiring 29b is connected to a contact electrode 79b; and the contact electrode 79b is connected to a pixel electrode 17b via a contact hole 12b.

As described above, in the liquid crystal panel 5a shown in FIG. 58, the storage capacitance Cha is a sum of a storage capacitance formed in a section where the storage capacitance electrode 37a and the storage capacitance wiring 18x overlap each other and of a storage capacitance formed in a section where the storage capacitance electrode 38a and the scan signal line 16d overlap each other. This realizes a larger storage capacitance value compared to the storage capacitance Cha in the liquid crystal panel shown in FIG. 2. Also, the storage capacitance Chb is a sum of a storage capacitance formed in a section where the storage capacitance wiring 18x and the pixel electrode 17b overlap each other and of a storage capacitance formed in a section where the storage capacitance electrode 39b and the scan signal line 16d overlap each other. This realizes a larger storage capacitance value compared to the storage capacitance Chb in the liquid crystal panel shown in FIG. 2. Further, in the present liquid crystal panel, the storage capacitances Cha, Chb of the storage capacitance electrodes 38a, 39b are formed with the scan signal line 16d, which is provided to discharge electric charge for a previous row pixel area for which scanning has been completed (pixel 100 in FIG. 58). Thus, variations in the storage capacitance values can be suppressed. Here, the present liquid crystal panel 5a may also be configured such that the storage capacitance electrodes 38a, 39b and the scan signal line 16a for writing normal pixel data overlap each other to form the storage capacitances Cha, Chb.

Needless to say, a method of forming a storage capacitance shown in FIG. 58 can be applied to each of later-described liquid crystal panels 5a, 5b.

Figure 4:
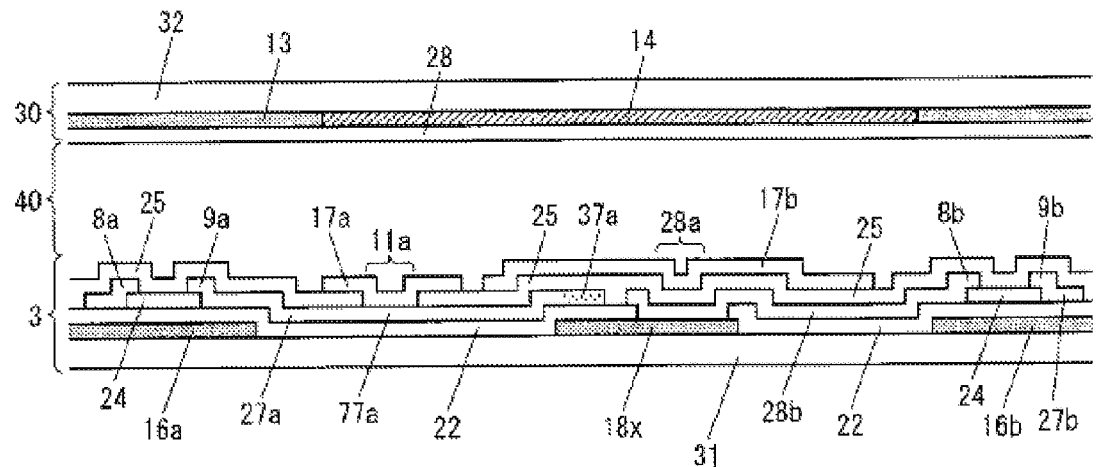
FIG. 4 is a cross-sectional view showing a specific example of a cross section A-B of FIG. 2.

FIG. 4 shows a cross section A-B of FIG. 2. As shown in FIG. 4, a liquid crystal panel 5a includes an active matrix substrate 3, a color filter substrate 30 that faces the active matrix substrate, and a liquid crystal layer 40 arranged between both substrates 3, 30.

In the active matrix substrate 3, scan signal lines 16a, 16b and a storage capacitance wiring 18x are formed on a glass substrate 31 and are covered by an inorganic gate insulating film 22. On the inorganic gate insulating film 22, a semiconductor layer 24 (i-layer and n+-layer); source electrodes 8a, 8b in contact with the n+-layers; drain electrodes 9a, 9b; drain lead-out wirings 27a, 27b; a source lead-out wiring 28b; contact electrodes 77a, 77b (see FIG. 2); and a coupling capacitance electrode 37a are formed and are covered by an inorganic interlayer insulating film 25 formed thereover. Note that for the semiconductor layer 24 that does not overlap the source electrodes 8a, 8b and the drain electrodes 9a, 9b (typically a channel section of a transistor), the n+-layer is removed therefrom by etching or like method, and only the i-layer is left therein. On the inorganic interlayer insulating film 25, pixel electrodes 17a, 17b are formed, which (the pixel electrodes 17a, 17b) are further covered by an alignment film (not shown). Here, the inorganic interlayer insulating film 25 is removed at the contact holes 11a, 11b (see FIG. 2), respectively, thereby connecting the pixel electrode 17a to the contact electrode 77a and contacting the pixel electrode 17b to the contact electrode 77b. Also, the coupling capacitance electrode 37a that is connected to the drain lead-out wiring 27a overlaps the pixel electrode 17b via the inorganic interlayer insulating film 25, thereby forming the coupling capacitance C101 (see FIG. 1). Also, the coupling capacitance electrode 37a overlaps the storage capacitance wiring 18x via the inorganic gate insulating film 22, thereby forming the storage capacitance Cha (see FIG. 1) and also forming the storage capacitance Chb (see FIG. 1) between the pixel electrode 17b and the storage capacitance wiring 18x.

Also, at the contact hole 28a on the storage capacitance wiring 18x, the inorganic gate insulating film 22 is removed, thereby allowing the source lead-out wiring 28b and the storage capacitance wiring 18x to be connected.

Meanwhile, in the color filter substrate 30, a black matrix 13 and a colored layer 14 are formed on a glass substrate 32, and a common electrode (com) 28 is formed thereon, which is further covered by an alignment film (not shown).

Here, one example of manufacturing methods of the present active matrix substrate 3 is described as follows.

First, on a transparent insulating substrate, such as glass or plastic substrate (in FIG. 4, the glass substrate 31), a metal film, such as a film of titanium, chromium, aluminum, molybdenum, tantalum, tungsten, copper, or the like, or an alloy or multilayer film thereof, is formed using sputtering or like method at a film thickness of 1000 Å to 3000 Å. The formed film is patterned using a photo-etching method into a required shape to form scan signal lines, storage capacitance wirings, and the like (to function as the gate electrodes of respective transistors).

Next, using a plasma CVD (chemical vapor deposition) or like method, a silicon nitride film (SiNx) as a gate insulating film, a high-resistance semiconductor layer made of amorphous silicon, polysilicon, or the like, and a low-resistance semiconductor layer made of n+-amorphous silicon or the like, are sequentially formed. Then, using a photo-etching method, the low-resistance semiconductor layer, the high-resistance semiconductor layer, and the gate insulating film are patterned. At that time, the gate insulating film is removed at the contact hole 28a. Here, the film thickness of the silicon nitride film as the gate insulating film should be approximately 3000 Å to 5000 Å, for example; the thickness of the amorphous silicon film as the high-resistance semiconductor layer should be approximately 1000 Å to 3000 Å, for example; and the thickness of the n+-amorphous silicon film as the low-resistance semiconductor layer should be approximately 400 Å to 700 Å, for example.

Next, using sputtering or like method, a metal film, such as a film of titanium, chromium, aluminum, molybdenum, tantalum, tungsten, copper, or the like, or an alloy film or a multilayer film thereof, is formed at the film thickness of 1000 Å to 3000 Å and is patterned into a required shape to form data signal lines, source electrodes, drain electrodes, and so forth, using photo-etching or like method.

Next, with respect to the high-resistance semiconductor layer (i-layer) of the amorphous silicon film or the like and with respect to the low-resistance semiconductor layer (n+-layer) of the n+-amorphous silicon film or the like, channel-etching is performed by dry etching using the patterns of the data signal lines, the source electrodes, the drain electrodes, and the like as a mask. By this process, the film thickness of the i-layer is optimized, and each transistor (channel area) is formed. Here, the unmasked semiconductor layer is removed by etching, leaving the i-layer at a thickness necessary for each transistor's performance.

Next, as an interlayer insulating film, an inorganic insulating film made of silicon nitride, silicon oxide, or the like is formed to cover the data signal lines, source electrodes, drain electrodes, and the like. In this example, using a plasma CVD or the like, a silicon nitride film (passivation film) at the film thickness of about 2000 Å to 5000 Å is formed.

Next, according to the locations of contact holes, the interlayer insulating film is etched to form holes. Here, for example, the etching is performed through patterning a photosensitive resist using photolithography method (exposure and development).

Next, on the interlayer insulating film, a transparent conductive film, such as a film of ITO (indium tin oxide), IZO, zinc oxide, tin oxide, or the like, is formed at the film thickness of approximately 1000 Å to 2000 Å using sputtering or like method. The formed transparent conductive film is then patterned into a required shape using photo-etching or like method to form first and second pixel electrodes in each pixel area.

Next, using inkjet or like method, an alignment film is applied so as to cover each of the pixel electrodes.

The above-described manufacturing method of the active matrix substrate can be applied to each of liquid crystal panels that are later described. For convenience of description, their descriptions are omitted below.

Figure 5:
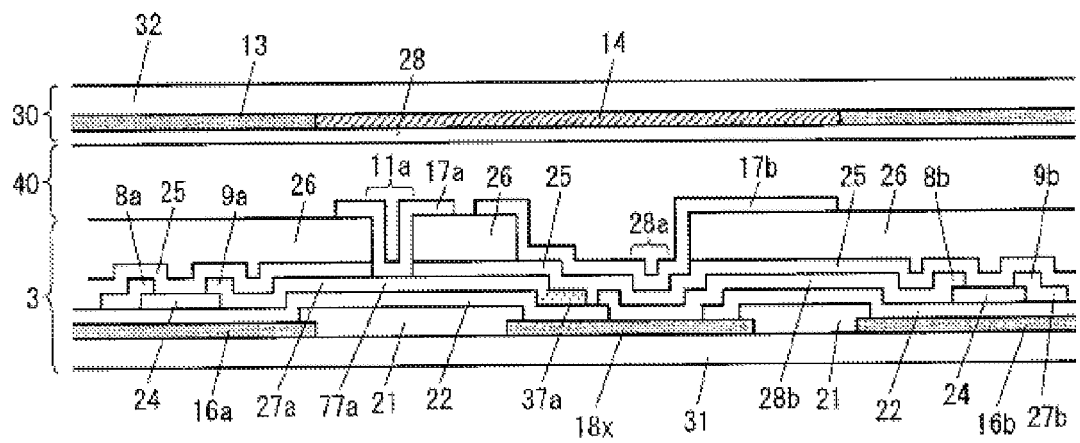
FIG. 5 is a cross-sectional view showing another specific example of a cross section A-B of FIG. 2.

It is also possible to configure the cross section A-B in FIG. 4 as shown in FIG. 5. Specifically, a thick organic gate insulating film 21 and a thin inorganic gate insulating film 22 are formed on a glass substrate 31, and a thin inorganic interlayer insulating film 25 and a thick organic interlayer insulating film 26 are formed in a lower layer of the pixel electrodes. As a result, such advantages can be obtained that various parasitic capacitances are reduced and short-circuits between the wirings are prevented. In this case, as shown in FIG. 5, it is preferred that a portion of the organic gate insulating film 21 located under the coupling capacitance electrode 37a be removed, and a portion of the organic interlayer insulating film 26 located above the coupling capacitance electrode 37a be removed. As a result, the capacitance value of the coupling capacitance C101 and that of the storage capacitances Cha, Chb can be increased.

Also, in order to further increase the capacitance value of the storage capacitance Chb, it is preferred that the interlayer insulating film that exists between the pixel electrode 17b and the source lead-out wiring 28b be made thin. For example, as shown in FIG. 5, it is preferred that over the storage capacitance wiring 18x, the organic interlayer insulating film 26 be removed, and the pixel electrode 17b and the source lead-out wiring 28b overlap via the inorganic interlayer insulating 25. Here, it is not necessary that a thin film area between the same pixel electrode 17b and the source lead-out wiring 28b be located above the storage capacitance wiring 18x. Also, according to this configuration, it is not required to separately form the storage capacitance electrode 67b (FIG. 3). This provides advantages that the capacitance value of the above-mentioned storage capacitance Chb can be increased, and can prevent defects caused by the storage capacitance electrode 67b, such as a short-circuit between bright and dark pixels due to a short-circuit between the storage capacitance electrode 67b and the coupling capacitance electrode 37a, or a short-circuit between the storage capacitance wiring 18x and the storage capacitance electrode 67b.

The inorganic interlayer insulating film 25, the organic interlayer insulating film 26, and the contact holes 11a, 11b shown in FIG. 5 can be formed as follows, for example. Specifically, after a transistor (TFT) is formed, an inorganic interlayer insulating film 25 (passivation film), which is made of SiNx at the thickness of approximately 3000 Å, is formed to cover an entire area of the substrate, using a mixed gas of $SiH_4$ gas, $NH_3$ gas, and $N_2$ gas via CVD. After that, an organic interlayer insulating film 26, which is made of positive-type photosensitive acrylic resin at the thickness of approximately 3 μm, is formed using spin coating or die coating. Next, using photolithography, patterns for areas in which the organic interlayer insulating film 26 is removed as well as for various contacts are created. Then, dry-etching is performed on the inorganic interlayer insulating film 25 by using a mixed gas of $CF_4$ gas and $O_2$ gas using the patterned organic interlayer insulating film 26 as a mask. Specifically, half exposure of the photolithography process is applied to leave a thin organic interlayer insulating film at the completion of development for the areas at which the organic interlayer insulating film is to be removed, while full exposure of the photolithography process is applied to completely remove the organic interlayer insulating film at the completion of development for the areas at which the contact holes are to be created. When the dry-etching is performed using a mixed gas of $CF_4$ gas and $O_2$ gas, the leftover film (of the organic interlayer insulating film) is removed therefrom, while the inorganic interlayer insulating film under the organic interlayer insulating film is removed from the contact holes. Here, the organic gate insulating film 21 and the organic interlayer insulating film 26 may be an insulating film made of such materials as SOG (spin-on glass), for example. The organic gate insulating film 21 and the organic interlayer insulating film 26 may also contain at least one of acrylic resin, epoxy resin, polyimide resin, polyurethane resin, novolak resin, and siloxane resin.

Alternatively, a liquid crystal panel 5a of the specific example 1-1 shown in FIG. 2 may be configured as follows. Specifically, in a liquid crystal panel 5a of FIG. 6 which is a modification example 1, a drain lead-out wiring 27a connected to a drain electrode 9a of a transistor 12a is not extended to a coupling capacitance electrode 37a and is connected only to a contact electrode 77b. The contact electrode 77a is connected to the pixel electrode 17a via a contact hole 11a. The coupling capacitance electrode 37a overlaps the pixel electrode 17b via an interlayer insulating film, while an extended coupling capacitance electrode 27a' connected to the coupling capacitance electrode 37a is connected to a contact electrode 77a'. The contact electrode 77a' is connected to the pixel electrode 17a via a contact hole 11a'. As a result, compared to the configuration shown in FIG. 2, an area where the drain lead-out wiring 27a overlaps the pixel electrode 17a can be reduced, thereby improving the aperture ratio.

Figure 7:
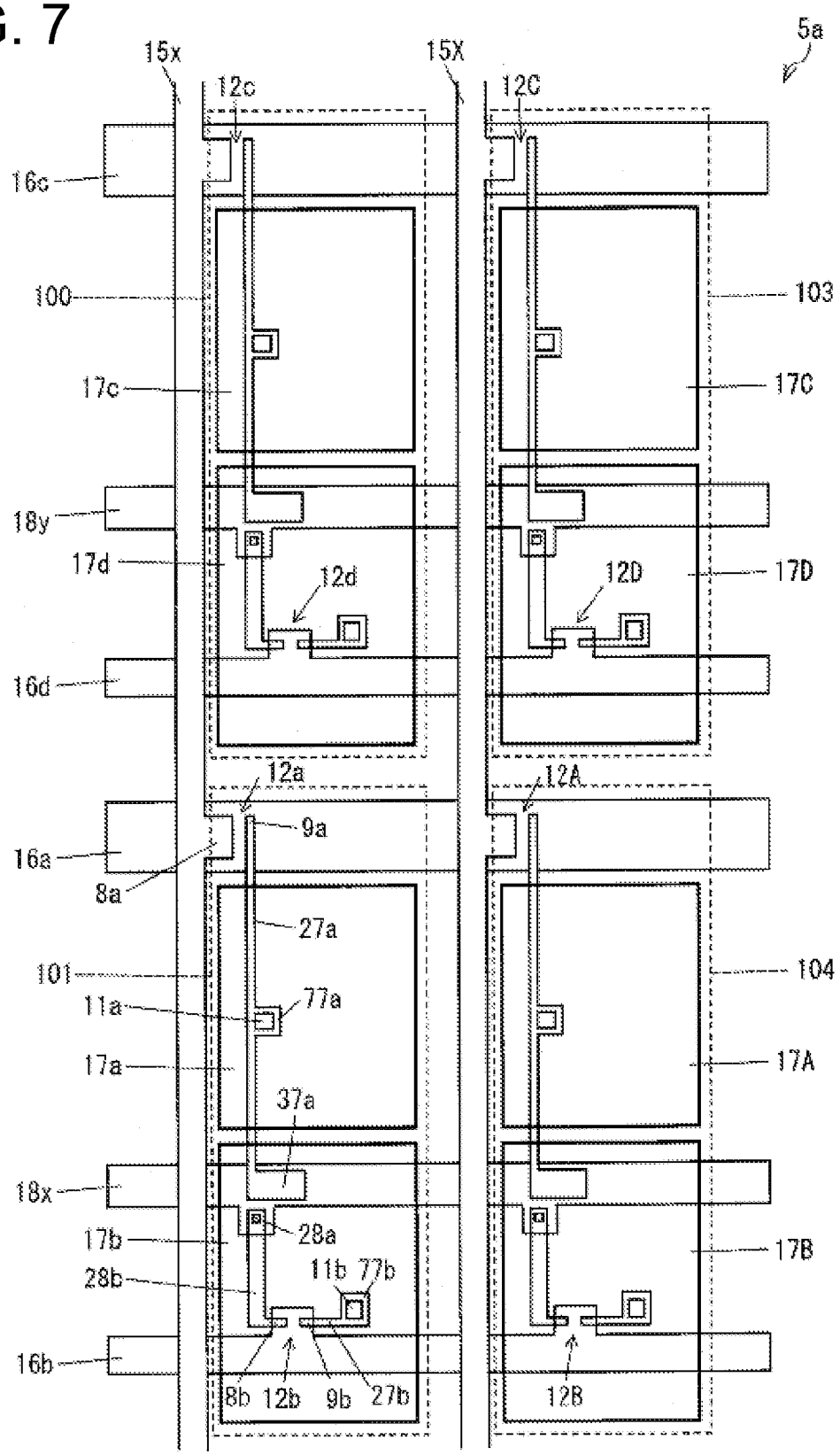
FIG. 7 is a plan view showing another configuration of a liquid crystal panel 5a (modification 2).

In a liquid crystal panel 5a shown in FIG. 7, which is a modification example 2, a scan signal line 16b is formed in branches (gate branch structure), and a drain electrode and a source electrode of a transistor 12b are also formed at there respective branches. As a result, it becomes possible to narrow the line width of the scan signal line 16b and also to reduce a parasitic capacitance formed between the source electrode 8b and the drain electrode 9b of the transistor 12b and the scan signal line 16b.

Here, the above-mentioned modifications examples 1, 2 may also be applied in the same manner to each of later-described specific examples of liquid crystal panels 5a, 5b.

(Specific Example of Liquid Crystal Panel 1-2)

Figure 8:
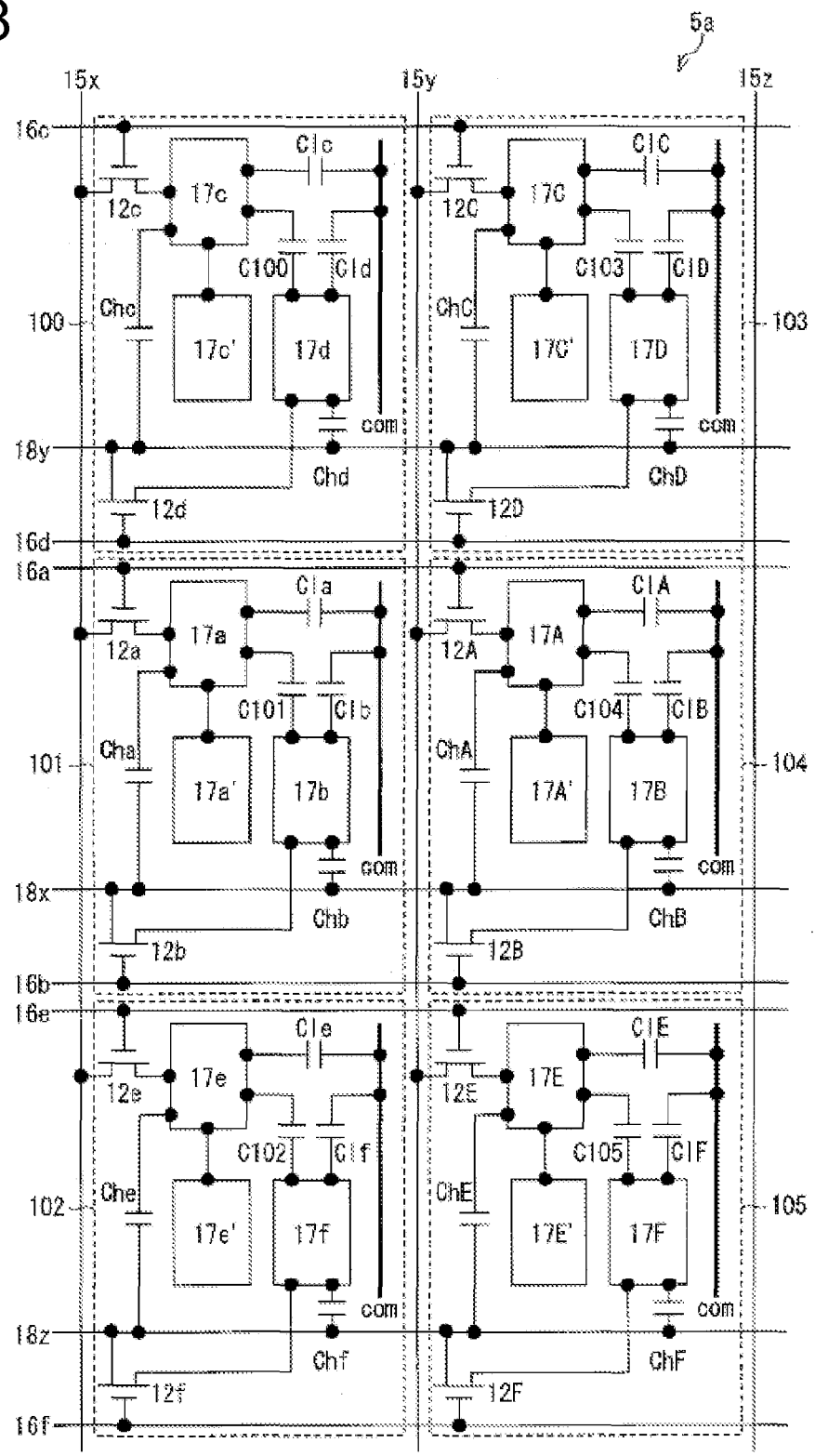
FIG. 8 is a circuit diagram showing another configuration of a liquid crystal panel 5a (specific example 1-2).

An equivalent circuit diagram that corresponds to a specific example 1-2 of a liquid crystal panel 5a is shown in FIG. 8. The specific example 1-2 of the liquid crystal panel 5a is shown in FIG. 9.

As shown in FIG. 8, each pixel has an identical configuration, in which one data signal line and two scan signal lines are provided to each pixel. Three pixel electrodes 17c, 17d, 17c' are provided in a pixel 100 (FIG. 8 shows a condition that the pixel electrodes 17c, 17c' are electrically connected to each other); three pixel electrodes 17a, 17b, 17a' are provided in a pixel 101; and three pixel electrodes 17e, 17f, 17e' are provided in a pixel 102. Also, three pixel electrodes 17C, 17D, 17C' are provided in a pixel 103; three pixel electrodes 17A, 17B, 17A' are provided in a pixel 104; and three pixel electrodes 17E, 17F, 17E' are provided in a pixel 105. The pixel electrodes 17c, 17C, the pixel electrodes 17c', 17C', the pixel electrodes 17d, 17D, the pixel electrodes 17a, 17A, the pixel electrodes 17a', 17A', the pixel electrodes 17b, 17B, the pixel electrodes 17e, 17E, the pixel electrodes 17e', 17E', and the pixel electrodes 17f, 17F are adjacent to each other in the row direction, respectively.

Taking the pixel 101 as an example, in the pixel 101, the pixel electrodes 17a, 17b are connected to each other via a coupling capacitance C101; the pixel electrode 17a is connected to a data signal line 15x via a transistor 12a that is connected to a scan signal line 16a; the pixel electrode 17b is connected to a storage capacitance wiring 18x via a transistor 12b that is connected to a scan signal line 16b; and the pixel electrode 17a', which is electrically connected to the pixel electrode 17a, is connected to the data signal line 15x via the transistor 12a. A storage capacitance Cha is formed between the pixel electrodes 17a, 17a' and the storage capacitance wiring 18x; a storage capacitance Chb is formed between the pixel electrode 17b and the storage capacitance wiring 18x; a liquid crystal capacitance Cla is formed between the pixel electrodes 17a, 17a' and a common electrode "com"; and a liquid crystal capacitance Clb is formed between the pixel electrode 17b and the common electrode "com."

Figure 9:
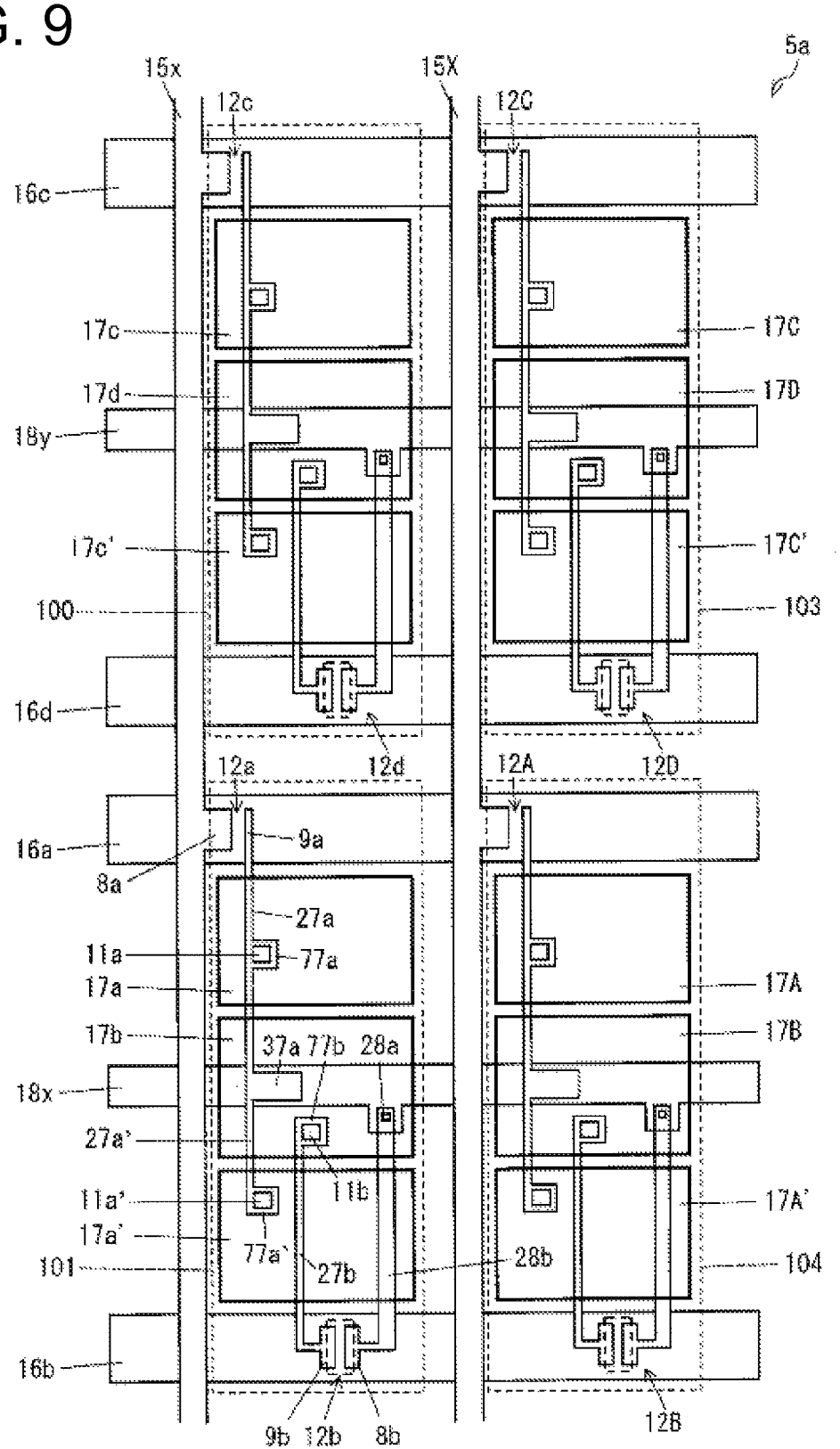
FIG. 9 is a plan view of showing another configuration of a liquid crystal panel 5a (specific example 1-2).

In the liquid crystal panel 5a shown in FIG. 9, in the manner similar to that of the liquid crystal panel in FIG. 2, a data signal line 15x is provided so as to align along the pixels 100, 101; a data signal line 15X is provided so as to align along the pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100; a scan signal line 16d is arranged at the other edge thereof; and viewed planarly, pixel electrodes 17c, 17d, 17c' are aligned in the column direction between the scan signal lines 16c, 16d. In the same manner, the scan signal line 16c is arranged at one edge of the pixel 103; the scan signal line 16d is arranged at the other edge part thereof; and viewed planarly, three pixel electrodes 17C, 17D, 17C' are aligned in the column direction between the scan signal lines 16c, 16d.

Also, a scan signal line 16a is arranged at one edge of the pixel 101; a scan signal line 16b is arranged at the other edge thereof; and viewed planarly, pixel electrodes 17a, 17b, 17a' are aligned in the column direction between the scan signal lines 16a, 16b. In the same manner, the scan signal line 16a is arranged at one edge of the pixel 104; the scan signal line 16b is arranged at the other edge thereof; and viewed planarly, pixel electrodes 17A, 17B, 17A' are aligned in the column direction between the scan signal lines 16a, 16b.

In the pixel 101, a source electrode 8a and a drain electrode 9a of a transistor 12a are formed over the scan signal line 16a, while a source electrode 8b and a drain electrode 9b of a transistor 12b are formed over the scan signal line 16b. The source electrode 8a is connected to the data signal line 15x. The drain electrode 9a is connected to a drain lead-out wiring 27a; the drain lead-out wiring 27a is connected to a contact electrode 77a and a coupling capacitance electrode 37a; and the contact electrode 77a is connected to the pixel electrode 17a via a contact hole 11a. The coupling capacitance electrode 37a overlaps the pixel electrode 17b via an interlayer insulating film, thereby forming a coupling capacitance C101 between the pixel electrodes 17a, 17b (see FIG. 8).

Also, the source electrode 8b of the transistor 12b is connected to a source lead-out wiring 28b, and the source lead-out wiring 28b is connected to the storage capacitance wiring 18x via a contact hole 28a. The drain electrode 9b is connected to the drain lead-out wiring 27b; the drain lead-out wiring 27b is connected to a contact electrode 77b; and the contact electrode 77b is connected to the pixel electrode 17b via a contact hole 11b.

Also, the coupling capacitance electrode 37a overlaps the storage capacitance wiring 18x via a gate insulating film, thereby forming a storage capacitance Cha (see FIG. 8), and also a storage capacitance Chb between the pixel electrode 17b and the storage capacitance wiring 18x (see FIG. 8). Further, an extended coupling capacitance electrode 27a' connected to the coupling capacitance electrode 37a is connected to a contact electrode 77a', and the contact electrode 77a' is connected to a pixel electrode 17a' (a third pixel electrode) via a contact hole 11a'. Here, the configuration (geometry and alignment of each component and connection relation therebetween) of other pixels is identical to that of the pixel 101.

According to the aforementioned configuration, subpixels including the pixel electrodes 17a, 17a' are "bright" while subpixels including the pixel electrode 17b are "dark." Therefore, an advantage is obtained that an electric charge is prevented from jumping from the scan signal line to the pixel electrode 17b in the floating state.

Figure 10:
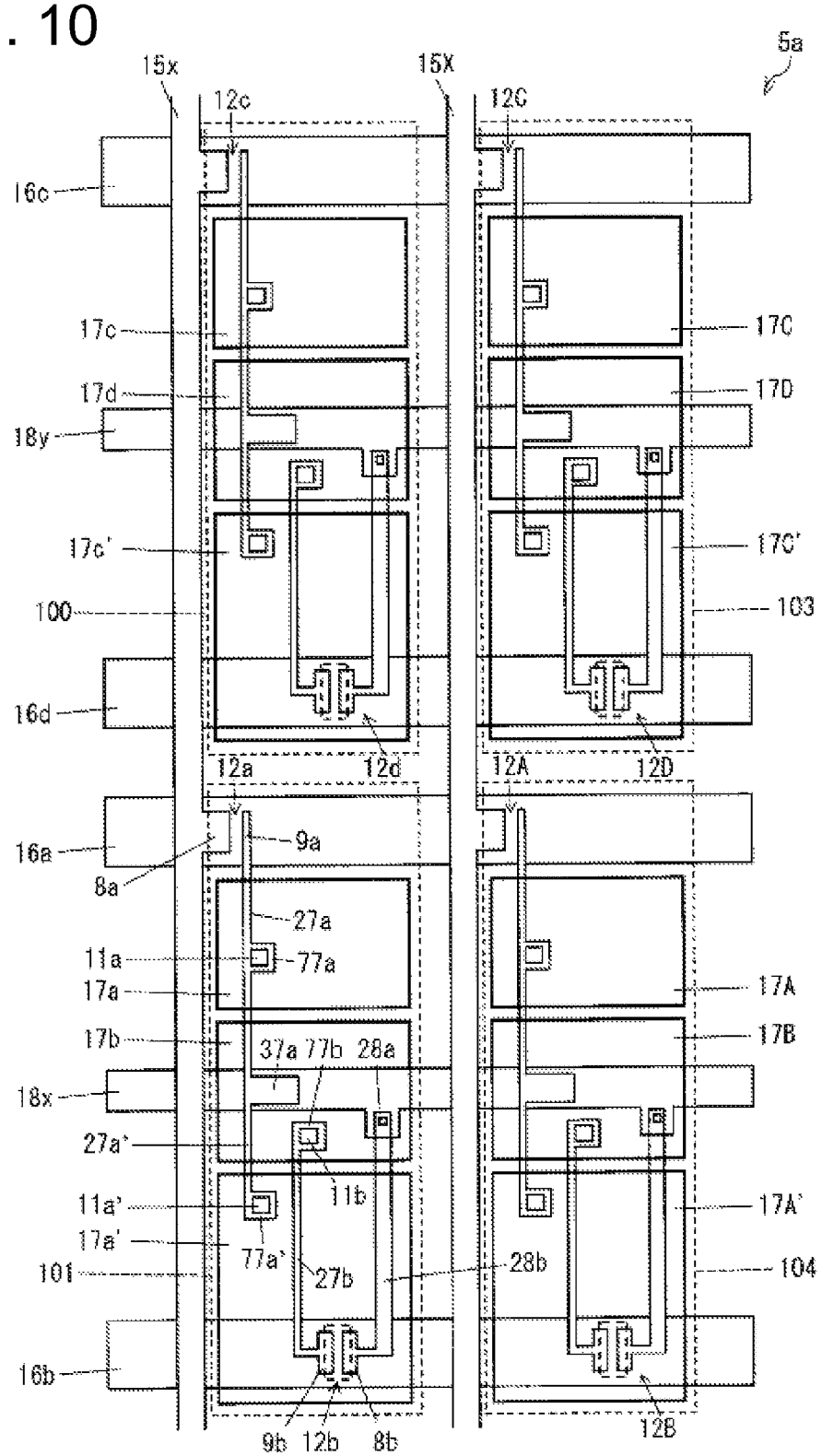
FIG. 10 is a plan view showing another configuration of a liquid crystal panel 5a shown in FIG. 9.

Here, in case of the configuration in which a thin inorganic interlayer insulating film 25 and a thick organic interlayer insulating film 26 are formed in a lower layer under the pixel electrode as shown in FIG. 5, a liquid crystal panel 5a can be configured as shown in FIG. 10. Specifically, a pixel electrode 17a' is formed to overlap a scan signal line 16b via the thin inorganic interlayer insulating film 25 and the thick organic interlayer insulating film 26. As a result, it becomes possible to reduce a parasitic capacitance between the pixel electrode 17a' and the scan signal line 16b, which is particularly advantageous in that the aperture ratio can be improved while suppressing an increase in the workload of the scan signal line 16b.

Figure 11:
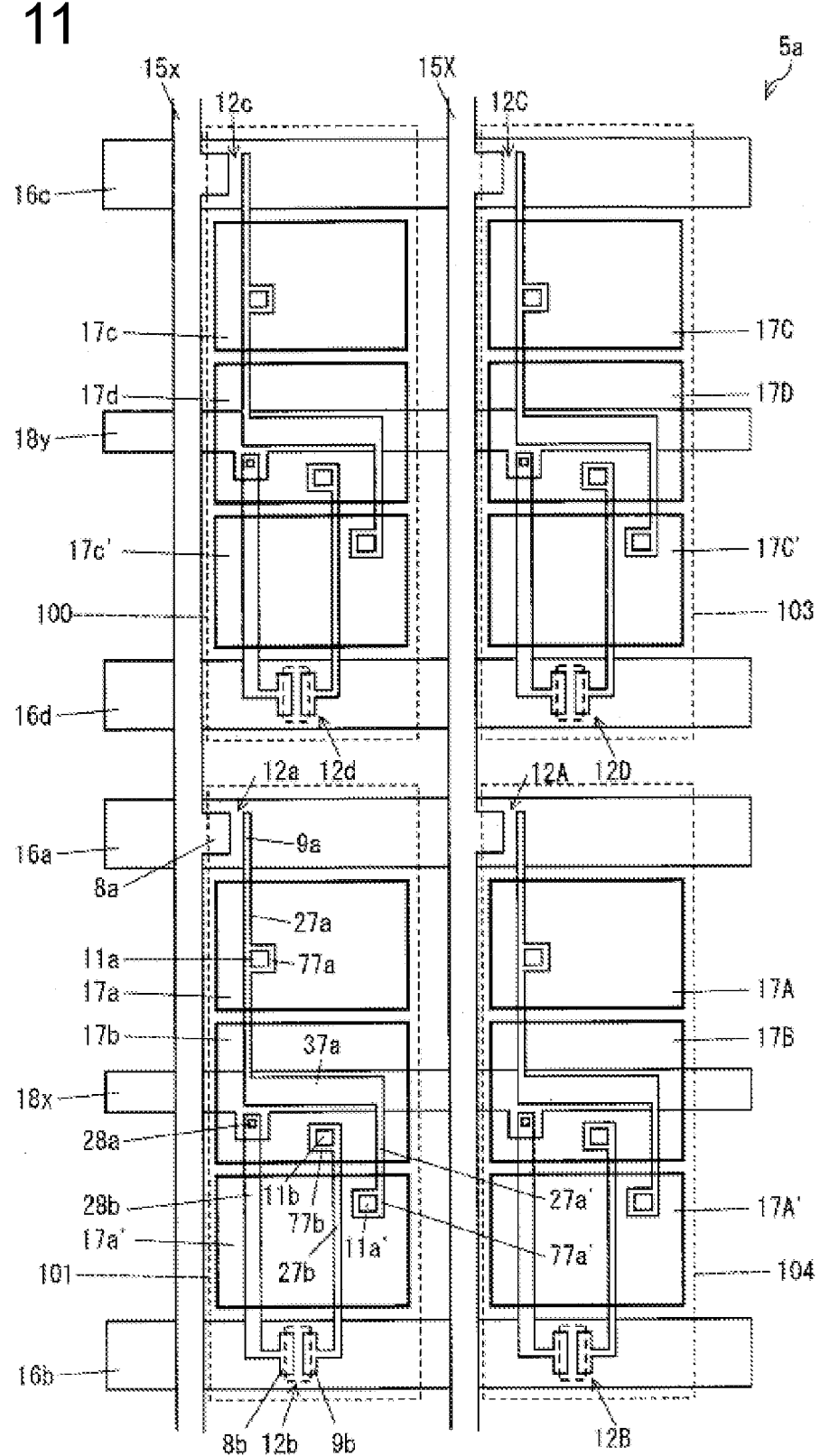
FIG. 11 is a plan view showing another configuration of a liquid crystal panel 5a shown in FIG. 9.

Also, as shown in FIG. 11, such a configuration is also possible that the width of the coupling capacitance electrode 37a is enlarged to increase the area of a section where the coupling capacitance electrode 37a and the storage capacitance wiring 18x overlap each other. As a result, a capacitance value of a storage capacitance Cha (see FIG. 8) can be increased.

Figure 12:
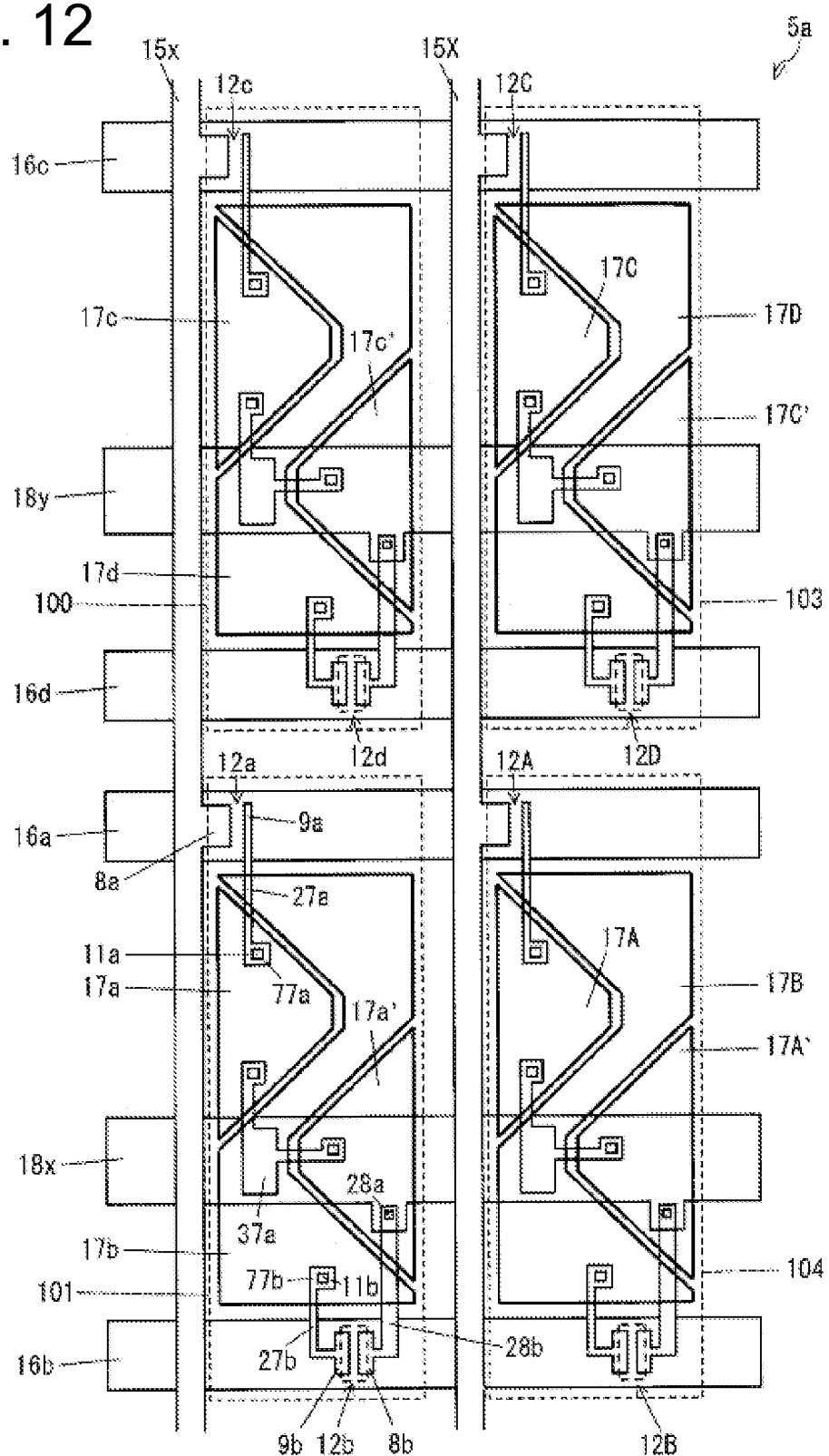
FIG. 12 is a plan view showing another configuration of a liquid crystal panel 5a shown in FIG. 9.

Further, the liquid crystal panel 5a of the present specific example 1-2 can also be configured as shown in FIG. 12. Specifically, in the liquid crystal panel 5a shown in FIG. 12, the shapes of the pixel electrodes are different from those of the pixel electrodes of the liquid crystal panel 5a shown in FIGS. 9 to 11. In particular, in the pixel 101 for example, pixel electrodes 17a, 17b, 17a' are arranged such that a portion of the pixel electrode 17a is adjacent to a scan signal line 16a; a portion of the pixel electrode 17a' is adjacent to a scan signal line 16b; and one edge of the pixel electrode 17b is adjacent to the scan signal line 16a while the other edge thereof is adjacent to the scan signal line 16b. In other words, at least respective portions of the pixel electrodes 17a, 17a' are arranged adjacent to the scan signal lines 16a, 16b, respectively, while the pixel electrode 17b is arranged so as to extend in the column direction to bridge the scan signal line 16a and the scan signal line 16b. Here, because components of FIG. 12 having reference characters identical to those of FIGS. 9 to 11 possess identical functions, the description thereof is omitted herein.

According to the aforementioned configuration, subpixels including the pixel electrodes 17a, 17a' are "bright" while subpixels including the pixel electrode 17b are "dark." Further, in this configuration, it is possible to shorten each of the lead-out wirings of the transistors 12a, 12b, respectively, as compared with the configuration shown in FIGS. 9 to 11. Similarly, because the pixel electrodes 17a, 17a' can be connected at a position close to them via the coupling capacitance electrode 37a, it is possible to shorten each of the lead-out wirings of the coupling capacitance electrode 37a, as compared with the configuration shown in FIGS. 9 to 11. As a result, in addition to an advantage that the occurrence of burn-in in subpixels including the pixel electrode 17b can be prevented, advantages such as reduced chance of breakage in lead-out wirings and improved aperture ration can also be obtained.

The above-described configurations shown in FIGS. 10 to 12 can also be applied in the same manner to each of specific examples of liquid crystal panels 5a, 5b.

(Specific Example of Liquid Crystal Panel 1-3)

Figure 13:
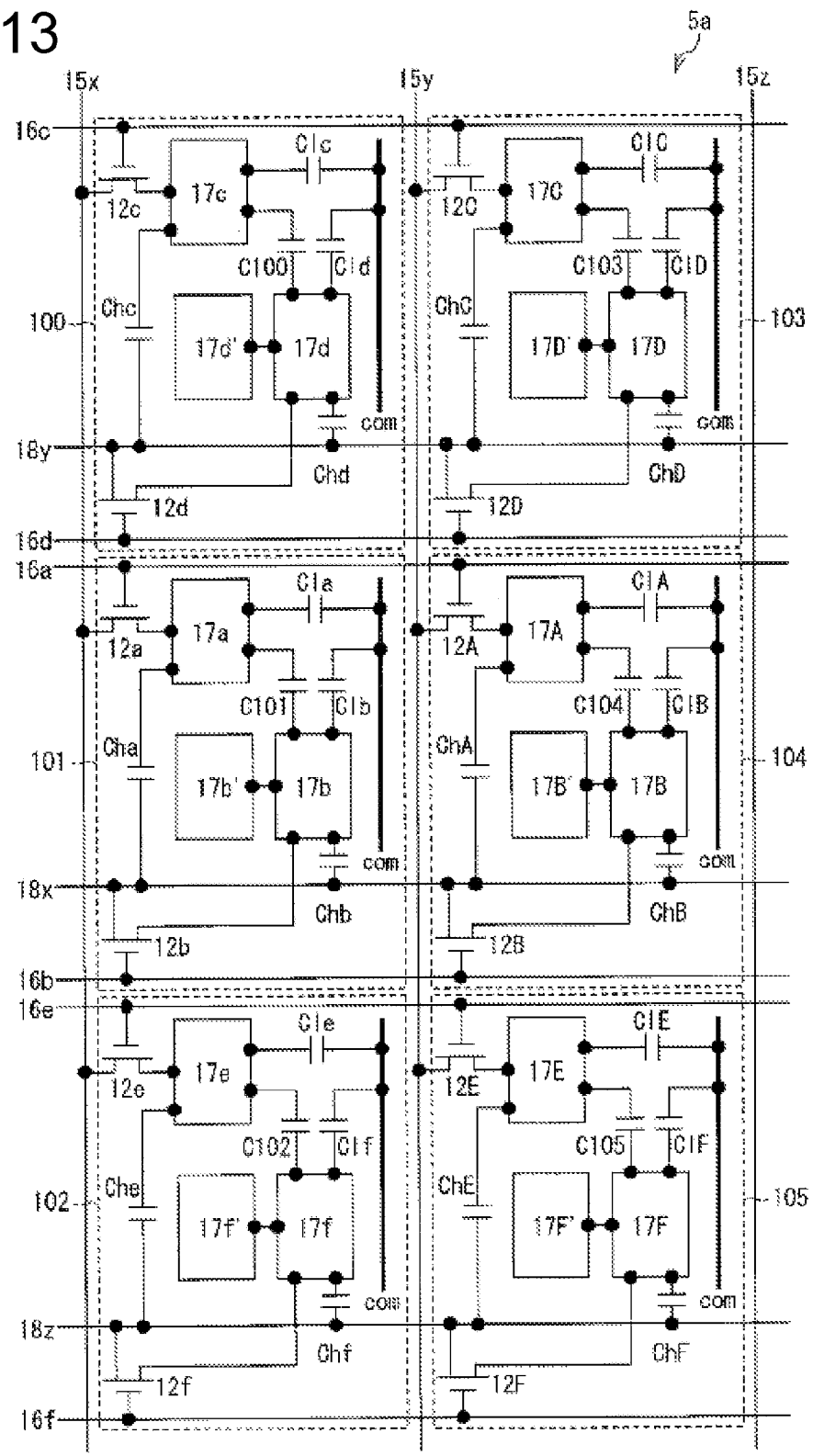
FIG. 13 is a circuit diagram showing another configuration of a liquid crystal panel 5a (specific example 1-3).

An equivalent circuit diagram that corresponds to a specific example 1-3 of a liquid crystal panel 5a is shown in FIG. 13. The specific example 1-3 of a liquid crystal panel 5a is shown in FIG. 14.

As shown in FIG. 13, each pixel has an identical configuration, in which one data signal line and two scan signal lines are provided to each pixel. Three pixel electrodes 17d, 17c, 17d' are provided in a pixel 100 (FIG. 13 shows a condition that the pixel electrodes 17d, 17d' are electrically connected to each other); three pixel electrodes 17b, 17a, 17b' are provided in a pixel 101; and three pixel electrodes 17f, 17e, 17f' are provided in a pixel 102 are arranged. Also, three pixel electrodes 17D, 17C, 17D' are provided in a pixel 103; three pixel electrodes 17B, 17A, 17B' are provided in a pixel 104; and three pixel electrodes 17F, 17E, 17F' are provided in a pixel 105. The pixel electrodes 17d, 17D, the pixel electrodes 17c, 17C, the pixel electrodes 17d', 17D', the pixel electrodes 17b, 17B, the pixel electrodes 17a, 17A, the pixel electrodes 17b', 17B', the pixel electrodes 17f, 17F the pixel electrodes 17e, 17E, and the pixel electrodes 17f', 17F' are adjacent to each other in the row direction, respectively.

Taking the pixel 101 as an example, in the pixel 101, the pixel electrodes 17a, 17b are connected to each other via a coupling capacitance C101; the pixel electrode 17a is connected to a data signal 15x via a transistor 12a that is connected to a scan signal line 16a; the pixel electrodes 17b, 17b' are that are electrically connected to each other are capacitively coupled to the pixel electrode 17a, and are connected to a storage capacitance wiring 18x via a transistor 12b that is connected to a scan signal line 16b; a storage capacitance Cha is formed between the pixel electrode 17a and the storage capacitance wiring 18x; a storage capacitance Chb is formed between the pixel electrodes 17b, 17b' and the storage capacitance wiring 18x; a liquid crystal capacitance Cla is formed between the pixel electrode 17a and a common electrode "com"; and a liquid crystal capacitance Clb is formed between the pixel electrodes 17b, 17b' and the common electrode "com."

Figure 14:
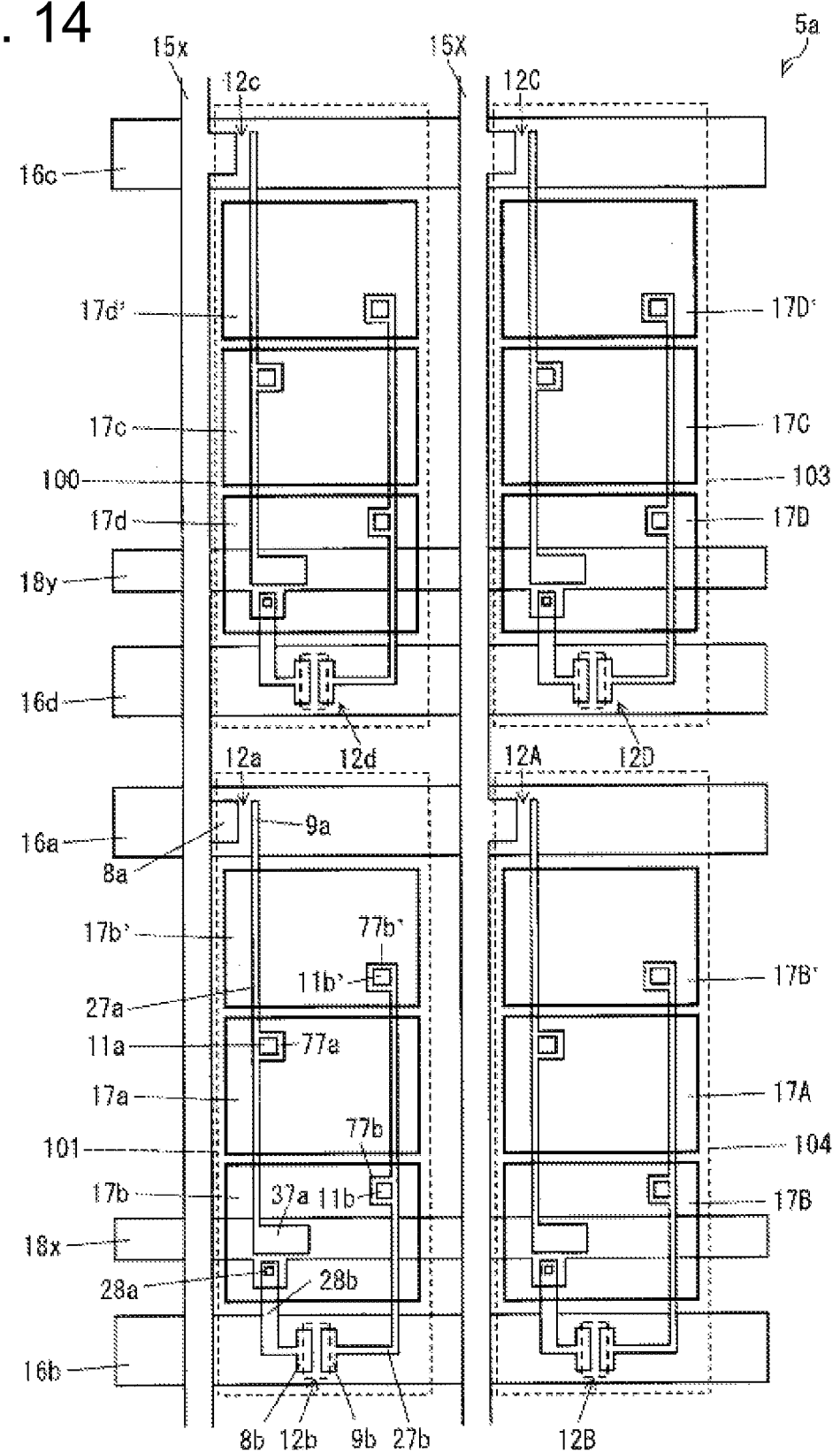
FIG. 14 is a plan view showing another configuration of a liquid crystal panel 5a (specific example 1-3).

In the liquid crystal panel 5a shown in FIG. 14, in a manner similar to that of the liquid crystal panel in FIG. 2, a data signal line 15x is provided so as to align along the pixels 100, 101; a data signal line 15X is provided so as to align along the pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100; a scan signal line 16d is arranged at the other edge thereof; and viewed planarly, pixel electrodes 17d', 17c, 17d are aligned in the column direction between the scan signal lines 16c, 16d. In the same manner, the scan signal line 16c is arranged at one edge of the pixel 103; the scan signal line 16d is arranged at the other edge thereof; and viewed planarly, three pixel electrodes 17D', 17C, 17D are aligned in the column direction between the scan signal lines 16c, 16d.

Also, a scan signal line 16a is arranged at one edge of the pixel 101; a scan signal line 16b is arranged at the other edge thereof; and viewed planarly, pixel electrodes 17b', 17a, 17b are aligned in the column direction between the scan signal lines 16a, 16b. In the same manner, the scan signal line 16a is arranged at one edge of the pixel 104; the scan signal line 16b is arranged at the other edge thereof; and viewed planarly, pixel electrodes 17B', 17A, 17B are aligned in the column direction between the scan signal lines 16a, 16b.

In the pixel 101, a source electrode 8a and a drain electrode 9a of a transistor 12a are formed over the scan signal line 16a, while a source electrode 8b and a drain electrode 9b of a transistor 12b are formed over the scan signal line 16b. The source electrode 8a is connected to the data signal line 15x. The drain electrode 9a is connected to a drain lead-out wiring 27a; the drain lead-out wiring 27a is connected to a coupling capacitance electrode 37a and to a contact electrode 77a; and the contact electrode 77a is connected to the pixel electrode 17a via a contact hole 11a. The coupling capacitance electrode 37a overlaps the pixel electrode 17b via an interlayer insulating film, thereby forming a coupling capacitance C101 between the pixel electrodes 17a, 17b (see FIG. 13).

Also, the source electrode 8b of the transistor 12b is connected to a source lead-out wiring 28b, and the source lead-out wiring 28b is connected to the storage capacitance wiring 18x via a contact hole 28a. The drain electrode 9b is connected to a drain lead-out wiring 27b; the drain lead-out wiring 27b is connected to a contact electrode 77b; and the contact electrode 77b is connected to the pixel electrode 17b via a contact hole 11b. The drain lead-out wiring 27b is further connected to a contact electrode 77b', and the contact electrode 77b' is connected to the pixel electrode 17b' via a contact hole 11b'. Also, the coupling capacitance electrode 37a overlaps the storage capacitance wiring 18x via a gate insulating film, thereby forming a storage capacitance Cha (see FIG. 13), and also a storage capacitance Chb between the pixel electrode 17b and the storage capacitance wiring 18x (see FIG. 13). Here, the configuration (geometry and alignment of each component and connection relation therebetween) of other pixels is identical to that of the pixel 101.

According to the aforementioned configuration, subpixels including the pixel electrode 17a are "bright" while subpixels including the pixel electrodes 17b, 17b' are "dark." Therefore, the bright subpixels that belong to different pixels are not aligned adjacently to each other, and as a result, an advantage is obtained that a natural display is possible, as compared with cases in which the bright subpixels that belong to different pixels are aligned adjacently to each other.

Figure 15:
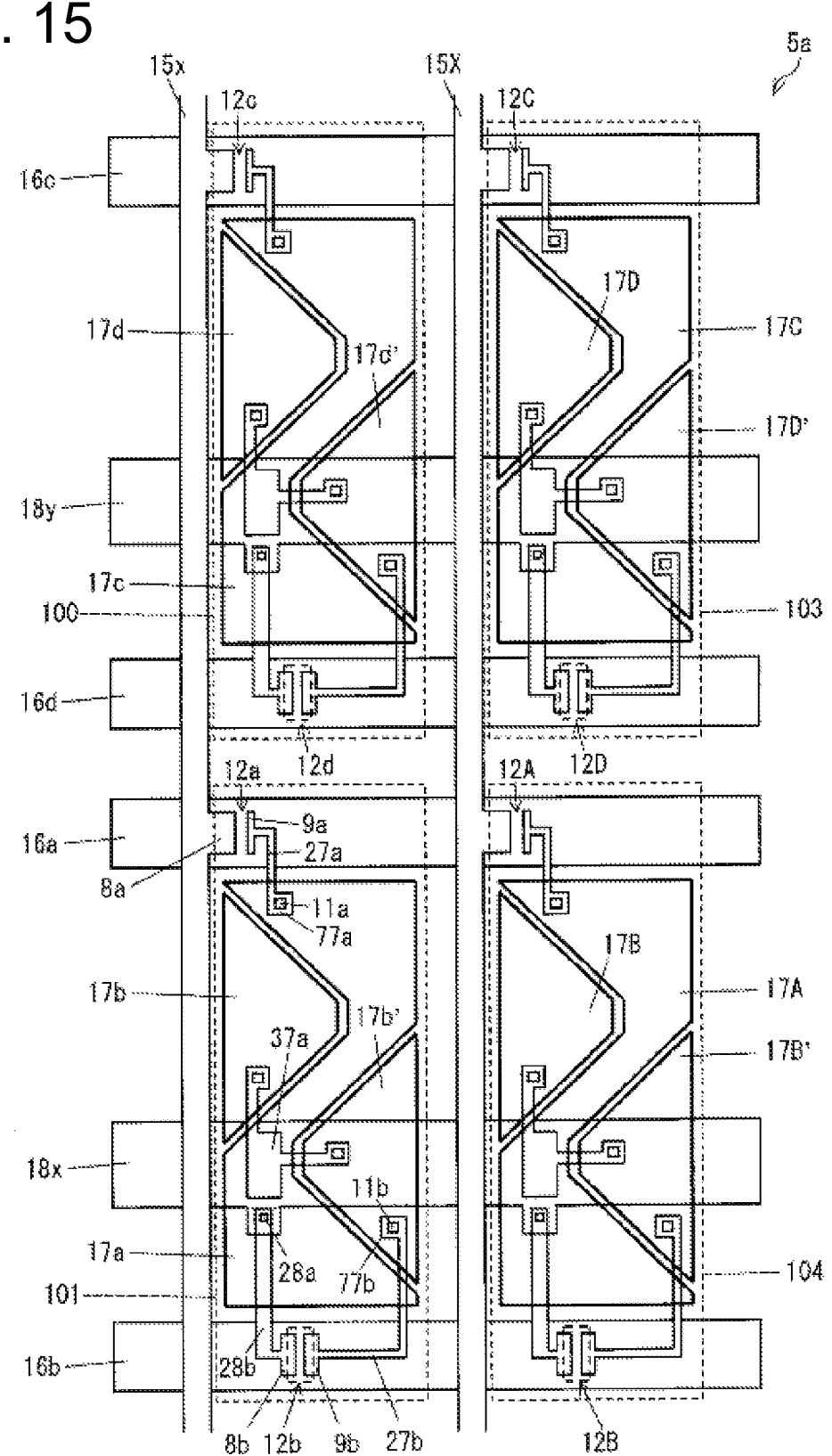
FIG. 15 is a plan view showing another configuration of a liquid crystal panel 5a shown in FIG. 13.

Alternatively, the liquid crystal panel 5a shown in the present specific example 1-3 can also be configured as shown in FIG. 15. Specifically, in a manner similar to that of the liquid crystal panel 5a shown in FIG. 12, the shapes of the pixel electrodes in the liquid crystal panel 5a shown in FIG. 15 are different from those of the pixel electrodes of the liquid crystal panel 5a shown in FIG. 14. In particular, in the pixel 101, for example, pixel electrodes 17b, 17a, 17b' are arranged such that a portion of the pixel electrode 17b is adjacent to a scan signal line 16a; that a portion of the pixel electrode 17b' is adjacent to a scan signal line 16b, and that one edge of the pixel electrode 17a is adjacent to the scan signal line 16a while the other edge thereof is adjacent to the scan signal line 16b. In other words, at least respective portions of the pixel electrodes 17b, 17b' are arranged adjacent to the scan signal lines 16a, 16b, respectively, and the pixel electrode 17a is arranged so as to extend in the column direction to bridge the scan signal line 16a and the scan signal line 16b. Here, because components in FIG. 15 having reference characters identical to those shown in FIG. 14 possess identical functions, the description thereof is omitted herein.

According to the aforementioned configuration, subpixels including the pixel electrode 17a are "bright" while subpixels including the pixel electrodes 17b, 17b' are "dark." As a result, similar to the configuration in FIG. 12, this configuration provides advantages that the possibility of wiring disconnection of the lead-out wirings can be reduced and that the aperture ratio can be improved.

(Specific Example of Liquid Crystal Panel 1-4)

Figure 16:
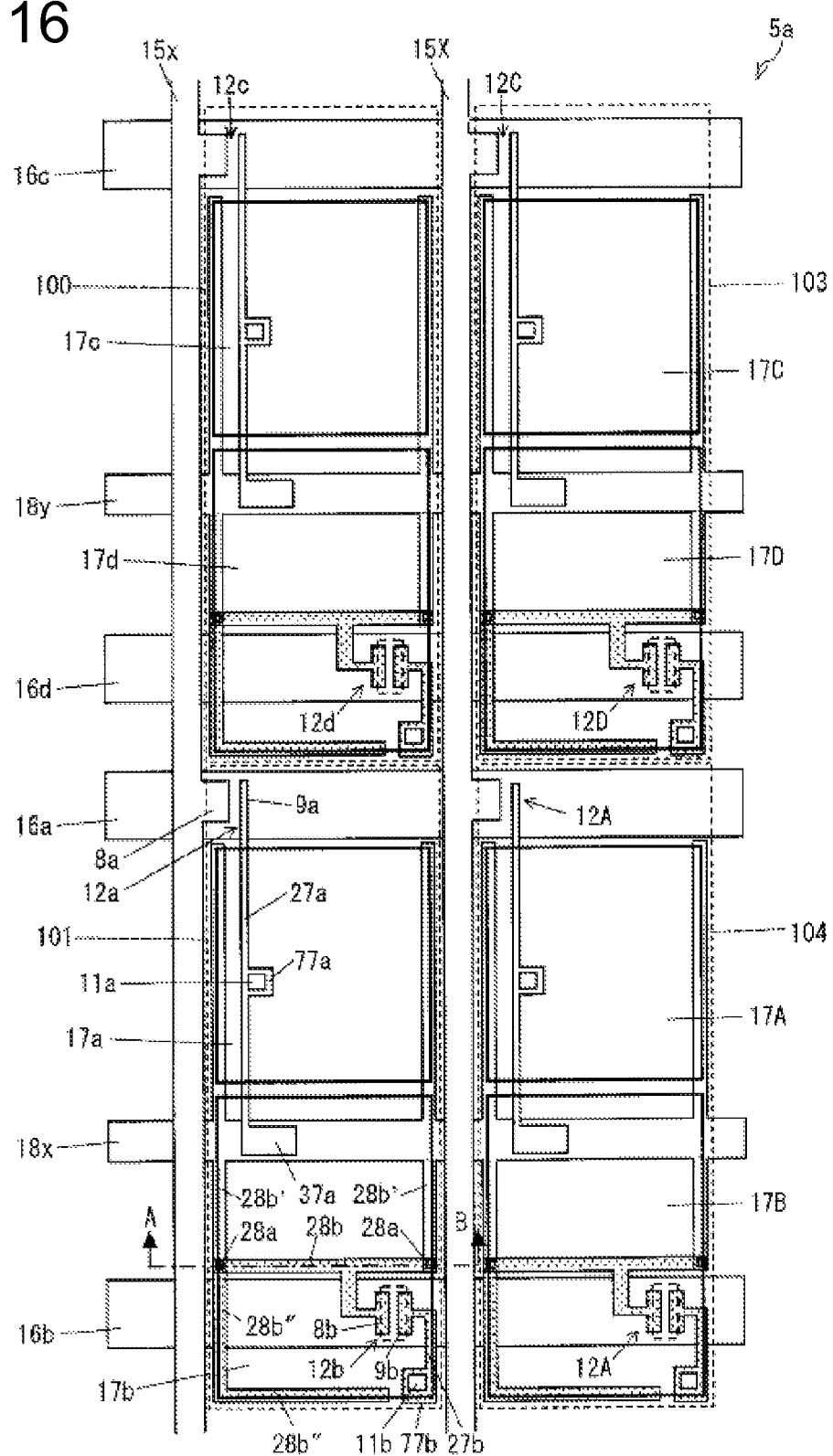
FIG. 16 is a plan view showing another configuration of a liquid crystal panel 5a (specific example 1-4).

A specific example 1-4 of the liquid crystal panel 5a is shown in FIG. 16. In the liquid crystal panel 5a shown in FIG. 16, two pixel electrodes are formed in each pixel area. Also, in the liquid crystal panel in FIG. 16, in a manner similar to that of the liquid crystal panel shown in FIG. 2, a data signal line 15x is provided so as to align along pixels 100, 101; a data signal line 15X is provided so as to align along pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100, while a scan signal line 16d is arranged at the other edge thereof. And viewed planarly, a pixel electrode 17c is arranged on the side of the scan signal line 16c; a pixel electrode 17d is arranged to overlap the scan signal lines 16d;

and the aforementioned pixel electrodes 17c, 17d are aligned in the column direction. In the same manner, the scan signal line 16c is arranged at one edge of the pixel 103, while the scan signal line 16d is arranged at the other edge thereof. And viewed planarly, a pixel electrode 17C is arranged on the side of the scan signal line 16c; a pixel electrode 17D is arranged to overlap the scan signal 16d; and the aforementioned pixel electrodes 17C, 17C are aligned in the column direction.

Also, a scan signal line 16a is arranged at one edge of the pixel 101, while a scan signal line 16b is arranged at the other edge thereof. And viewed planarly, a pixel electrode 17a is arranged on the side of the scan signal line 16a; a pixel electrode 17b is arranged to overlap the scan signal lines 16b; and the aforementioned pixel electrodes 17a, 17b are aligned in the column direction. In the same manner, the scan signal line 16a is arranged at one edge of the pixel 104, while the scan signal line 16b is arranged at the other edge thereof. Viewed planarly, a pixel electrodes 17A is arranged on the side of the scan signal line 16a; a pixel electrode 17B is arranged to overlap the scan signal 16b; and the aforementioned pixel electrodes 17A, 17B are aligned in the column direction.

In the pixel 101, a source electrode 8a and a drain electrode 9a of a transistor 12a are formed over the scan signal line 16a, while a source electrode 8b and a drain electrode 9b of a transistor 12b are formed over the scan signal line 16b. The source electrode 8a is connected to the data signal line 15x. The drain electrode 9a is connected to a drain lead-out wiring 27a; the drain lead-out wiring 27a is connected to a coupling capacitance electrode 37a and to a contact electrode 77a; and the contact electrode 77a is connected to the pixel electrode 17a via a contact hole 11a. The coupling capacitance electrode 37a overlaps the pixel electrode 17b via a interlayer insulating film, thereby forming a coupling capacitance C101 between the pixel electrodes 17a, 17b.

The storage capacitance wiring 18x includes an extended storage capacitance wiring that branches off from the storage capacitance wiring 18x, and viewed planarly, is provided so as to overlap a portion of an edge of the pixel electrodes 17a, 17b or to extend along the outer side thereof. This extended storage capacitance wiring is composed of an extension 28b' (first extension) that is formed in the same layer as the storage capacitance wiring 18x; and also an extension 28b" (second extension) that is connected to the same extension 28b' via a contact hole 28a. Further, the extension 28b" is connected to a source lead-out wiring 28b that is connected to the source electrode 8b of the transistor 12b. Here, the extension 28b" may be formed in the same metal layer as the source lead-out wiring 28b.

The drain electrode 9b of the transistor 12b is connected to a drain lead-out wiring 27b; the drain lead-out wiring 27b is connected to a contact electrode 77b; and the contact electrode 77b is connected to the pixel electrode 17b via a contact hole 11b.

Also, the coupling capacitance electrode 37a overlaps the storage capacitance wiring 18x via a gate insulating film, thereby forming a storage capacitance Cha, and also a storage capacitance Chb between the pixel electrode 17b and the storage capacitance wiring 18x. Here, the configuration (geometry and alignment of each component and connection relation therebetween) of other pixels is identical to that of the pixel 101.

According to the present specific example, subpixels including the pixel electrode 17a are "bright" while subpixels including the pixel electrode 17b are "dark."

Figure 17:
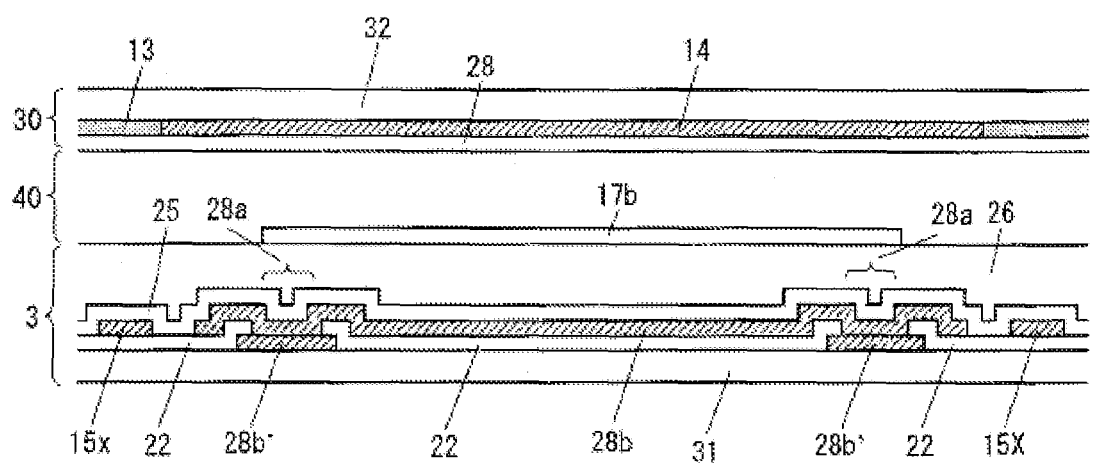
FIG. 17 is a cross-sectional view showing a specific example of a cross section A-B shown in FIG. 16.

FIG. 17 shows a cross-sectional view A-B of FIG. 16. As shown in the figure, the liquid crystal panel 5a includes an active matrix substrate 3, a color filter substrate 30 that faces the active matrix substrate 3, and a liquid crystal layer 40 that is arranged between the aforementioned substrates 3, 30.

In the active matrix substrate 3, an extension 28b' that is led out from a storage capacitance wiring 18x is formed on a glass substrate 31, and an inorganic gate insulating film 22 is formed to cover the extension 28b'. On the inorganic gate insulating film 22, a source lead-out wiring 28b that is led out from a source electrode 8b of a transistor 12b is formed; an inorganic interlayer insulating film 25 is formed to cover the source lead-out wiring; and an organic interlayer insulating film 26 is formed on the inorganic interlayer insulating film 25. A pixel electrode 17b is formed on the organic interlayer insulating film 26, and an alignment film (not shown) is formed to cover the pixel electrode 17b. Here, the inorganic gate insulating film is removed at a contact hole 28a, thereby connecting the extension 28b' to the extension 28b" (see FIG. 16) and to the source lead-out wiring 28b.

Meanwhile, in the color filter substrate 30, a black matrix 13 and a colored layer 14 are formed on a glass substrate 32; a common electrode (com) 28 is formed in an upper layer thereabove; and an alignment film (not shown) is formed to cover the common electrode.

According to the liquid crystal panel 5a of the present specific example 1-4, it is possible to shield the pixel electrode 17b, which becomes a dark pixel, with a storage capacitance wiring, thereby improving the effect of preventing burn-in. Also, as shown as the shaded areas in FIG. 16, it is also possible to shield a vicinity of the scan signal line 16b with a source metal layer, and therefore, it is possible to suppress a short-circuit between the extension 28b" and the source lead-out wiring 28b, which act as shield electrodes, and the scan signal line 16b. Further, according to the configuration in FIG. 16, the transistor 12b is formed over the scan signal line 16b so that the pixel electrode 17b overlaps the scan signal line 16b, thereby improving the aperture ratio as a result.

(Driving Methods of Liquid Crystal Display Device)

Next, driving methods of the liquid crystal display devices that include the above-described liquid crystal panels 5a are described. Generally, the driving methods have the following characteristics.

As a first characteristic, a transistor 12b that is connected to a capacitance coupling electrode is turned on at least once in a period during which the liquid crystal display device is on (during display). As a result, as described above, the capacitance coupling electrode (pixel electrode 17b) can be electrically connected to a storage capacitance electrode 18x, thereby allowing discharging (refreshing) of accumulated electric charges, suppressing the occurrence of burn-in in subpixels that include the capacitance coupling electrode.

As a second characteristic, a transistor 12b is turned on to connect a pixel electrode 17b with a storage capacitance wiring 18x at least once in a period during which a liquid crystal display device is on, and the transistor 12b is turned off while Vcom is supplied to the data signal line 15x. As a result, it becomes possible to set the potential of the pixel electrode 17b to a Cs potential (Vcom), thereby preventing the deterioration of display quality in addition to the aforementioned advantage regarding the discharge of accumulated electric charge.

As a third characteristic, in addition to the first and second characteristics, the transistor 12b, which is connected to a pixel electrode 17b, is turned off while Vcom is supplied from the data signal line 15x and from the storage capacitance wiring 18x to the pixel electrodes 17a and 17b, respectively, via the transistors 12a, 12b. Specifically, when the transistor 12b is turned off, the transistor 12a is in the ON state, and Vcom has been supplied to the pixel electrode 17a. As a result, it becomes possible to reset the potential of the pixel electrodes in one pixel area before a normal signal potential is written into the pixel electrode 17a. In other words, the potential of the capacitively-coupled pixel electrode 17b can be fixed at Vcom. As a result, it becomes possible to ensure the discharge of accumulated electric charges from the pixel electrode 17b and also to prevent the deterioration of display quality.

Specific driving methods possessing the above-described characteristics and also configurations of a gate driver that realizes these methods are described in detail below. Note that the driving methods described below adopt a charge-sharing method, but the present invention is not limited to such a system.

(Driving Method 1)

Figure 18:
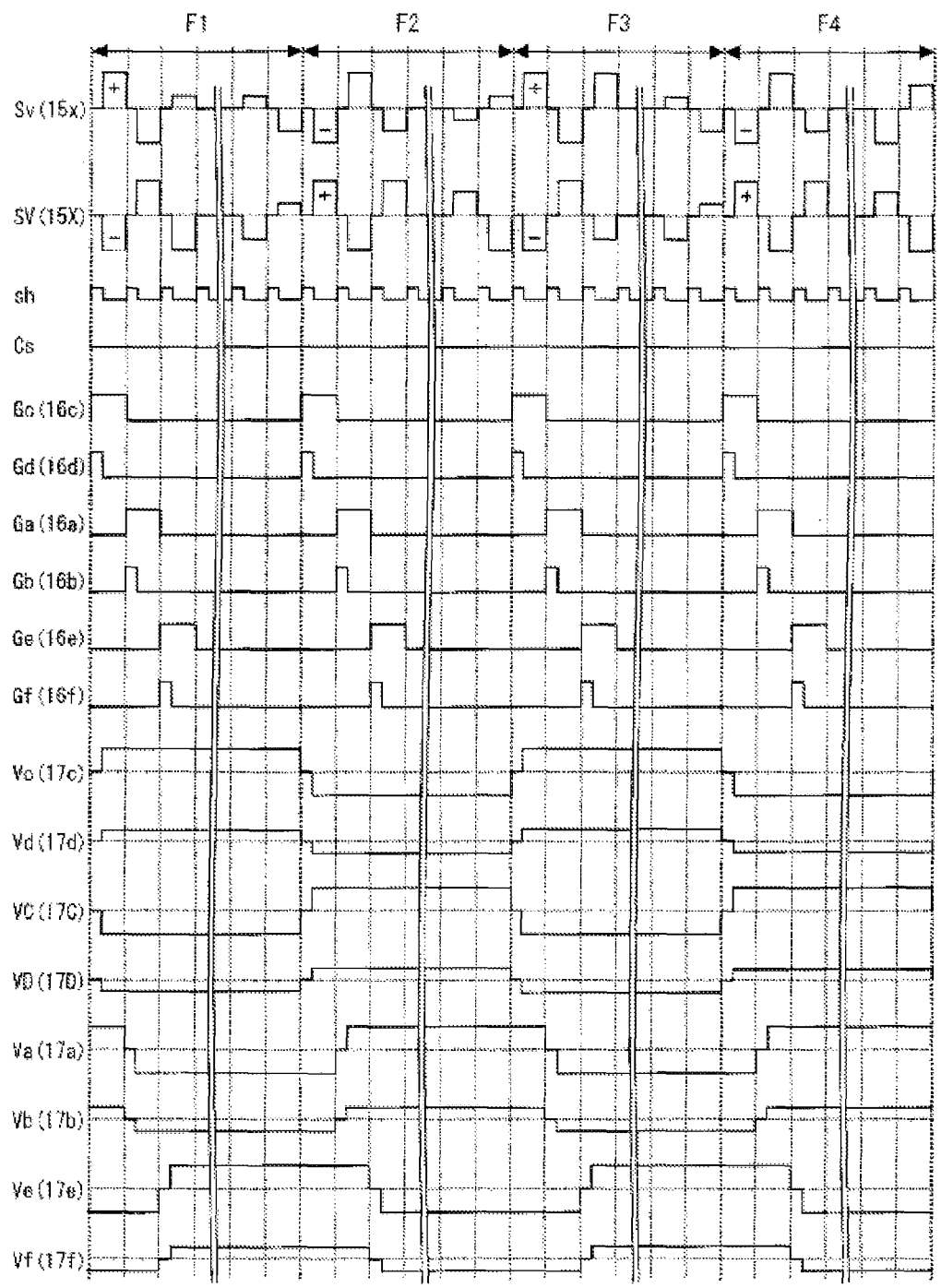
FIG. 18 is a timing chart showing a driving method of a liquid crystal display device that includes the liquid crystal panel 5a or 5b (driving method 1).

FIG. 18 is a timing chart that shows a driving method of the present liquid crystal display device equipped with the above-described liquid crystal panel 5a. Here, SV and Sv indicate signal potentials to be supplied to two adjacent data signal lines (for example, 15x, 15X), respectively; Ga to Gf indicate gate-on pulse signals to be supplied to scan signal lines 16a to 16f; Vc, Vd, Va, Vb, VC, VD indicate potentials of pixel electrodes 17c, 17d, 17a, 17b, 17C, 17D, respectively; sh indicates a charge-sharing signal; and Cs indicates a certain level of potential (Vcom) to be supplied to storage capacitance wirings 18x to 18z. Here, during the period "H" in which the charge-sharing signal is active, a charge-sharing is performed by short-circuiting all data signal lines, or supplying an identical potential to all data signal lines from outside.

According to this driving method, as shown in FIG. 18, the polarity of a signal potential supplied to a data signal line is reversed every horizontal scanning period (1H); the polarity of a signal potential supplied for the same numbered horizontal scanning period in respective frames is reversed every frame; signal potentials having reversed polarities are supplied to two adjacent data signal lines during one horizontal scanning period; and a charge-sharing is performed at the beginning of each horizontal scanning period Specifically, in F1 of sequential frames F1 to F4, a pair of upper and lower scan signal lines that correspond to one pixel is sequentially selected each time (for example, scan signal lines 16c, 16d->scan signal lines 16a, 16b->scan signal lines 16e, 16f; see FIG. 1). To one of the two adjacent data signal lines (for example, data signal line 15x), a signal potential having a positive polarity is supplied during the first horizontal scanning period (for example, a period including the writing period of the pixel electrodes 17c, 17d); a signal potential having a negative polarity is supplied during the second horizontal scanning period (for example, a period including the writing period of the pixel electrodes 17a, 17b); and a signal potential having a positive polarity is supplied during the third horizontal scanning period (for example, a period including the writing period of the pixel electrodes 17e, 17f). To the other one of the two data signal lines (for example, the data signal line 15X), a signal potential having a negative polarity is supplied during the first horizontal scanning period (for example, a period including the writing period of the pixel electrodes 17C, 17D); a signal potential having a positive polarity is supplied during the second horizontal scanning period (for example, a period including the writing period of the pixel electrodes 17A, 17B); and a signal potential having a negative polarity is supplied during the third horizontal scanning period (for example, a period including the writing period of the pixel electrodes 17E, 17F). Also, a charge-sharing potential (Vcom) is supplied at the beginning of each horizontal scanning period.

Here, the respective writing periods of the pixel electrode respectively connected to two scan signal lines that correspond to one pixel are set so as to differ from each other. Specifically, in FIG. 1, the period during which the scan signal line 16c is selected and therefore a signal potential having a positive polarity is written to the pixel electrode 17c is set to be longer than the period during which the scan signal line 16d is selected and therefore a Cs potential (Vcom) is written into the pixel electrode 17d; and the period during which the scan signal line 16a is selected and therefore a signal potential having a negative polarity is written to the pixel electrode 17a is set to be longer than the period during which the scan signal line 16b is selected and therefore a Cs potential (Vcom) is written into the pixel electrode 17b. Additionally, in one pixel, writing operations to the respective pixel electrodes are performed within the same horizontal scanning period, and the timings for the completion of the writing operations (active periods) to the respective pixel electrodes are set so that a shorter writing period ends before a longer writing period ends. Specifically, the writing operation into the pixel electrode 17d ends before a timing at which the writing operation into the pixel electrode 17c ends; the writing operation into the pixel 17D ends before a timing at which the writing operation into the pixel electrode 17C ends; and the writing operation into the pixel electrode 17b ends before a timing at which the writing operation into the pixel electrode 17a ends.

As described above, with regard to the gate-on pulse signal that is supplied to a scan signal line connected to a capacitively-coupled pixel electrode (second gate-on pulse signal), the pulse width thereof is shorter than that of a gate-on pulse signal that is supplied to a scan signal line connected to a pixel electrode into which a normal signal potential is written (first gate-on pulse signal). At the same time, the pulse width of the second gate-on pulse signal is set such that the second gate-on pulse signal turns inactive before the first gate-on pulse signal turns inactive. As a result, a subpixel including the pixel electrode 17c (positive polarity) becomes "bright"; a subpixel including the pixel electrode 17d (positive polarity) becomes "dark"; a subpixel including the pixel electrode 17C (negative polarity) becomes "bright"; a subpixel including the pixel electrode 17D (negative polarity) becomes "dark"; a subpixel including the pixel electrode 17a (negative polarity) becomes "bright"; and a subpixel including the pixel electrode 17b (negative polarity) becomes "dark."

In F2, the positive polarity and the negative polarity are reversed, as compared with F1. As a result, a subpixel including the pixel electrode 17c (negative polarity) becomes "bright"; a subpixel including the pixel electrode 17d (negative polarity) becomes "dark"; a subpixel including the pixel electrode 17C (positive polarity) becomes "bright"; a subpixel including the pixel electrode 17D (positive polarity) becomes "dark"; a subpixel including the pixel electrode 17a (positive polarity) becomes "bright"; and a subpixel including the pixel electrode 17b (positive polarity) becomes "dark." The same operations as those of F1, F2 are repeated in the subsequent frames F3, F4.

According to the present driving method, as described above, in each frame, it is possible to individually supply a signal potential to pixel electrodes (pixel electrodes 17d, 17b, 17D, 17B in FIGS. 1, 2) that are capacitively coupled to pixel electrodes (17c, 17a, 17C, 17A), which connected to data signal lines (15x, 15X) via transistors (12c, 12a, 12C, 12A), at timings different from the timings at which signal potentials are supplied to pixel electrodes (17c, 17a, 17C, 17A) to which a normal writing is performed. As a result, a liquid crystal display device using a pixel division system can be realized.

Further, in the present driving method, a Vcom signal is supplied to all pixel electrodes within one pixel area at the beginning of each horizontal scanning period, thereby resetting the potentials of the pixel electrodes to Vcom before the writing operation of normal signal potentials. Therefore, it becomes possible to discharge (refresh) electric charges accumulated in the above-described capacitively coupled pixel electrodes, and the occurrence of burn-in in subpixels including capacitively-coupled pixel electrodes are suppressed, thereby preventing the deterioration of display quality.

(Configuration of Gate Driver 1)

Figure 19:
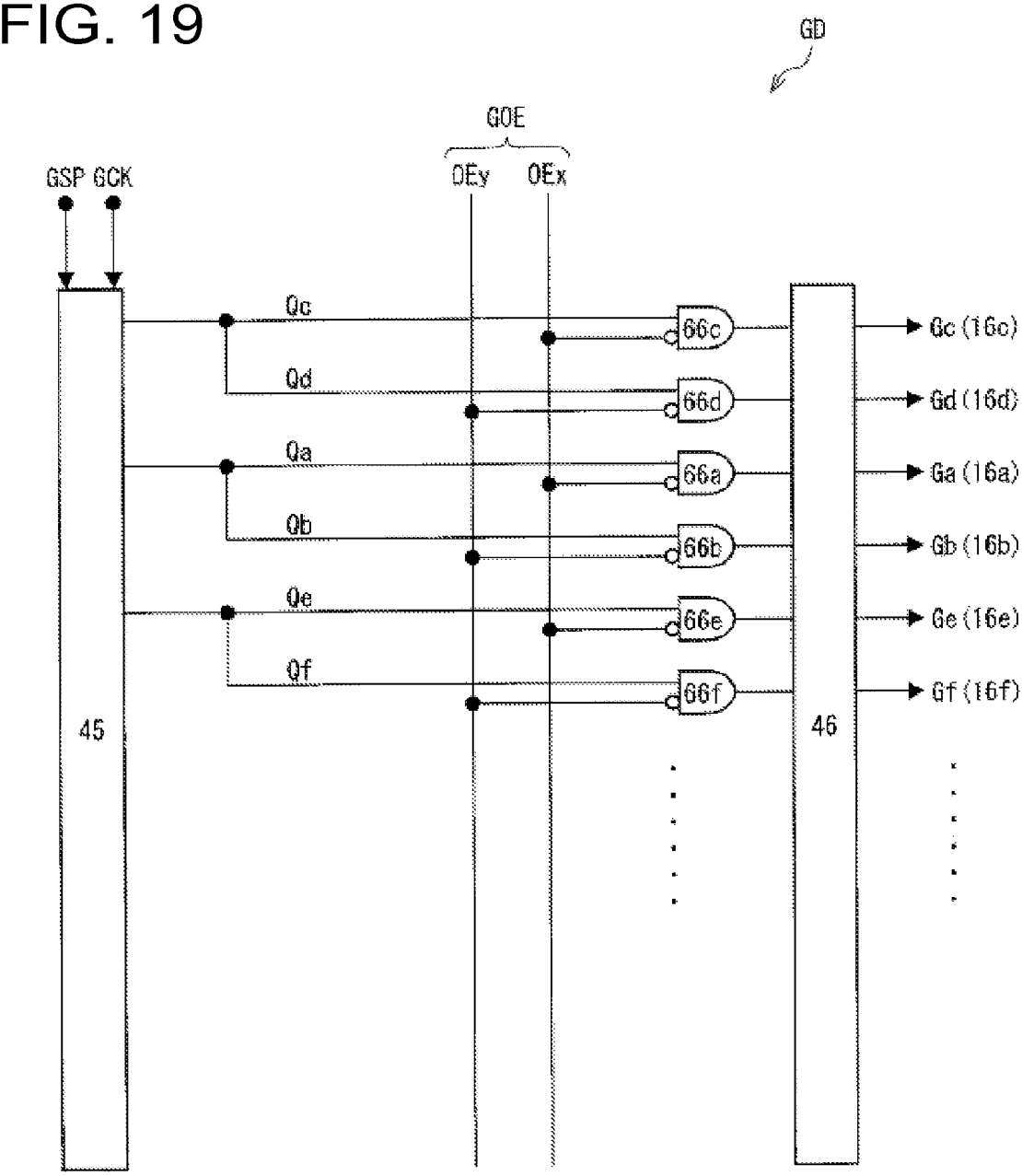
FIG. 19 is a circuit diagram showing a configuration of a gate driver that drives liquid crystal panels 5a, 5b.

FIG. 19 is a circuit diagram showing a configuration of a gate driver of the present liquid crystal display device for realizing the driving described in FIG. 18. As shown in FIG. 19, a gate driver GD includes a shift register 45, a plurality of AND circuits (66a to 66f) that are aligned in the column direction, and an output circuit 46. To the shift register 45, a gate start pulse signal GSP and a gate clock signal GCK are inputted. An output of each stage of the shift register 45 is divided into two lines, one of which is inputted to odd-numbered AND circuits and the other one to even-numbered AND circuits that are located adjacent to the odd-numbered AND circuits. Additionally, a gate driver output control signal GOE is composed of signals in two lines (OEx, OEy), and a reversed signal of the signal OEx is inputted to the odd-numbered AND circuits while a reversed signal of the signal OEy is inputted to the even-numbered AND circuits. Further, an output from a single AND circuit goes through the output circuit 46 to become a gate-on pulse signal, which is then supplied to a single scan signal line.

For example, an output from a certain stage of the shift register 45 is divided into two lines, one of which Qc is inputted to the AND circuit 66c, while the other one thereof Qd is inputted to the AND circuit 66d. Additionally, a reversed signal of the signal OEx is inputted to the AND circuit 66c, while a reversed signal of the signal OEy is inputted to the AND circuit 66d. Furthermore, an output from the AND circuit 66c enters the output circuit 46 to become a gate-on pulse signal Gc, which is supplied to the scan signal line 16c. Also, an output from the AND circuit 66d enters the output circuit 46 to become a gate-on pulse signal Gd, which is supplied to the scan signal line 16d.

In the same manner, an output from another stage of the shift register 45 is divided into two lines, one of which Qa is inputted to the AND circuit 66a, while the other one thereof Qb is inputted to the AND circuit 66b. Additionally, a reversed signal of the signal OEx is inputted to the AND circuit 66a, while a reversed signal of the signal OEy is inputted to the AND circuit 66b. Furthermore, an output from the AND circuit 66a enters the output circuit 46 to become a gate-on pulse signal Ga, which is supplied to the scan signal line 16a. Also, an output from the AND circuit 66b enters the output circuit 46 to become a gate-on pulse signal Gb, which is supplied to the scan signal line 16b.

Figure 20:
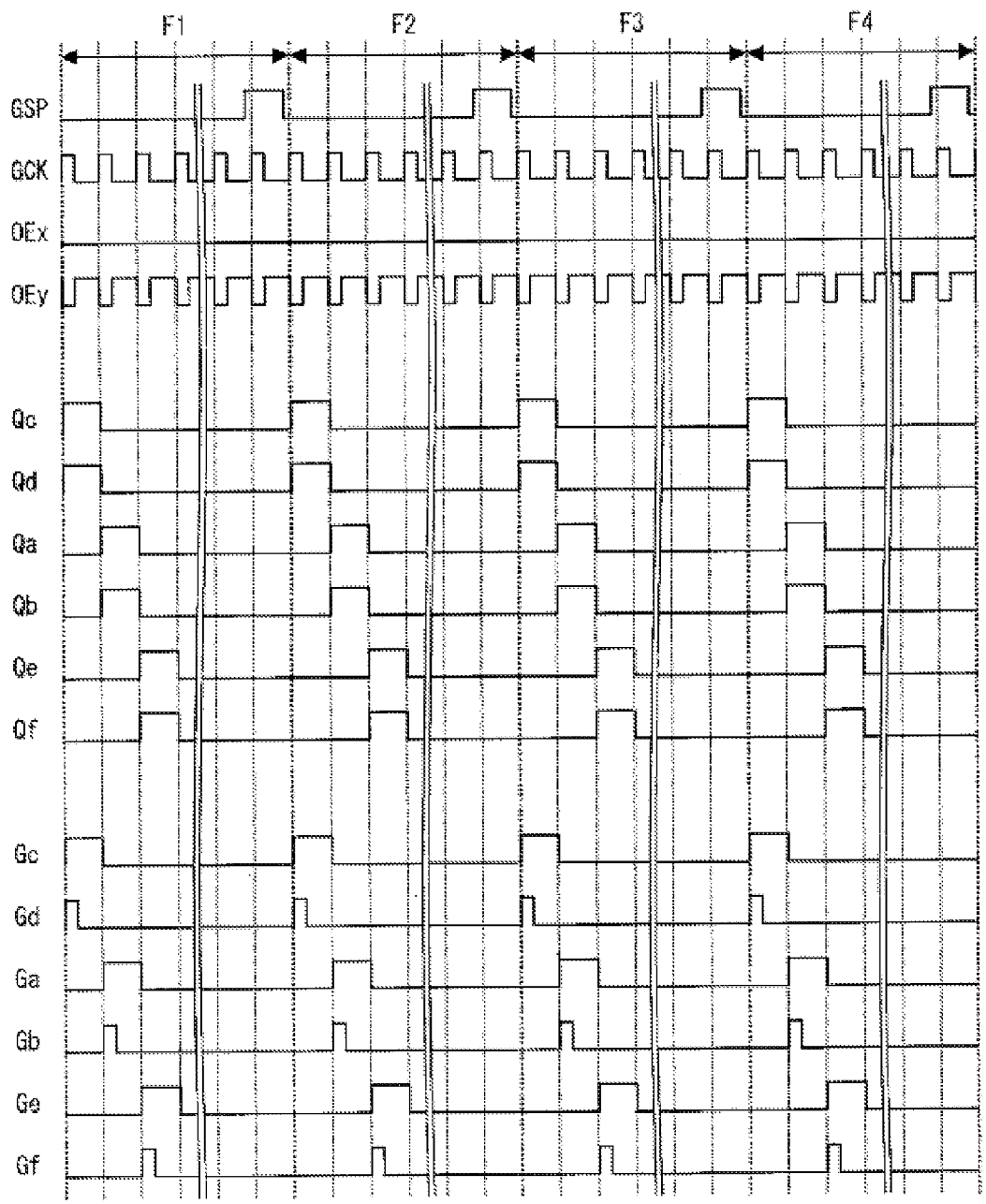
FIG. 20 is a timing chart showing a driving method of a gate driver shown in FIG. 19.

FIG. 20 is a timing chart showing an operation of a gate driver of FIG. 19. As shown in FIG. 20, for example, the signal OEx is always "L" at each frame, while the signal OEy becomes "L" at a front edge portion of each horizontal scanning period. Note that the signal OEx does not always have to be "L" and can be "H" at a rear edge portion of each horizontal scanning period when the fall of the waveform of the gate-on pulse becomes slow and overlaps the subsequent horizontal scanning period. That way, the gate-on pulse signals Gc, Ga, Ge can sequentially become "H" (active), and at the same time, the gate-on pulse signals Gd, Gb, Gf can sequentially become "H" (active). Also, the width ("H" period (active period)) of the gate-on pulse signal (writing pulse) can be set differently for the gate-on pulse signals Gc, Ga, Ge and for the gate-on pulse signals Gd, Gb, Gf, respectively. As a result, such a driving as shown in FIG. 18 can be realized.

Here, according to the configuration of FIG. 19, in addition to an advantage that the width of the gate-on pulse (writing pulse) can be accordingly set, it is also possible to generate gate-on pulse signals, which are to be supplied respectively to two scan signal lines corresponding to one pixel, using an output from the same stage of one shift register, thereby obtaining an additional advantage that the configuration of the driver can be simplified.

(Driving Method 2)

Figure 21:
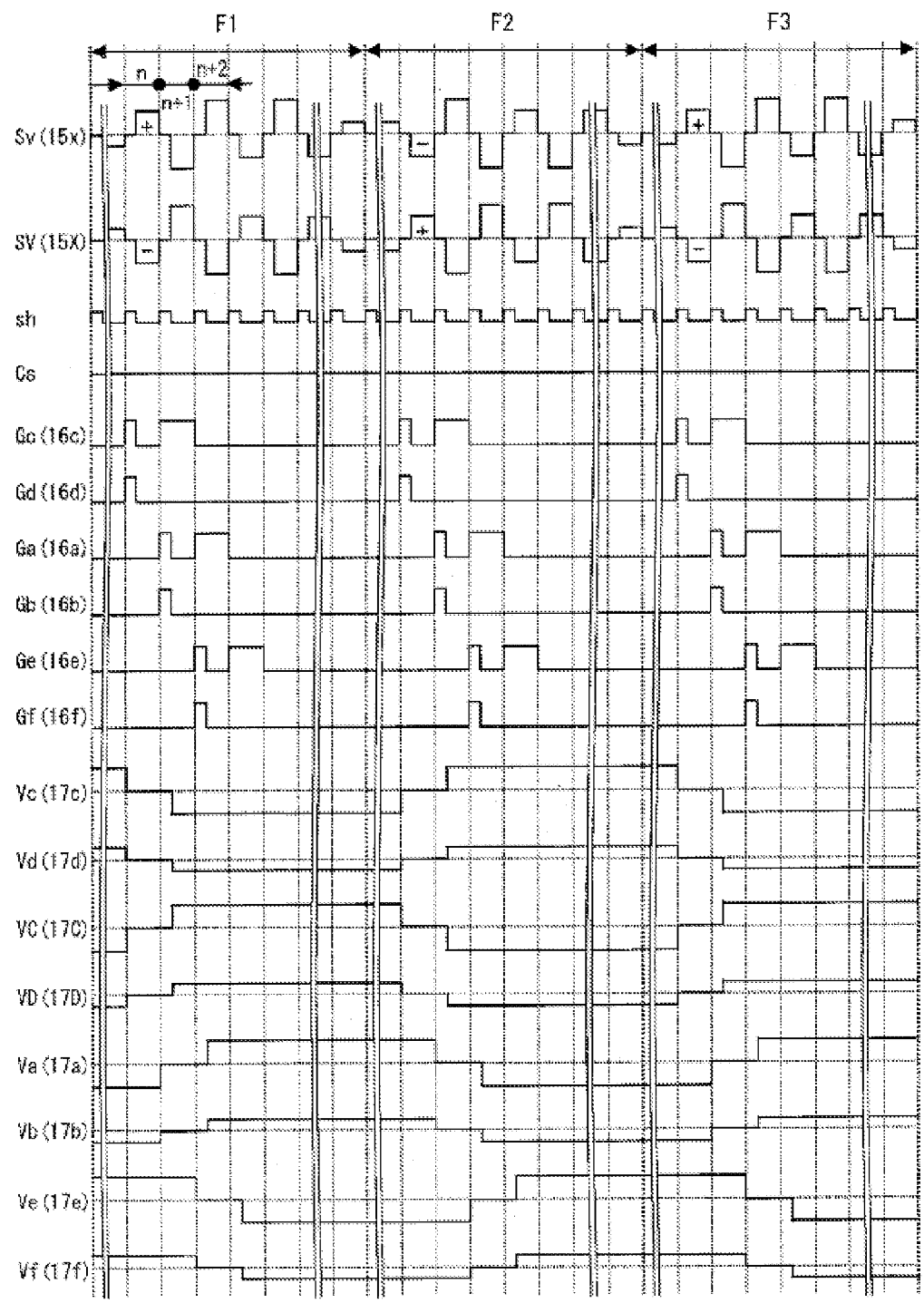
FIG. 21 is a timing chart showing another driving method of a liquid crystal display device that includes liquid crystal panel 5a or 5b (driving method 2).

FIG. 21 is a timing chart showing another driving method of the present liquid crystal display device. Reference characters shown in this figure are identical to those shown in FIG. 18. Also in this driving method, similarly to the method shown in FIG. 18, the polarity of a signal potential supplied to a data signal line is reversed every horizontal scanning period (1H); the polarity of a signal potential supplied for the same numbered horizontal scanning period in respective frames is reversed every frame; and signal potentials having reversed polarities are supplied to two adjacent data signal lines during one horizontal scanning period; and a charge-sharing is performed at the beginning of each horizontal scanning period This driving method supplies Vcom to all of the pixel electrodes within one pixel area by selecting at the same time a pair of the upper and lower scan signal lines for that one pixel during a horizontal scanning period immediately prior to the normal writing.

Specifically, in F1 of sequential frames F1 to F4, the upper and lower scan signal lines for each pixel is progressively selected as a pair (for example, scan signal lines 16c, 16d->scan signal lines 16a, 16b; see FIG. 1). To one of the two adjacent data signal lines (for example, a data signal line 15x), a signal potential having a positive polarity is supplied during the n-th horizontal scanning period, and a Vcom signal is supplied at the beginning of that period; a signal potential having a negative polarity is supplied during the (n+1)-th horizontal scanning period (for example, a period including the writing period of the pixel electrode 17c) and a Vcom signal is supplied at the beginning of that period; and a signal potential having a positive polarity is supplied during the (n+2)-th horizontal scanning period (for example, a period including the writing period of the pixel electrode 17a) and a Vcom signal is supplied at the beginning of that period. To the other one of the above-mentioned two data signal lines (for example, the data signal line 15X), a signal potential having a negative polarity is supplied during the n-th horizontal scanning period and a Vcom signal is supplied at the beginning of that period; a signal potential having a positive polarity is supplied during the (n+1)-th horizontal scanning period (for example, a period including the writing period of the pixel electrodes 17C) and a Vcom signal is supplied at the beginning of that period; and a signal potential having a negative polarity is supplied during the (n+2)-th horizontal scanning period (for example, a period including the writing period of the pixel electrodes 17A) and a Vcom signal is supplied at the beginning of that period.

As a result, a subpixel including the pixel electrode 17c (negative polarity) becomes "bright"; a subpixel including the pixel electrode 17d (negative polarity) becomes "dark"; a subpixel including the pixel electrode 17C (positive polarity) becomes "bright"; a subpixel including the pixel electrode 17D (positive polarity) becomes "dark"; a subpixel including the pixel electrode 17a (positive polarity) becomes "bright"; and a subpixel including the pixel electrode 17b (positive polarity) becomes "dark."

With respect to the pixel 101, both transistors 12a, 12b are turned on during a horizontal scanning period (n+1) that is immediately prior to a horizontal scanning period (n+2) in which a normal writing is performed, and as a result, Vcom is supplied from the data signal line 15x and the storage capacitance wiring 18x to the pixel electrode 17a to which a normal signal potential is going to be written and to the pixel electrode 17b that is capacitively coupled to the same pixel electrode 17a, respectively. Further, while Vcom is being supplied, both transistors 12a, 12b are turned off. As a result, a signal potential having a negative polarity, which is supplied to the data signal 15x during the (n+1)-th horizontal scanning period, is supplied to the pixel electrode 17c of the previous row as a normal writing signal, but is not supplied to the pixel electrode 17a of the pixel 101. During the next (n+2)-th horizontal scanning period, only the transistor 12a is turned on, and after Vcom is supplied to the pixel electrode 17a at the beginning of that period, a signal potential having a positive polarity is supplied to the pixel electrode 17a as a normal writing signal.

According to the aforementioned driving method, in F1, a subpixel including the pixel electrode 17c (negative polarity) becomes "bright"; a subpixel including the pixel electrode 17d (negative polarity) becomes "dark"; a subpixel including the pixel electrode 17C (positive polarity) becomes "bright"; a subpixel including the pixel electrode 17D (positive polarity) becomes "dark"; a subpixel including the pixel electrode 17a (positive polarity) becomes "bright"; and a subpixel including the pixel electrode 17b (positive polarity) becomes "dark."

Also, in F2, the positive polarity and the negative polarity are reversed, as compared with F1. As a result, a subpixel including the pixel electrode 17c (positive polarity) becomes "bright"; a subpixel including the pixel electrode 17d (positive polarity) becomes "dark"; a subpixel including the pixel electrode 17C (negative polarity) becomes "bright"; a subpixel including the pixel electrode 17D (negative polarity) becomes "dark"; a subpixel including the pixel electrode 17a (negative polarity) becomes "bright"; and a subpixel including the pixel electrode 17b (negative polarity) becomes "dark." The same operations as those of the frames F1, F2 are repeated in the subsequent frames F3, F4.

According to the present driving method, as described above, by the time the transistor 12b is turned off, Vcom has been supplied from the data signal 15x to the pixel electrode 17a, and Vcom has been supplied from the storage capacitance wiring 18x to the pixel electrode 17b. In other words, at a time a normal signal potential is going to be written into the pixel electrode 17a, the potential of the pixel electrodes 17a, 17b has been fixed (reset) to Vcom. As a result, it becomes possible to ensure the discharge of electric charges accumulated in the capacitance coupling electrode (pixel electrode 17b) and also to prevent the deterioration of display quality.

Here, in the present driving method, it is configured such that the above-mentioned reset operation is performed during a horizontal scanning period (1H) immediately prior to a horizontal scanning period in which a normal writing is performed. However, the timing to perform this reset operation is not particularly limited and can be two or more H periods prior to the normal writing. Further, the frequency of the above-mentioned reset operation is not limited to one time, but can be multiple times.

(Configuration of Gate Driver 2)

Figure 22:
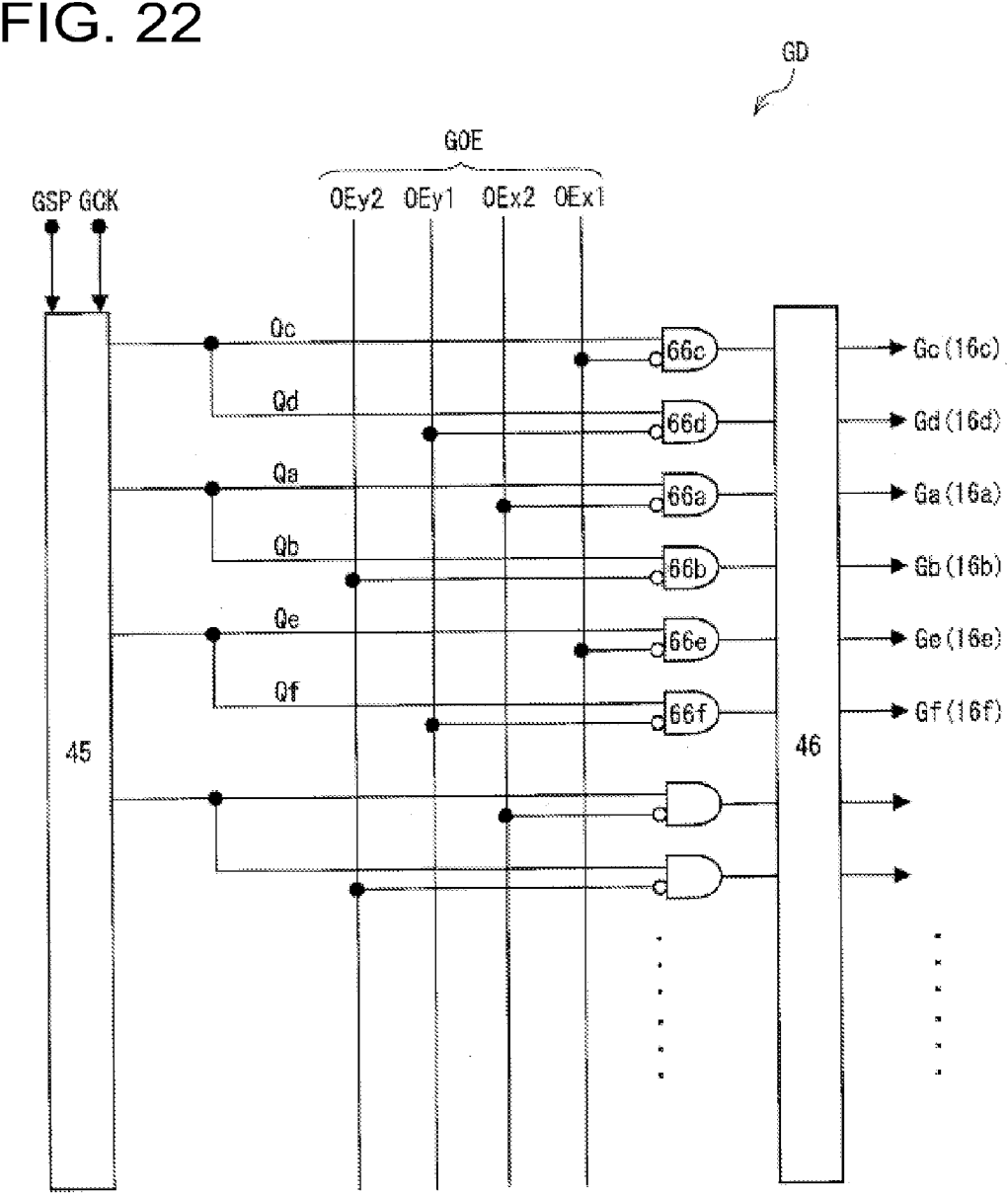
FIG. 22 is a circuit diagram showing another configuration of a gate driver that drives liquid crystal panels 5a, 5b.

FIG. 22 is a circuit diagram showing a configuration of a gate driver of the present liquid crystal display device for realizing the driving shown in FIG. 21. As shown in FIG. 22, a gate driver GD includes a shift register 45, a plurality of AND circuits (66a to 66O aligned in the column direction, and an output circuit 46. To the shift register 45, a gate start pulse signal GSP and a gate clock signal GCK are inputted. An output of each stage of the shift register 45 is divided to two lines, one of which is inputted to odd-numbered AND circuits, while the other one is inputted to even-numbered AND circuits that are located adjacent to the respective aforementioned odd-numbered AND circuits. Also, a gate driver output control signal GOE is composed of four pieces of signals (OEx1, OEx2, OEy1, OEy2), and reversed signals of the signals OEx1, OEx2 are sequentially inputted to the odd-numbered AND circuits, while reversed signals of the signals OEy1, OEy2 are sequentially inputted to the even-numbered AND circuits. Further, an output from each AND circuit enters the output circuit 46 to become a gate-on pulse signal, which is supplied to a single scan signal line.

For example, an output from a given stage of the shift register 45 is divided into two lines, one of which Qc is inputted to the AND circuit 66c, while the other one thereof. Qd is inputted to the AND circuit 66d. Also, a reversed signal of the signal OEx1 is inputted to the AND circuit 66c, while a reversed signal of the signal OEy1 is inputted to the AND circuit 66d. Also, an output from the AND circuit 66c enters the output circuit 46 to become a gate-on pulse signal Gc, which is supplied to the scan signal line 16c. Also, an output from the AND circuit 66d enters the output circuit 46 to become a gate-on pulse signal Gd, which is supplied to the scan signal line 16d.

In the same manner, an output from another stage of the shift register 45 is divided into two lines, one of which Qa is inputted to the AND circuit 66a, while the other one thereof. Qb is inputted to the AND circuit 66b. Also, a reversed signal of the signal OEx2 is inputted to the AND circuit 66a, while a reversed signal of the signal OEy2 is inputted to the AND circuit 66b. Further, an output from the AND circuit 66a enters the output circuit 46 to become a gate-on pulse signal Ga, which is supplied to the scan signal line 16a. Also, an output from the AND circuit 66b enters the output circuit 46 to become a gate-on pulse signal Gb, which is supplied to the scan signal line 16b.

Figure 23:
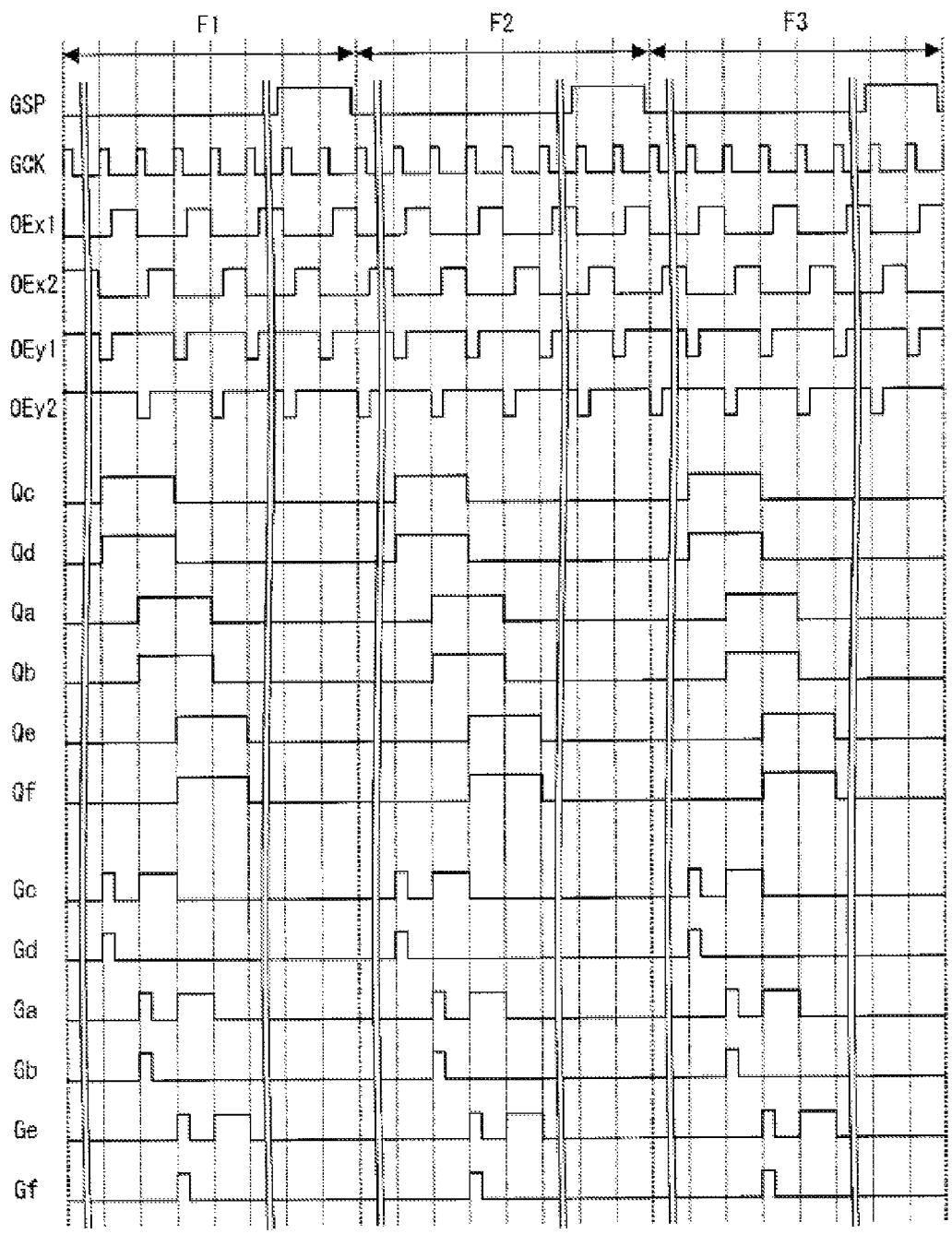
FIG. 23 is a timing chart showing a driving method of a gate driver shown in FIG. 22.

FIG. 23 is a timing chart showing an operation of a gate driver of FIG. 22. As shown in FIG. 23, signals OEx1, OEx2 are constructed, for example, in the unit of two horizontal scanning periods (2H), respectively, and respectively become "L" in one H period (1H) of the two H periods (2H), and becomes "L" in the front edge portion of the other 1H period and becomes "H" (active) during the rest. Additionally, the signals OEx1, OEx2 are shifted from each other by a 1H period. Meanwhile, signals OEy1, OEy2 are constructed in the unit of two horizontal scanning periods (2H), respectively, and respectively become "L" in the front edge portion of the 1H period of the 2H periods, and becomes "H" (active) during the rest of that 1H period and during the other 1H period. Also, the signals OEy1, OEy2 are shifted from each other by 1H period. For an output Q of the shift register 45, signals that become "H" during two horizontal scanning periods (2H) are sequentially outputted from each stage. As a result, such a driving as shown in FIG. 21 can be realized.

(Driving Method 3)

Figure 24:
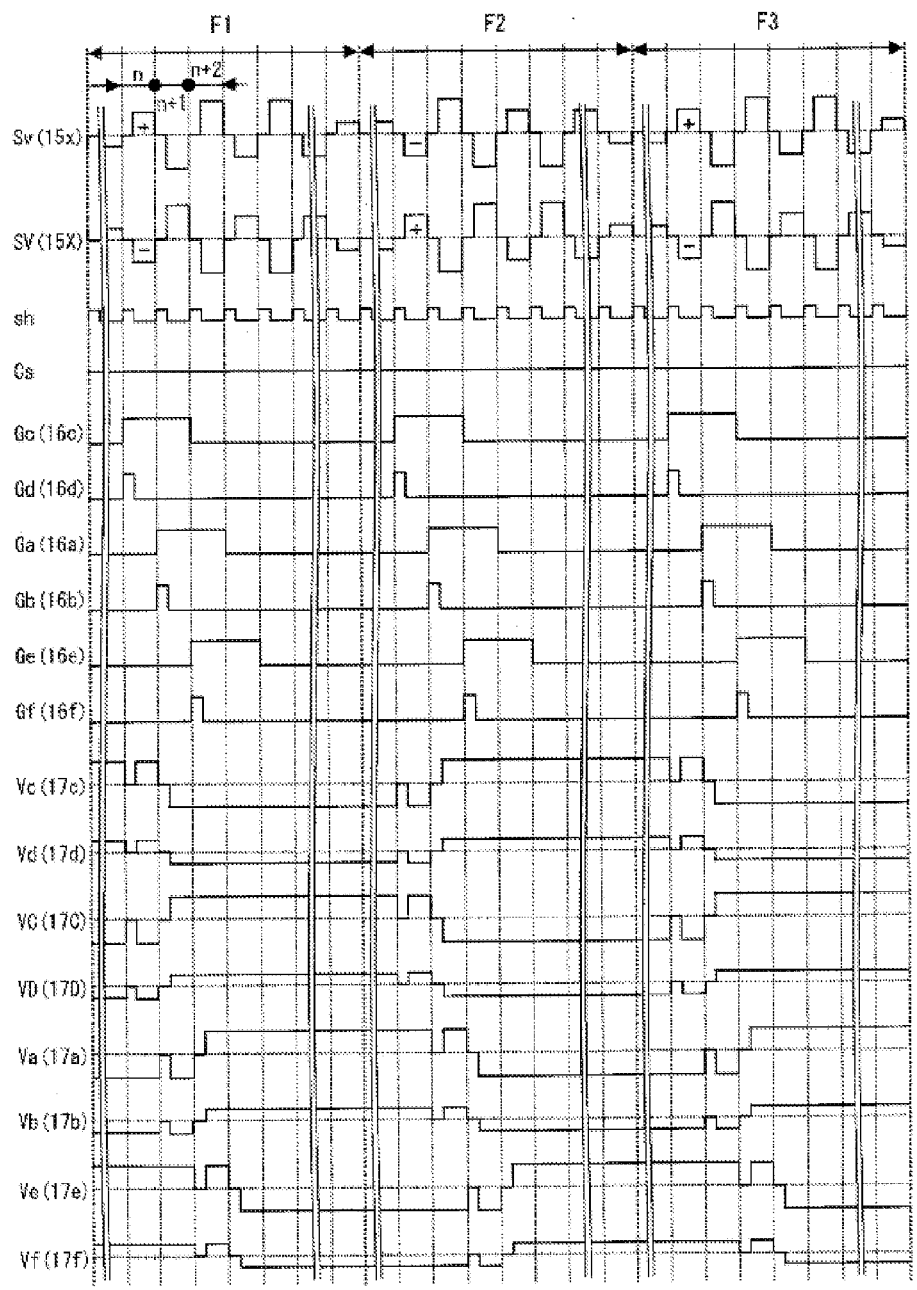
FIG. 24 is a timing chart showing another driving method of a liquid crystal display device that includes the liquid crystal panel 5a or 5b (driving method 3).

FIG. 24 is a timing chart that shows another driving method of the present liquid crystal display device. According to the above-mentioned driving method 2, during one preceding horizontal scanning period before the normal writing, both transistors 12a, 12b are turned off after Vcom is supplied to the pixel electrodes 17a, 17b and until the normal writing is performed to the pixel electrode 17a. According to the present driving method, on the other hand, during one preceding horizontal scanning period before the normal writing, only the transistor 12b is turned off after Vcom is supplied to the pixel electrodes 17a, 17b, and a signal potential is supplied to the pixel electrode 17a while the transistor 12a remains on. In the following, contents that duplicate those of the driving method 2 are omitted, and the differences from the driving method 2 are mainly explained specifically by taking a pixel 101 as an example.

With respect to the pixel 101, both transistors 12a, 12b are turned on during one preceding horizontal scanning period (n+1) before a horizontal scanning period during which a normal writing is performed (n+2), and Vcom is supplied from a data signal line 15x and a storage capacitance wiring 18x to a pixel electrode 17a to which a normal signal potential is written and to a pixel electrode 17b that is capacitively coupled to the same pixel electrode 17a, respectively. Further, while Vcom is being supplied, only the transistor 12b is turned off. As a result, a signal potential having a negative polarity, which is supplied to the data signal line 15x during the (n+1)-th horizontal scanning period, is supplied to the pixel electrode 17c of the previous row as a normal writing signal; and at the same time, a signal potential identical to that signal potential is supplied to the pixel electrode 17a in the pixel 101. In other words, a data signal (signal potential) for the pixel electrode 17c of the previous row is written into the pixel electrode 17a during one horizontal scanning period (1H) immediately prior to the normal writing. Since the transistor 12a remains on, Vcom is supplied to the pixel electrode 17a at the beginning of the next (n+2) horizontal scanning period, and then a signal potential having a positive polarity is supplied thereto as a normal writing signal during the same period.

According to the present driving method, as described above, in a manner similar to that of the aforementioned driving method 2, Vcom has been supplied from the data signal line 15x to the pixel electrode 17a and from the storage capacitance wiring 18x to the pixel electrode 17b when the transistor 12b is turned off. Because of this, when a normal signal potential is going to be written into the pixel electrode 17a, the potential of the pixel electrodes 17a, 17b can be fixed (reset) to Vcom. Therefore, even if a signal potential other than a normal signal potential is supplied to the pixel electrode 17a after the potential of both pixel electrodes 17a, 17b is once reset to Vcom, the total sum of capacitances at the pixel electrodes 17a, 17b does not change. As a result, it becomes possible to ensure the discharging of electric charges accumulated in a capacitance coupling electrode (pixel electrode 17b) and also to prevent the deterioration of display quality.

(Configuration of Gate Driver 3)

Figure 25:
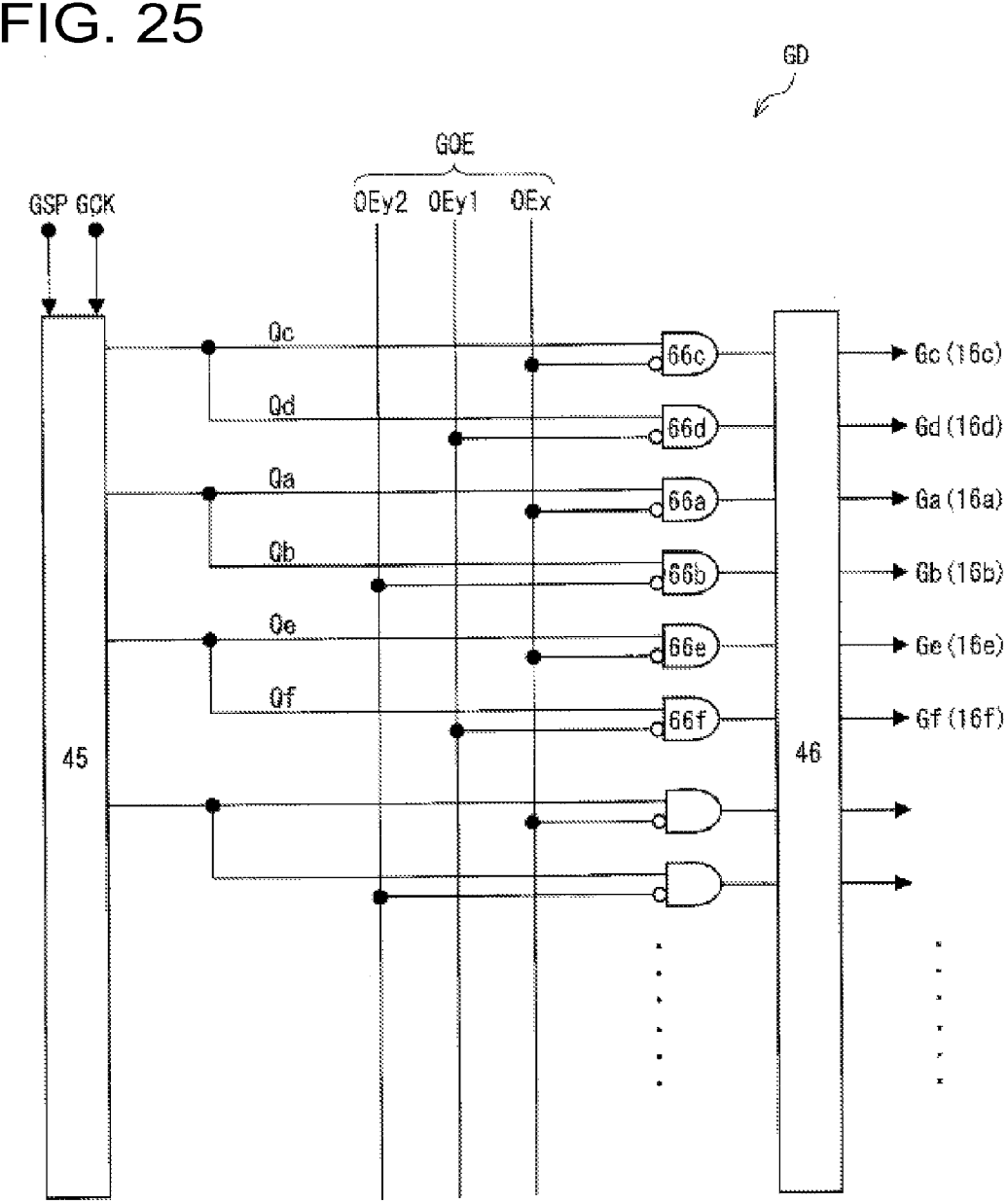
FIG. 25 is a circuit diagram showing another configuration of a gate driver that drives liquid crystal panels 5a, 5b.

FIG. 25 is a circuit diagram showing a configuration of a gate driver of the present liquid crystal display device for realizing the driving described in FIG. 24. As shown in FIG. 25, a gate driver GD includes a shift register 45, a plurality of AND circuits (66a to 66o) aligned in the column direction, and an output circuit 46. To the shift register 45, a gate start pulse signal GSP and a gate clock signal GCK are inputted. An output of each stage of the shift register 45 is divided into two lines, one of which is inputted to odd-numbered AND circuits, while the other one is inputted to even-numbered AND circuits that are located adjacent to the aforementioned odd-numbered AND circuits, respectively. Also, a gate driver output control signal GOE is composed of three pieces of signals (OEx, OEy1, OEy2), and a reversed signal of the signal OEx is inputted to the odd-numbered AND circuits, while reversed signals of the signals OEy1, OEy2 are sequentially inputted to the even-numbered AND circuits. Further, an output from one AND circuit enters the output circuit 46 and becomes a gate-on pulse signal, which is supplied to a single scan signal line.

An output from a certain stage of the shift register 45 is divided into two lines, one of which Qc is inputted to an AND circuit 66c, while the other one Qd is inputted to an AND circuit 66d, for example. Also, a reversed signal of the signal OEx is inputted to the AND circuit 66c, while a reversed signal of the signal OEy1 is inputted to the AND circuit 66d. And, an output from the AND circuit 66c goes through the output circuit 46 and becomes a gate-on pulse signal Gc, which is supplied to the scan signal line 16c. Also, an output from the AND circuit 66d goes through the output circuit 46 to become a gate-on pulse signal Gd, which is supplied to the scan signal line 16d.

In the same manner, an output from another stage of the shift register 45 is divided into two lines, one of which Qa is inputted to an AND circuit 66a, while the other one Qb is inputted to an AND circuit 66b. Also, a reversed signal of the signal OEx is inputted to the AND circuit 66a, while a reversed signal of the signal OEy2 is inputted to the AND circuit 66b. Further, an output from the AND circuit 66a enters the output circuit 46 to become a gate-on pulse signal Ga, which is supplied to the scan signal line 16a. Also, an output from the AND circuit 66b enters the output circuit 46 to become a gate-on pulse signal Gb, which is supplied to the scan signal line 16b.

Figure 26:
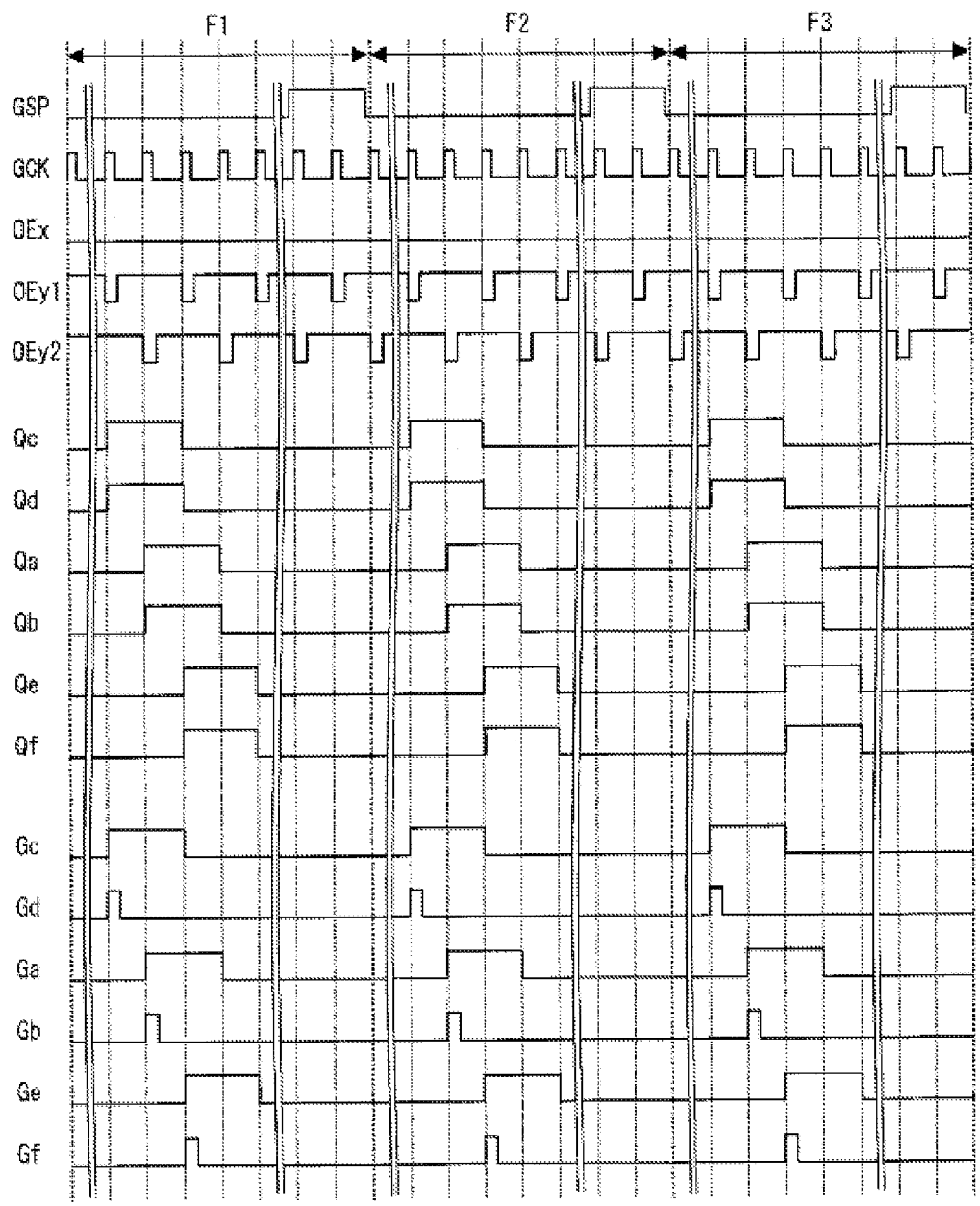
FIG. 26 is a timing chart showing a driving method of a gate driver shown in FIG. 25.

FIG. 26 is a timing chart showing an operation of a gate driver in FIG. 25. For example, as shown in FIG. 26, a signal OEx is always "L" in each frame. Here, the signal OEx does not always have to be "L" but instead can be "L" only at a rear edge portion of each horizontal scanning period when the fall of the waveforms of the gate-on pulse becomes slow and overlaps the subsequent horizontal scanning period. The signals OEy1, OEy2 are respectively constructed in the unit of two horizontal scanning periods (2H). In one 1H period of the 2H periods, the signals becomes "L" in a front edge portion of the 1H period and the rest thereof, and becomes "H" (active) in the other 1H period of the 2H periods. Further, the signals OEy1, OEy2 are shifted from each other by 1H period. For outputs Q of the shift register 45, signals that become and remain "H" during two consecutive horizontal scanning periods are outputted sequentially from respective stages. As a result, the driving shown in FIG. 24 can be realized.

(Driving Method 4)

Figure 27:
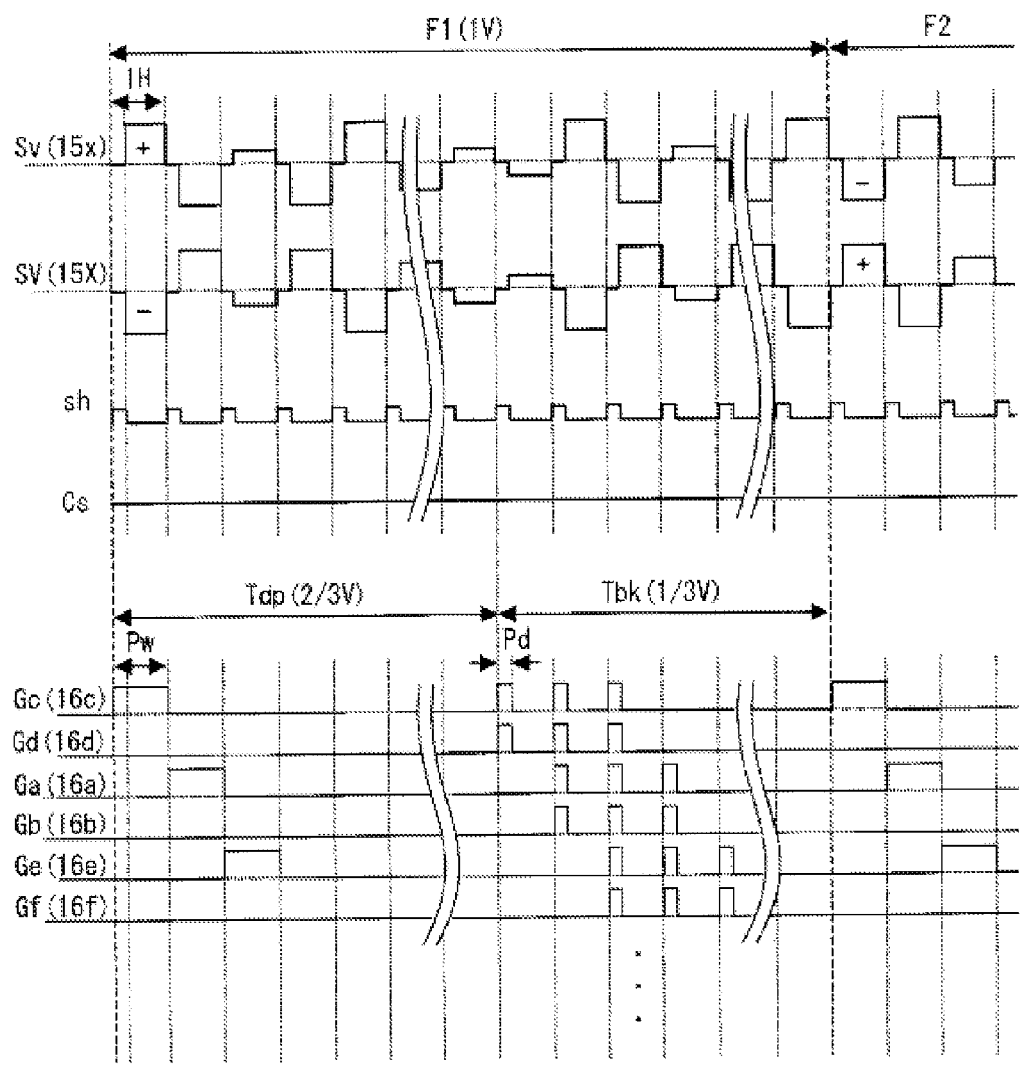
FIG. 27 is a timing chart showing another driving method of a liquid crystal display device that the liquid crystal panel 5a or 5b (driving method 4).

FIG. 27 is a timing chart showing another driving method of the present liquid crystal display panel. Reference characters used in this figure are the same as those used in FIG. 18. According to this driving method, similar to FIG. 18, the polarity of a signal potential that is supplied to a data signal line is reversed every horizontal scanning period (1H); the polarity of a signal potential that is supplied during the same numbered horizontal scanning period in respective frames is reversed every frame; signal potentials having reversed polarities are supplied to two adjacent data signal lines during one horizontal scanning period; and a charge-sharing is performed at the beginning of each horizontal scanning period.

According to the present driving method, conceptually, after a predetermined period (for example, approximately two-thirds (⅔V) of one vertical scanning period (1V)) has passed following the normal writing of a signal potential to a pixel electrode (pixel electrodes 17a, 17c, 17e, 17A, 17C, 17E shown in FIG. 1), a signal potential (Vcom) for discharging (refreshing) electric charges is supplied to the pixel electrode (17a, 17c, 17e, 17A, 17C, 17E) as well as to the capacitance coupling electrode (pixel electrodes 17b, 17d, 17f, 17B, 17D, 17F) that is capacitively coupled to the aforementioned pixel electrode. As a result, it becomes possible to insert a period of black display to every display line, which leads to such advantages that accumulated electric charge can be discharged from the capacitance coupling electrodes and that trailing afterimages can be reduced due to the impulse driving.

Specifically, in F1, during the ⅔ V period, one of the upper and lower scan signal lines for respective pixels is progressively selected (for example, as in the scan signal line 16c->the scan signal line 16a->the scan signal line 16e; see FIG. 1). To one of the two adjacent data signal lines (for example, the data signal line 15x), a signal potential having a positive polarity is supplied during the first horizontal scanning period (for example, a period including the writing period of the pixel electrodes 17c, 17d); a signal potential having a negative polarity is supplied thereto during the second horizontal scanning period (for example, a period including the writing period of the pixel electrodes 17a, 17b); and a signal potential having a positive polarity is supplied thereto during the third horizontal scanning period (for example, a period including the writing period of the pixel electrodes 17e, 17f). To the other one of the two data signal lines (for example, the data signal line 15X), a signal potential having a negative polarity is supplied during the first horizontal scanning period (for example, a period including the writing period of the pixel electrodes 17C, 17D); a signal potential a having positive polarity is supplied thereto during the second horizontal scanning period (for example, a period including the writing period of the pixel electrodes 17A, 17B); and a signal potential having a negative polarity is supplied thereto during the third horizontal scanning period (for example, a period including the writing period of the pixel electrodes 17E, 17F). Here, at the beginning of each horizontal scanning period, a charge-sharing potential (Vcom) is supplied.

During the remaining ⅓ V period, at the beginning of each horizontal scanning period, the pairs of upper and lower scan signal lines for respective pixels are sequentially selected (for example, the scan signal lines 16c, 16d->the scan signal lines 16a, 16b->the scan signal lines 16e, 16f; see FIG. 1), and Vcom is supplied to the corresponding data signal lines (for example, the data signal lines 15x, 15X).

With respect to the pixel 101, in the pixel electrode 17a, for example, a potential of the data signal line 15x connected to a source terminal of a transistor 12a is supplied to the pixel electrode 17a via the transistor 12a during a period when the transistor 12a is on due to a pixel data writing pulse Pw included in the gate-on pulse signal Ga. As a result, a data signal Sv as a voltage of the data signal line 15x is written into the pixel electrode 17a. Then, after an image display period Tdp passes, black voltage application pulses Pd are supplied to the respective gate terminals of the transistors 12a, 12b, and while the transistors 12a, 12b are on, the pixel electrode 17a is connected to the data signal line 15x via the transistor 12a and the pixel electrode 17b is connected to the storage capacitance wiring 18x via the transistor 12b. As a result, accumulated electric charges at the pixel capacitance of the pixel electrode 17b are discharged, and a black voltage (Vcom) is maintained at the pixel capacitances of the pixel electrodes 17a, 17b.

Therefore, at the pixel 101, during the image display period Tdp, a display pixel based on a digital image signal is formed by holding, at the pixel capacitance, a voltage that corresponds to a potential of the data signal line 15x supplied to the pixel electrode 17a via the transistor 12a. Meanwhile, a pixel of black is formed by holding a black voltage (Vcom) at the pixel capacitance during the Tbk period, which includes a period after the black voltage application pulses Pd appears on gate-on pulse signals Ga, Gb that are provided to gate terminals of the transistors 12a, 12b, respectively, until a next pixel data writing pulse Pw appears on the gate-on pulse signal Ga (a period equivalent to one frame period or 1V minus an image display period Tdp).

Here, since the pulse width of the black voltage application pulses Pd is short, at least two or preferably three or more black voltage application pulses Pd are sequentially applied to the aforementioned scan signal lines at an interval of the horizontal scanning period (1H) during each frame period so as to ensure that the holding voltage in the pixel capacitance be at the black voltage. In FIG. 27, three consecutive black voltage application pulses Pd appear at an interval of one horizontal scanning period (1H) in one frame period (1V).

According to the present driving method, by inserting a period of black display to every display line, the display is impulse-driven while avoiding an increase in complexity of drive circuits and operation frequency. As a result, in addition to the advantage of discharging accumulated electric charges, trailing afterimages of moving images can be suppressed, thereby improving the display quality of moving images.

Figure 28:
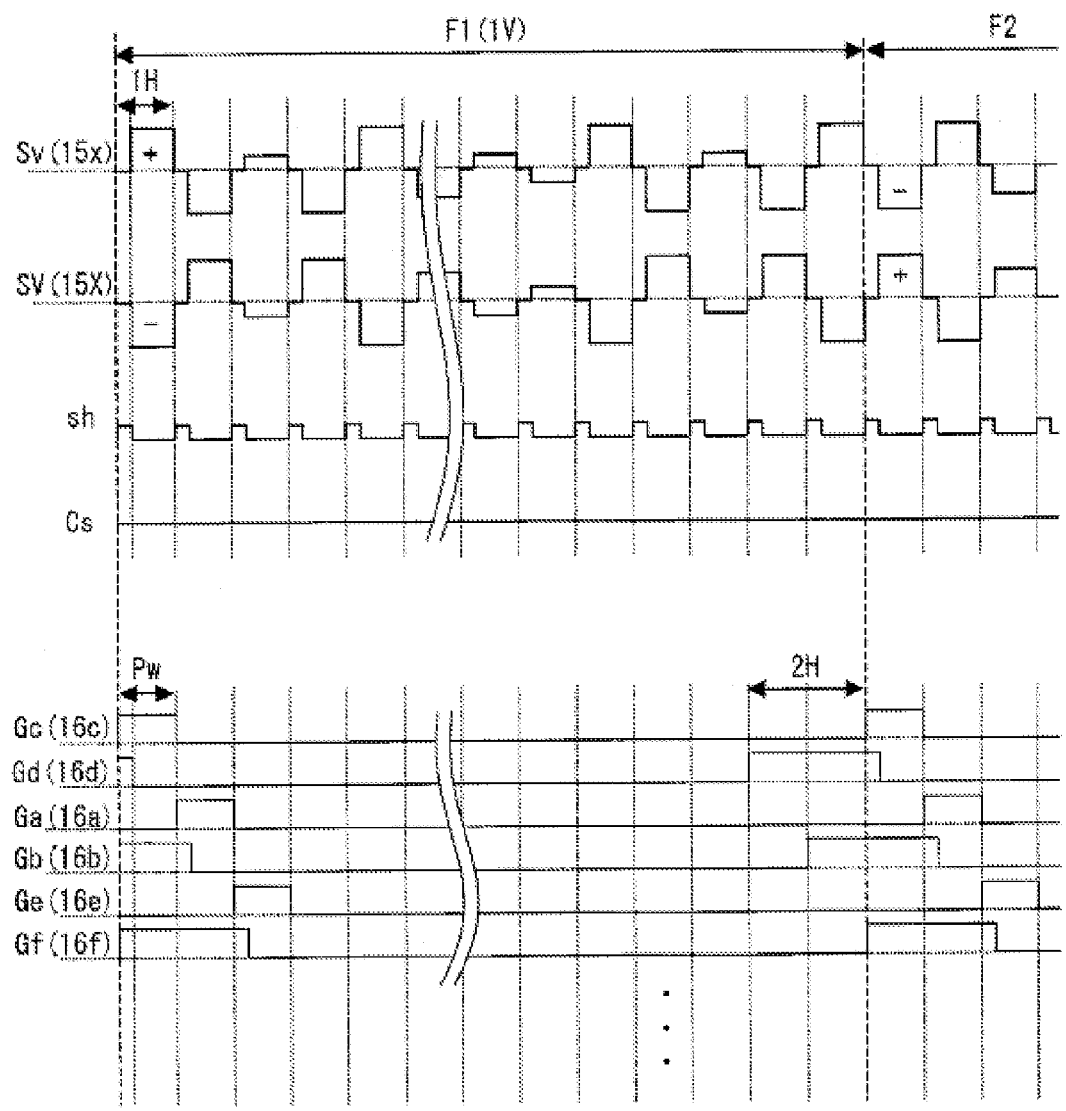
FIG. 28 is a timing chart showing another driving method of a driving method shown in FIG. 18.

For the liquid crystal display device of the present first embodiment, a driving method shown in FIG. 28 may also be adopted. Specifically, as shown in FIG. 28, the period during which scan signal lines (16b, 16d, 16f) for discharging electric charges are on (gate-on pulse width) is set to two horizontal scanning periods (2H). Therefore, in the pixel 101 of the liquid crystal panel 5a shown in FIG. 9, for example, a Cs potential (Vcom) is supplied to the pixel electrode 17b connected to the storage capacitance wiring 18x via the transistor 12b in the two horizontal scanning periods (2H) immediately preceding the normal writing. And, at the beginning of the horizontal scanning period for the normal writing, a Cs potential (Vcom) is supplied to the pixel electrode 17b, and at the same time, a charge-sharing potential (Vcom) is supplied to the pixel electrodes 17a, 17a'. As a result, the potential of each pixel electrode before the normal writing, especially that of the pixel electrodes in the floating state (capacitance coupling electrodes), can be securely fixed to Vcom, which ensures the discharge of accumulated electric charges from the capacitance coupling electrodes and also prevents the deterioration of display quality. Here, the period during which scan signal lines (16b, 16d, 16f) for discharging electric charge are on (gate-on pulse width) is not limited to 2H periods, but can be set to any period.

Here, while each of the above-described driving methods discusses a liquid crystal panel for which two pixel electrodes (for example, pixel electrodes 17a, 17b) are formed in one pixel (for example, pixel 101), these driving methods can also be applied to cases in which three pixel electrodes are formed. For example, the liquid crystal panel shown in FIG. 9 is configured so that the pixel electrode 17a' is electrically connected to the pixel electrode 17a, which makes a potential change of the pixel electrode 17a' identical to that of the pixel electrode 17a. For this reason, it is possible to apply the above-described driving methods regardless of the number of pixel electrodes formed in one pixel.

Also, each of the driving methods is configured for a charge-sharing method, but the present invention is not limited to this. As another method, for example, it can be configured such that each frame has a certain period during which all transistors are turned on and all data signal lines are supplied with Vcom.

A specific configuration of a source driver for realizing a charge-sharing method in these above-described driving methods is described later in the section entitled "Configurations of liquid crystal display unit and liquid crystal display device."

(Specific Example of Liquid Crystal Panel 1-5)

Figure 59:
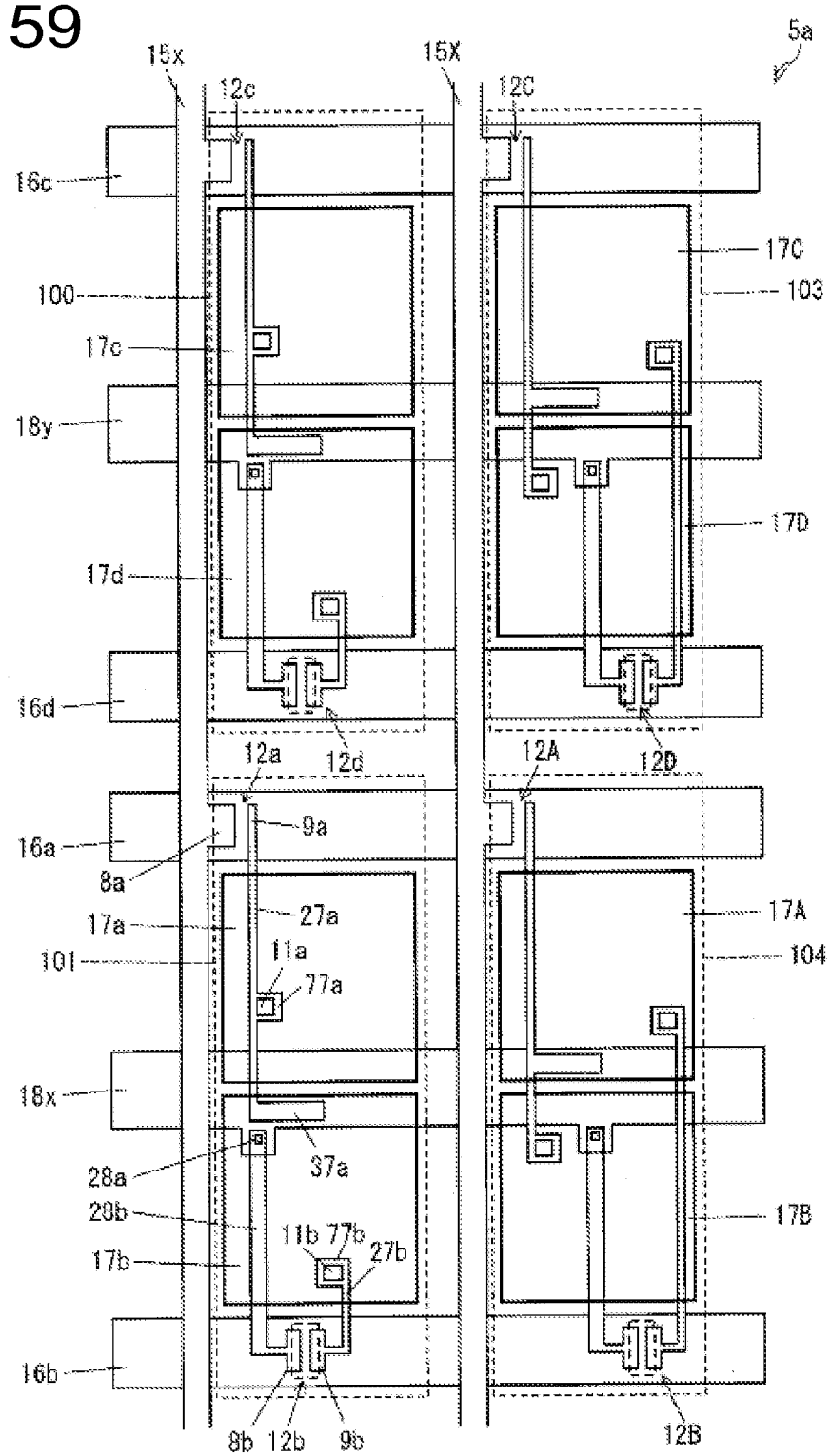
FIG. 59 is a plan view showing another configuration of a liquid crystal panel 5a (specific example 1-5).

Here, the liquid crystal panel 5a shown in FIG. 2 may also be configured in a manner shown in FIG. 59. In a liquid crystal panel 5a shown in FIG. 59, two pixels (101, 104) are aligned adjacently in the row direction. In one of the pixels (pixel 101), a pixel electrode (17a) closer to a transistor (12a) is connected to the transistor (12a), while in the other pixel (pixel 104), a pixel electrode (17B) farther from a transistor (12A) is connected to that transistor (12A).

Figure 60:
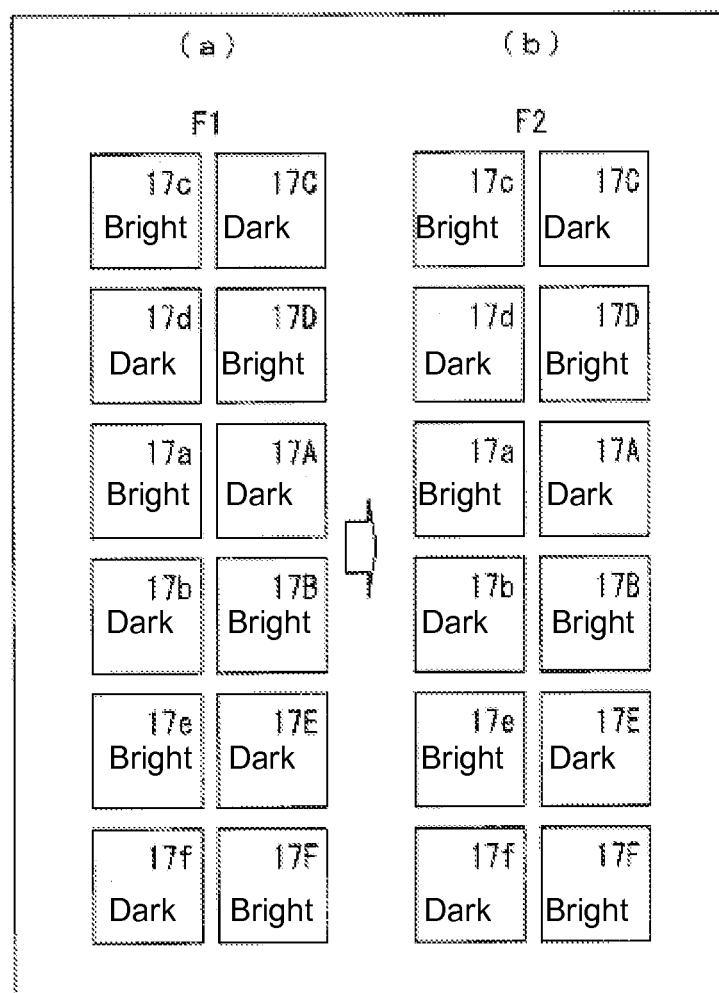
FIGS. 60(a), 60(b) are schematic views showing a display condition in each frame when a driving method shown in FIG. 18 is used for a liquid crystal panel 5a described in FIG. 59.

In a liquid crystal display device equipped with the liquid crystal panel 5a shown in FIG. 59, when data signal lines 15x, 15X are driven in a manner shown in FIG. 18, for example, a frame F1 appears as a whole as shown in FIG. 60(a), while a frame F2 appears as a whole as shown in FIG. 60(b). In the subsequent frames F3, F4, the operations in the frames F1, F2 are repeated.

According to the liquid crystal panel shown in FIG. 58, bright subpixels are not aligned adjacent to each other in the row direction, nor are dark subpixels aligned adjacent to each other in the row direction, thereby reducing uneven streaks in the row direction.

Second Embodiment

In a second embodiment of the present invention, an embodiment in which three transistors are formed in one pixel area is described, as explained earlier in the specification.

Figure 29:
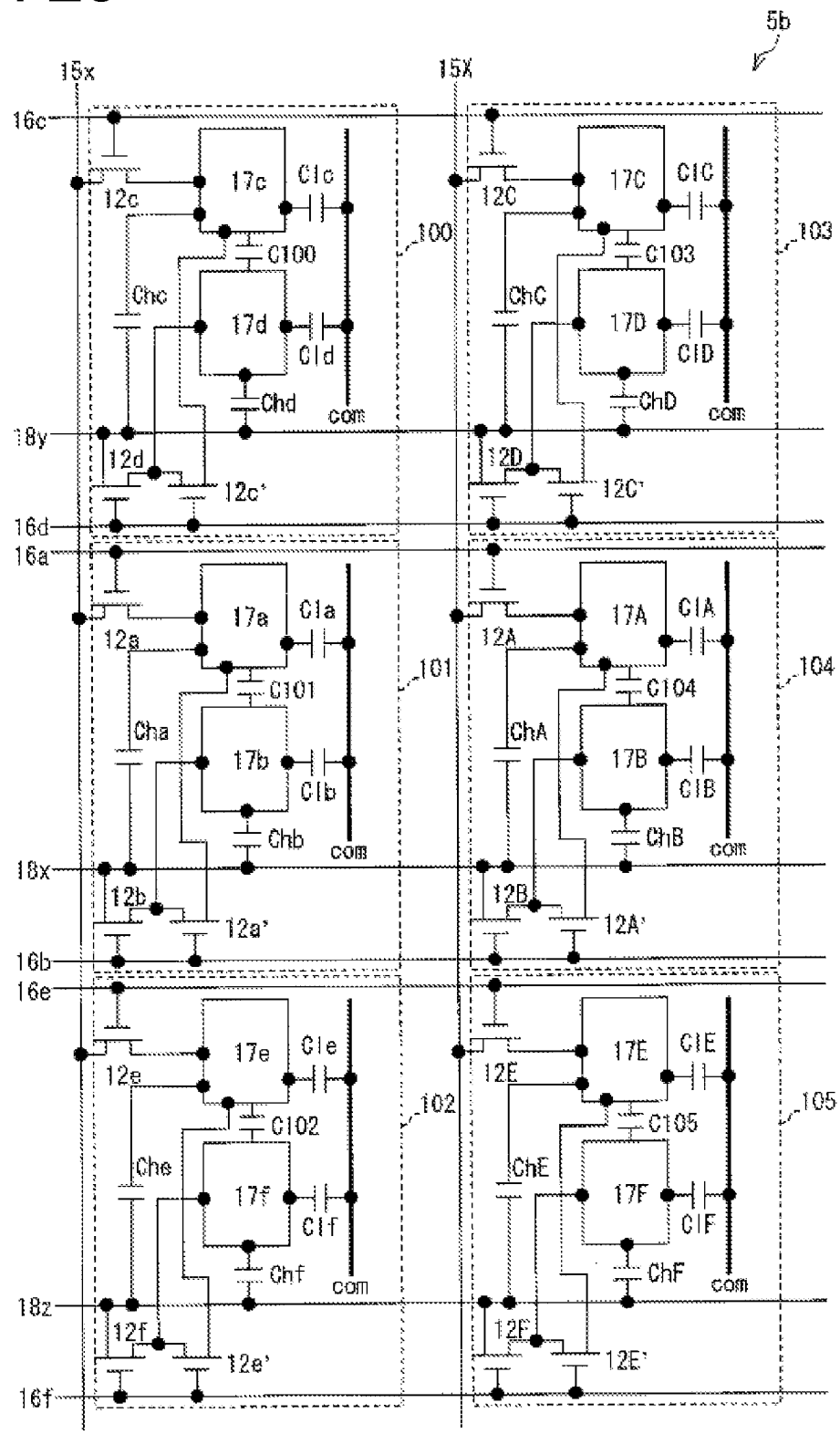
FIG. 29 is a circuit diagram showing a configuration of a liquid crystal panel 5b.

FIG. 29 is an equivalent circuit diagram that schematically shows a portion of the present liquid crystal panel of the present second embodiment. As shown in FIG. 29, a liquid crystal panel 5b includes data signal lines (15x, 15X) extending in the column direction (up-down direction in the diagram); scan signal lines (16a to 16f) extending in the row direction (left-right direction in the diagram); pixels (100 to 105) aligned in both the row and column directions; storage capacitance wirings (18x to 18z); and a common electrode (counter electrode) "com." Each pixel has an identical configuration. Also, a pixel column containing the pixels 100 to 102 and a pixel column containing the pixels 103 to 105 are aligned adjacently.

In the liquid crystal panel 5b, one data signal line and two scan signal lines are provided for each pixel. Two pixel electrodes 17c, 17d provided in the pixel 100, two pixel electrodes 17a, 17b provided in the pixel 101, and two pixel electrodes 17e, 17f provided in the pixel 102 are aligned in one column, while two pixel electrodes 17C, 17D provided in the pixel 103, two pixel electrodes 17A, 17B provided in the pixel 104, and two pixel electrodes 17E, 17F provided in the pixel 105 are aligned in one column. The pixel electrodes 17c, 17C, the pixel electrodes 17d, 17D, the pixel electrodes 17a, 17A, the pixel electrodes 17b, 17B, the pixel electrodes 17e, 17E, and the pixel electrodes 17f, 17F are aligned adjacently to each other in the row direction, respectively.

Because each pixel has an identical configuration, the following mainly describes the configuration of the pixel 101 as an example.

In the pixel 101, as shown in FIG. 29, the pixel electrodes 17a, 17b are connected to each other via a coupling capacitance C101; the pixel electrode 17a is connected to a data signal line 15x via a transistor 12a connected to a scan signal line 16a; and the pixel electrode 17b is connected to a storage capacitance wiring 18x via a transistor 12b connected to a scan signal line 16b. The pixel electrode 17a is further connected to the storage capacitance wiring 18x via a transistor 12a' (third transistor) connected to the scan signal line 16b. A storage capacitance Cha is formed between the pixel electrode 17a and the storage capacitance wiring 18x; a storage capacitance Chb is formed between the pixel electrode 17b and the storage capacitance wiring 18x; a liquid crystal capacitance Cla is formed between the pixel electrode 17a and the common electrode "com"; and a liquid crystal capacitance Clb is formed between the pixel electrode 17b and the common electrode "corn."

According to the above-described configuration, taking the pixel 101, as an example, the transistors 12b, 12a' that are connected to the scan signal line 16b can apply a signal potential (such as Vcom) of the storage capacitance wiring 18x easily and concurrently to all pixel electrodes 17a, 17b that compose one pixel 101.

(Specific Example of Liquid Crystal Panel 2-1)

Figure 30:
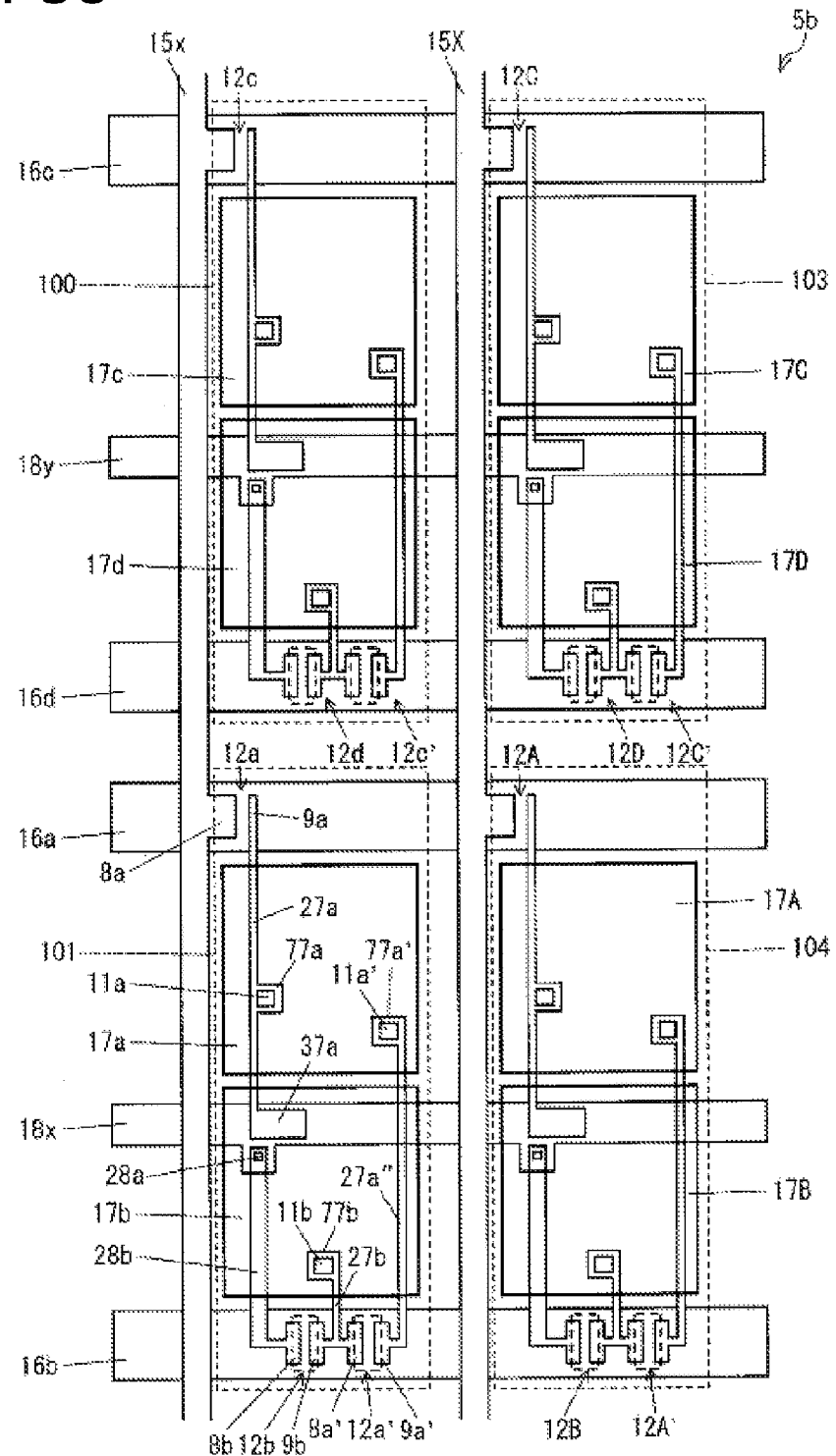
FIG. 30 is a plan view showing a configuration of a liquid crystal panel 5b.

A specific example 2-1 of a liquid crystal panel 5b is shown in FIG. 30. In the liquid crystal panel 5b in FIG. 30, a data signal line 15x is provided so as to align along pixels 100, 101; a data signal line 15X is provided so as to align along pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100; a scan signal line 16d is arranged at the other edge thereof; and viewed planarly, pixel electrodes 17c, 17d are aligned in the column direction between the scan signal lines 16c, 16d. In the same manner, the scan signal line 16c is arranged at one edge of the pixel 103; the scan signal line 16d is arranged at the other edge thereof; and viewed planarly, pixel electrodes 17C, 17D are aligned in the column direction between the scan signal lines 16c, 16d.

Also, a scan signal line 16a is arranged at one edge of the pixel 101; a scan signal line 16b is arranged at the other edge thereof; and viewed planarly, pixel electrodes 17a, 17b are aligned in the column direction between the scan signal lines 16a, 16b. In the same manner, the scan signal line 16a is arranged at one edge of the pixel 104; the scan signal line 16b is arranged at the other edge thereof; and viewed planarly, pixel electrodes 17A, 17B are aligned in the column direction between the scan signal lines 16a, 16b.

In the pixel 101, a source electrode 8a and a drain electrode 9a of a transistor 12a are formed over the scan signal line 16a, while a source electrode 8b and a drain electrode 9b of a transistor 12b and also a source electrode 8a' and a drain electrode 9a' of a transistor 12a' are formed over the scan signal line 16b. The source electrode 8a is connected to the data signal line 15x. The drain electrode 9a is connected to a drain lead-out wiring 27a; the drain lead-out wiring 27a is connected to a contact electrode 77a and a coupling capacitance electrode 37a; the contact electrode 77a is connected to the pixel electrode 17a via a contact hole 11a; and the coupling capacitance electrode 37a overlaps the pixel electrode 17b via an interlayer insulating film. As a result, a coupling capacitance C101 (see FIG. 29) between the pixel electrodes 17a, 17b is formed.

Also, the source electrode 8b of the transistor 12b is connected to a source lead-out wiring 28b, and the source lead-out wiring 28b is connected to a storage capacitance wiring 18x via a contact hole 28a. The drain electrode 9b is connected to a drain lead-out wiring 27b; the drain lead-out wiring 27b is connected to the contact electrode 77b; and the contact electrode 77b is connected to the pixel electrode 17b via a contact hole 11b.

Also, the source electrode 8a' of the transistor 12a' is connected to the drain electrode 9b of the transistor 12b. The drain electrode 9a' is connected to a drain lead-out wiring 27a"; the drain lead-out wiring 27a" is connected to a contact electrode 77a'; and the contact electrode 77a' is connected to the pixel electrode 17a via a contact hole 11a'.

Also, the coupling capacitance electrode 37a overlaps the storage capacitance wiring 18x via a gate insulating film, thereby forming a storage capacitance Cha (see FIG. 29), and also forming a storage capacitance Chb (see FIG. 29) between the pixel electrode 17b and the storage capacitance wiring 18x. Note that the configuration (geometry and alignment of each component as well as connection relation therebetween) of other pixels is the same as that of the pixel 101.

According to the aforementioned configuration, subpixels including the pixel electrode 17a are "bright" while subpixels including the pixel electrode 17b are "dark."

Figure 6:
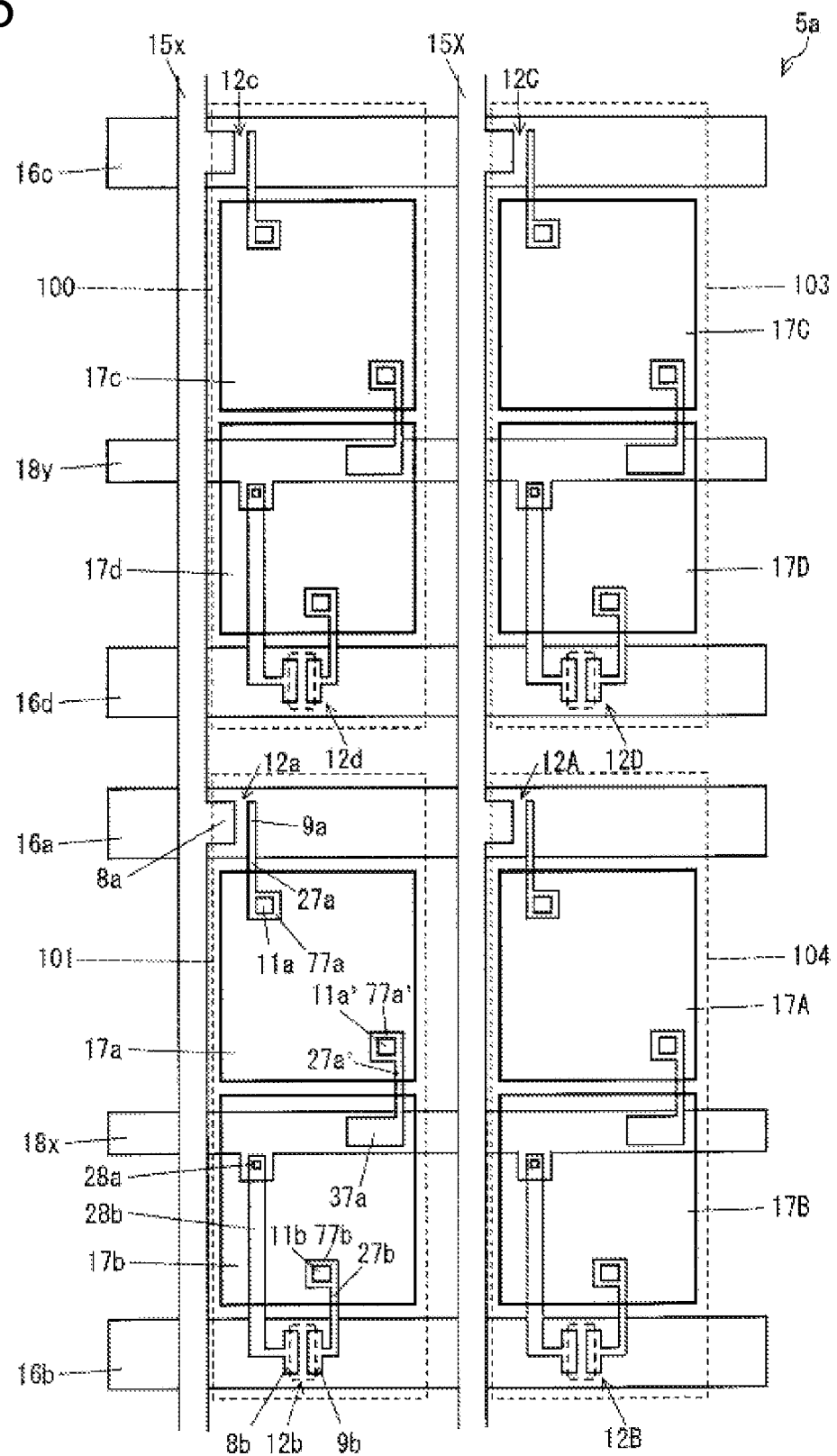
FIG. 6 is a plan view showing another configuration of a liquid crystal panel 5a (modification 1).
Figure 31:
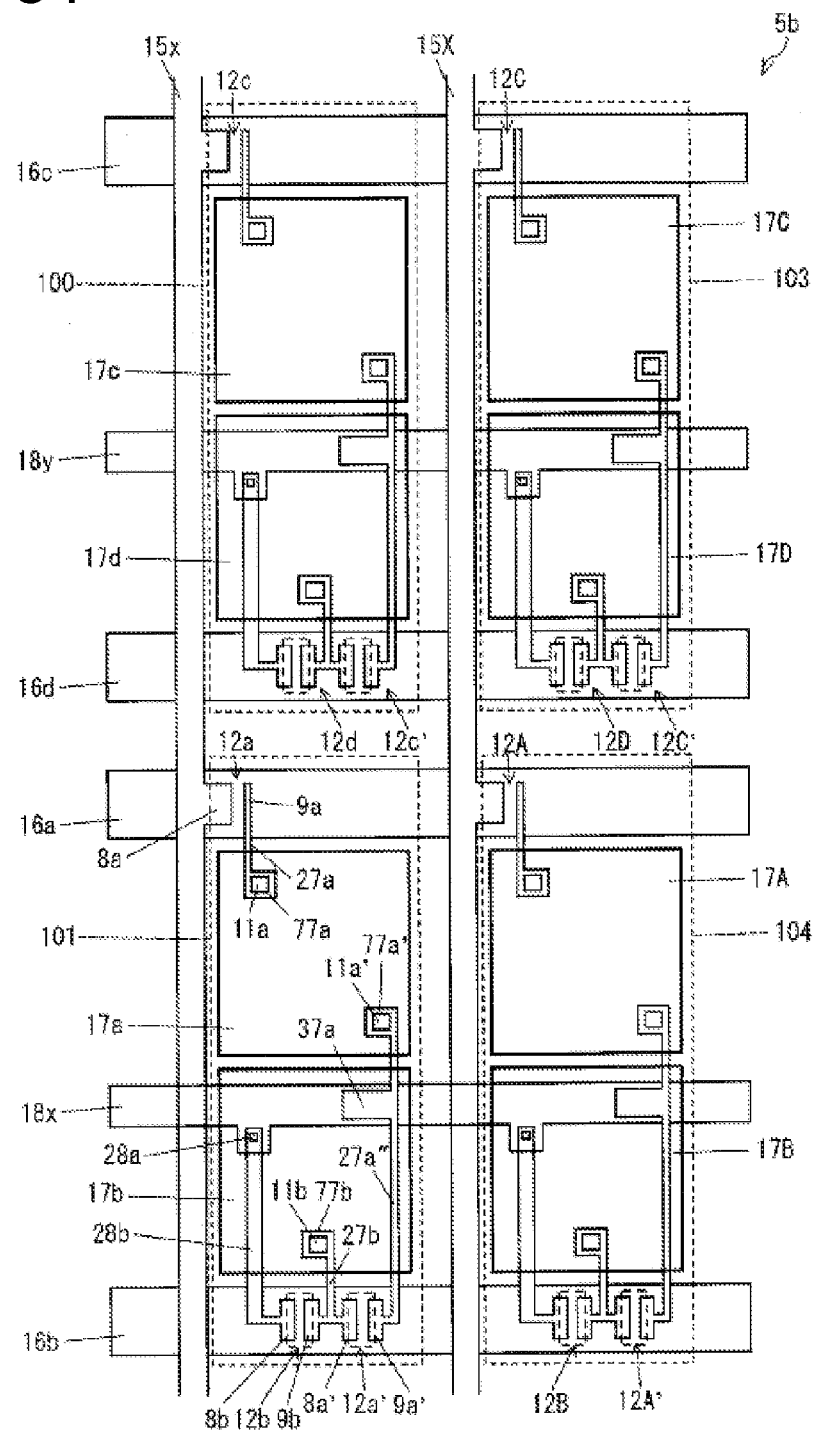
FIG. 31 is a plan view showing another configuration of a liquid crystal panel 5b shown in FIG. 30.

FIG. 31 shows a case in which the configuration of the liquid crystal panel 5a of the modification 1 shown in FIG. 6 of the above-described first embodiment is applied to the liquid crystal panel 5b of FIG. 30. Specifically, the drain electrode 9a of the transistor 12a over the scan signal line 16a is connected to the drain lead-out wiring 27a; the drain lead-out wiring 27a is connected to the contact electrode 77a; and the contact electrode 77a is connected to the pixel electrode 17a via the contact hole 11a.

The source electrode 8b of the transistor 12b is connected to the source lead-out wiring 28b, and the source lead-out wiring 28b is connected to the storage capacitance wiring 18x via the contact hole 28a. The drain electrode 9b is connected to the drain lead-out wiring 27b; the drain lead-out wiring 27b is connected to the contact electrode 77b; and the contact electrode 77b is connected to the pixel electrode 17b via the contact hole 11b.

Also, the source electrode 8a' of the transistor 12a' is connected to the drain electrode 9b of the transistor 12b. The drain electrode 9a' is connected to the drain lead-out wiring 27a"; the drain lead-out wiring 27a" is connected to the contact electrode 77a' and also to the coupling capacitance electrode 37a; the contact electrode 77a' is connected to the pixel electrode 17a via the contact hole 11a'; and the capacitance coupling electrode 37a overlaps the pixel electrode 17b via an interlayer insulating film, thereby forming a coupling capacitance C101 (FIG. 29) between the pixel electrodes 17a, 17b.

Figure 32:
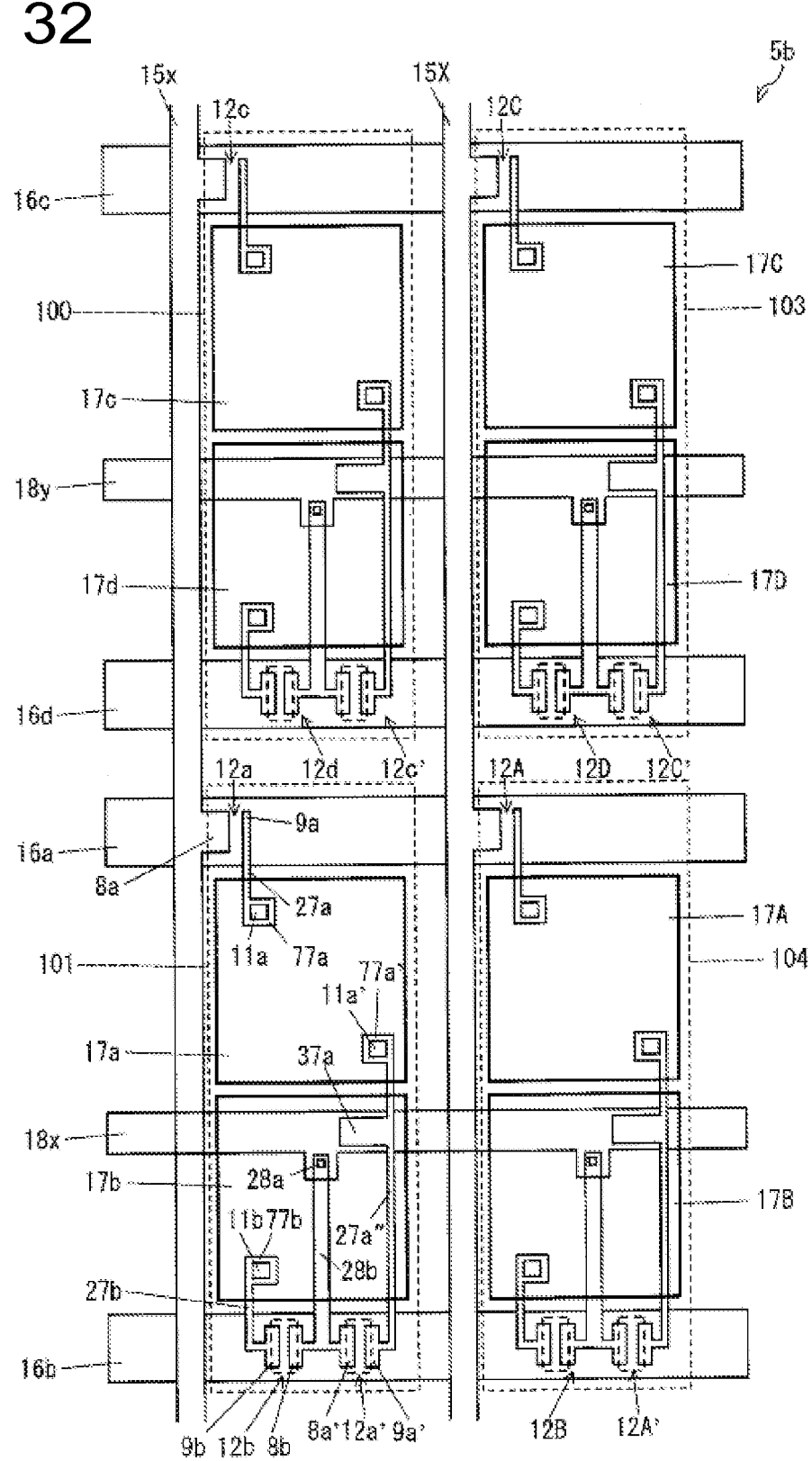
FIG. 32 is a plan view showing another configuration of a liquid crystal panel 5b shown in FIG. 31.

Here, as an exemplary configuration other than the configuration of FIG. 31, a configuration shown in FIG. 32 may also be adopted. In the liquid crystal panel 5b shown in FIG. 32, the transistors 12b, 12a' connected to the scan signal line 16b are individually connected to the storage capacitance wiring 18x. Specifically, the source lead-out wiring 28b connected to the storage capacitance wiring 18x is connected to the source electrode 8b of the transistor 12b and also to the source electrode 8a' of the transistor 12a'.

(Specific Example of Liquid Crystal Panel 2-2)

Figure 33:
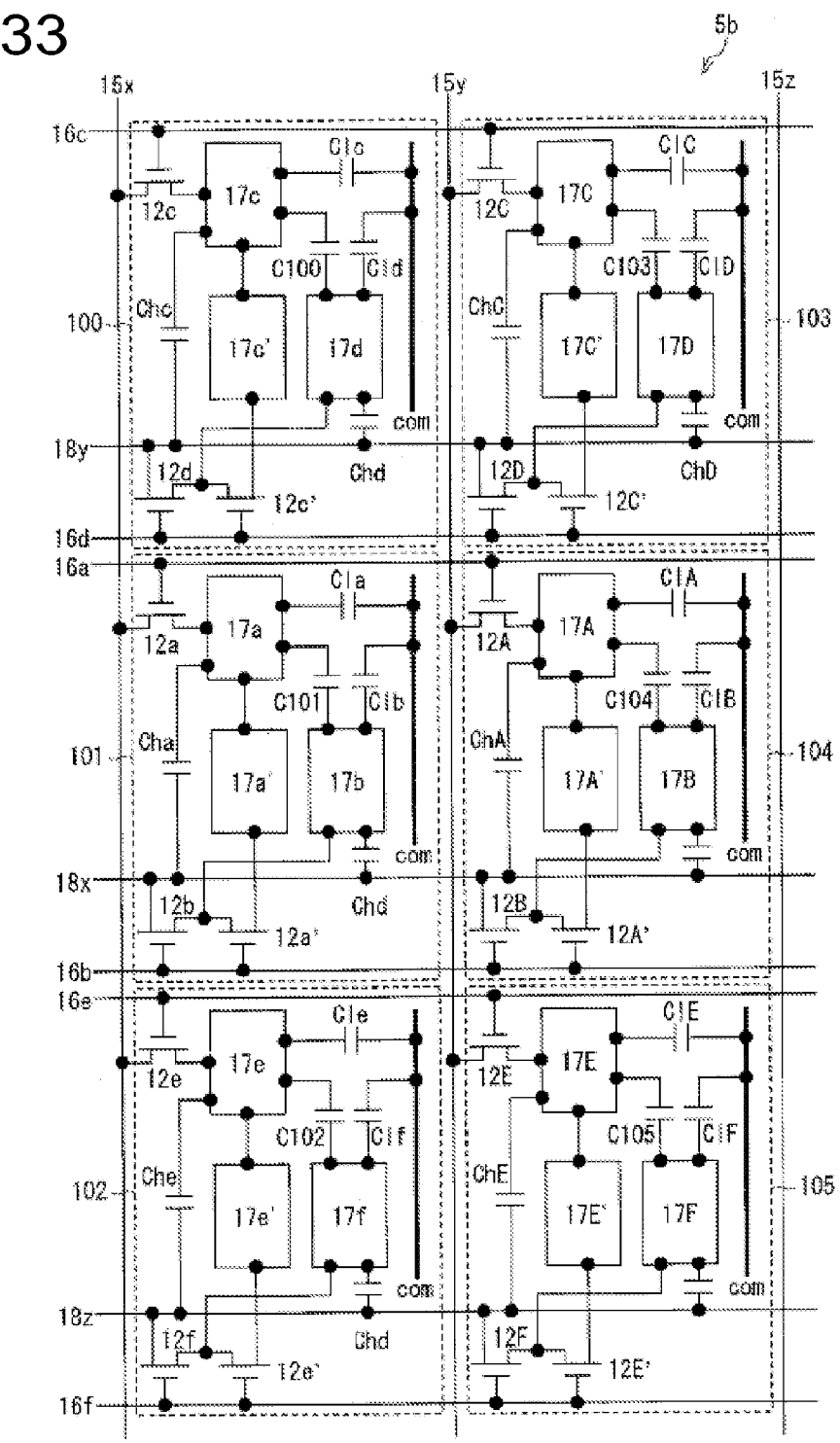
FIG. 33 is a circuit diagram showing another configuration of a liquid crystal panel 5b (specific example 2-2).

An equivalent circuit diagram for a specific example 2-2 of a liquid crystal panel 5b is shown in FIG. 33. The specific example 2-2 of the liquid crystal panel 5b is shown in FIG. 34.

As shown in FIG. 33, each pixel has an identical configuration, in which one data signal line and two scan signal lines are provided to each pixel. Three pixel electrodes 17c, 17d, 17c' are provided in a pixel 100 (FIG. 33 shows a condition that the pixel electrodes 17c, 17c' are electrically connected to each other); three pixel electrodes 17a, 17b, 17a' are provided in a pixel 101l and three pixel electrodes 17e, 17f, 17e' are provided in a pixel 102. Also, three pixel electrodes 17C, 17D, 17C' are provided in a pixel 103; three pixel electrodes 17A, 17B, 17A' are provided in a pixel 104; and three pixel electrodes 17E, 17F, 17E' are provided in a pixel 105. The pixel electrodes 17c, 17C, the pixel electrodes 17c', 17C', the pixel electrodes 17d, 17D, the pixel electrodes 17a, 17A, the pixel electrodes 17a', 17A', the pixel electrodes 17b, 17B, the pixel electrodes 17e, 17E, the pixel electrodes 17e', 17E', and the pixel electrodes 17f, 17F are adjacent to each other in the row direction, respectively.

Taking the pixel 101 as an example, in the pixel 101, the pixel electrodes 17a, 17b are connected to each other via a coupling capacitance C101; the pixel electrode 17a is connected to the data signal line 15x via a transistor 12a that is connected to a scan signal line 16a; the pixel electrode 17b is connected to a storage capacitance wiring 18x via a transistor 12b that is connected to the scan signal line 16b; and the pixel electrode 17a' that is electrically connected to the pixel electrode 17a is connected to the storage capacitance wiring 18x via the transistors 12a', 12b. A storage capacitance Cha is formed between the pixel electrodes 17a, 17a' and the storage capacitance wiring 18x; a storage capacitance Chb is formed between the pixel electrode 17b and the storage capacitance wiring 18x; a liquid crystal capacitance Cla is formed between the pixel electrodes 17a, 17a' and a common electrode com; and a liquid crystal capacitance Clb is formed between the pixel electrode 17b and the common electrode "com."

Figure 34:
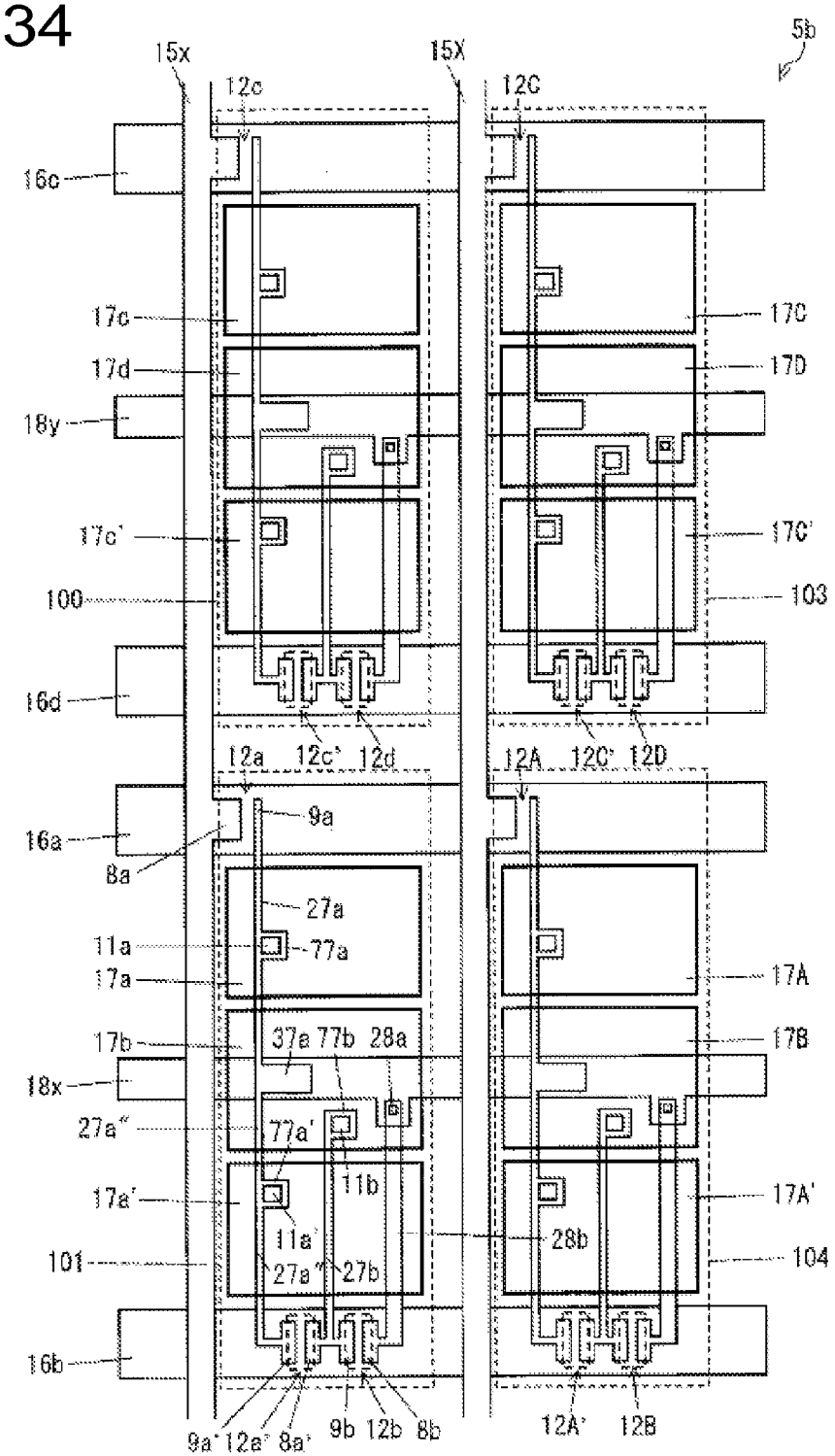
FIG. 34 is a plan view showing another configuration of a liquid crystal panel 5b (specific example 2-2).

In the liquid crystal panel 5b shown in FIG. 34, in a manner similar to that of the liquid crystal panel in FIG. 30, a data signal line 15x is provided so as to align along the pixels 100, 101; a data signal line 15X is provided so as to align along the pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100; a scan signal line 16d is arranged at the other edge thereof; and viewed planarly, the pixel electrodes 17c, 17d, 17c' are aligned in the column direction between the scan signal lines 16c, 16d. In the same manner, the scan signal line 16c is arranged at one edge of the pixel 103; the scan signal line 16d is arranged at the other edge thereof; and viewed planarly, three pixel electrodes 17C, 17D, 17C' are aligned in the column direction between the scan signal lines 16c, 16d.

Also, the scan signal line 16a is arranged at one edge of the pixel 101; the scan signal line 16b is arranged at the other edge thereof; and viewed planarly, the pixel electrodes 17a, 17b, 17a' are aligned in the column direction between the scan signal lines 16a, 16b. In the same manner, the scan signal line 16a is arranged at one edge of the pixel 104; the scan signal line 16b is arranged at the other edge thereof; and viewed planarly, the pixel electrodes 17A, 17B, 17A' are aligned in the column direction between the scan signal lines 16a, 16b.

In the pixel 101, a source electrode 8a and a drain electrode 9a of a transistor 12a are formed over the scan signal line 16a, while a source electrode 8b and a drain electrode 9b of a transistor 12b and also a source electrode 8a' and a drain electrode 9a' of a transistor 12a' are formed over the scan signal line 16b. The source electrode 8a is connected to the data signal line 15x. The drain electrode 9a is connected to a drain lead-out wiring 27a; the drain lead-out wiring 27a is connected to a contact electrode 77a and to a coupling capacitance electrode 37a; and the contact electrode 77a is connected to the pixel electrode 17a via the contact hole 11a. The coupling capacitance electrode 37a overlaps the pixel electrode 17b via an interlayer insulating film, thereby forming a coupling capacitance C101 (see FIG. 33) between the pixel electrodes 17a, 17b.

Also, the source electrode 8b of the transistor 12b is connected to a source lead-out wiring 28b, and the source lead-out wiring 28b is connected to the storage capacitance wiring 18x via a contact hole 28a. The drain electrode 9b is connected to a drain lead-out wiring 27b, and the drain lead-out wiring 27b is connected to the pixel electrode 17b via a contact hole 11b.

Also, the source electrode 8a' of the transistor 12a' is connected to the drain electrode 9b of the transistor 12b. The drain electrode 9a' is connected to a drain lead-out wiring 27a"; the drain lead-out wiring 27a" is connected to a contact electrode 77a' and to a coupling capacitance 37a; and the contact electrode 77a' is connected to a pixel electrode 17a' (third pixel electrode) via a contact hole 11a'.

Also, the coupling capacitance electrode 37a overlaps the storage capacitance wiring 18x via a gate insulating film, thereby forming a storage capacitance Cha (see FIG. 33), and also a storage capacitance Chb (see FIG. 33) between the pixel electrode 17b and the storage capacitance wiring 18x. Note that the configuration (geometry and alignment of each component and connection relation therebetween) of other pixels is the same as that of the pixel 101.

According to the aforementioned configuration, subpixels including the pixel electrodes 17a, 17a' are "bright" while subpixels including the pixel electrode 17b are "dark." Therefore, an advantage is obtained that an electric charge is prevented from jumping from the scan signal lines to the pixel electrode 17b in the floating statues.

Figure 35:
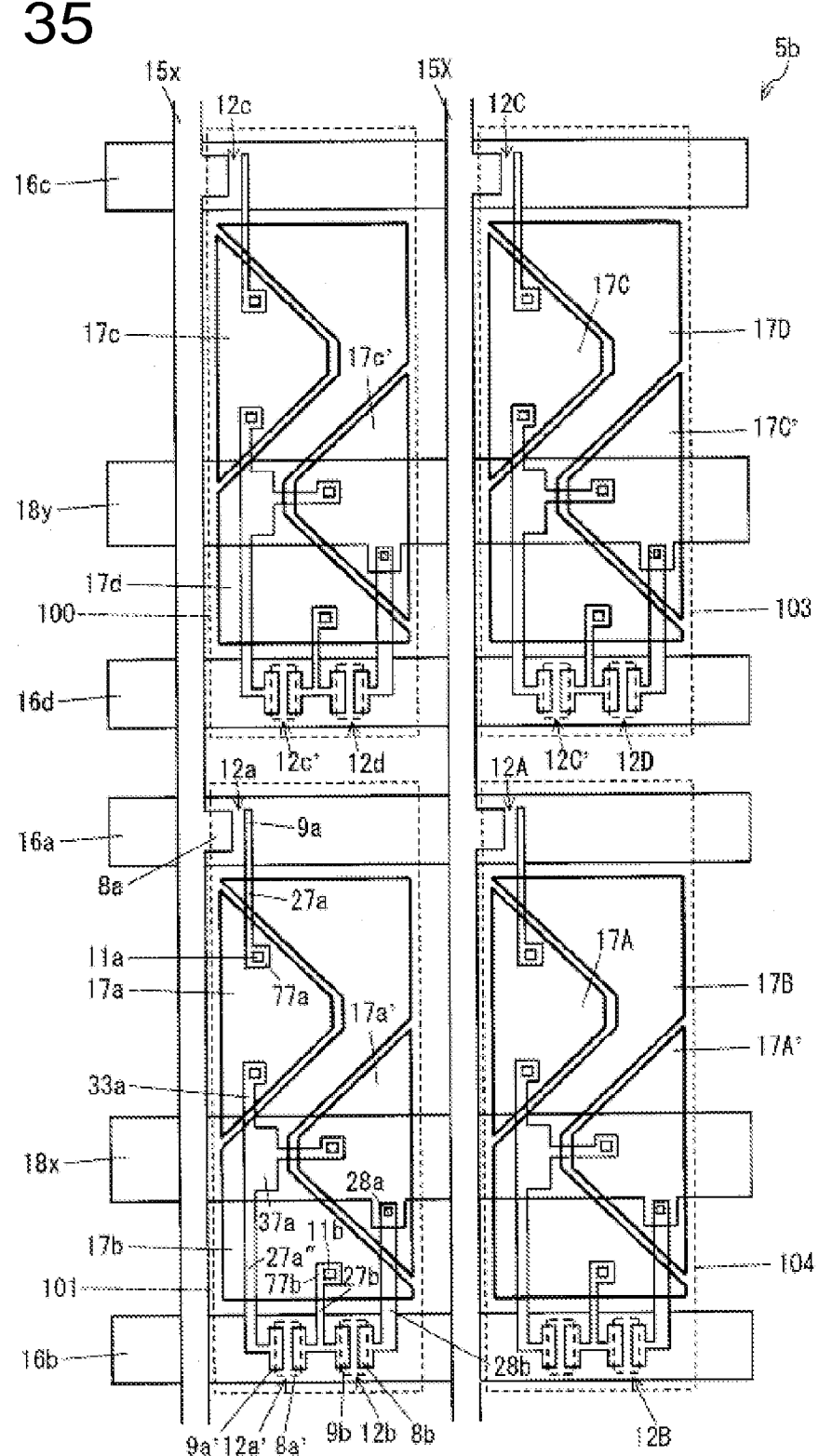
FIG. 35 is a plan view showing another configuration of a liquid crystal panel 5b shown in FIG. 34.

Also, the liquid crystal panel 5b shown in the present specific example 2-2 can alternatively be configured as shown in FIG. 35. Specifically, in a liquid crystal panel 5b shown in FIG. 35, the shapes of the pixel electrodes are different from those of pixel electrodes of the liquid crystal panel 5b shown in FIG. 34. In particular, in the pixel 101 for example, the pixel electrodes 17a, 17b, 17a' are arranged respectively so that a portion of the pixel electrode 17a is adjacent to the scan signal line 16a; a portion of the pixel electrode 17a' is adjacent to the scan signal line 16b; and one edge of the pixel electrode 17b is adjacent to the scan signal line 16a while the other edge thereof is adjacent to the scan signal line 16b. In other words, at least a portion of each of the pixel electrodes 17a, 17a' is arranged adjacent to the scan signal lines 16a, 16b, respectively, and the pixel electrode 17b is arranged so as to extend in the column direction to bridge the scan signal lines 16a, 16b. Here, because components in FIG. 35 that are given with reference characters identical to those shown in FIG. 34 possess identical functions, the description thereof is omitted herein.

According to the aforementioned configuration, subpixels including the pixel electrodes 17a, 17a' are "bright" while subpixels including the pixel electrode 17b are "dark." With this configuration, it is possible to shorten each of lead-out wirings of the transistors 12a, 12b, as compared with the configuration shown in FIG. 34. Similarly, because the pixel electrodes 17a, 17a' can be connected at a position close to each other via the coupling capacitance electrode 37a, it is also possible to shorten each of lead-out wirings of the coupling capacitance electrode 37a, as compared with the configuration shown in FIG. 34. As a result, in addition to an advantage that the occurrence of burn-in in the subpixels including the pixel electrode 17b can be prevented, advantages such as reduced chance of breakage in lead-out wirings and improved aperture ratio can also be obtained.

(Specific Example of Liquid Crystal Panel 2-3)

Figure 36:
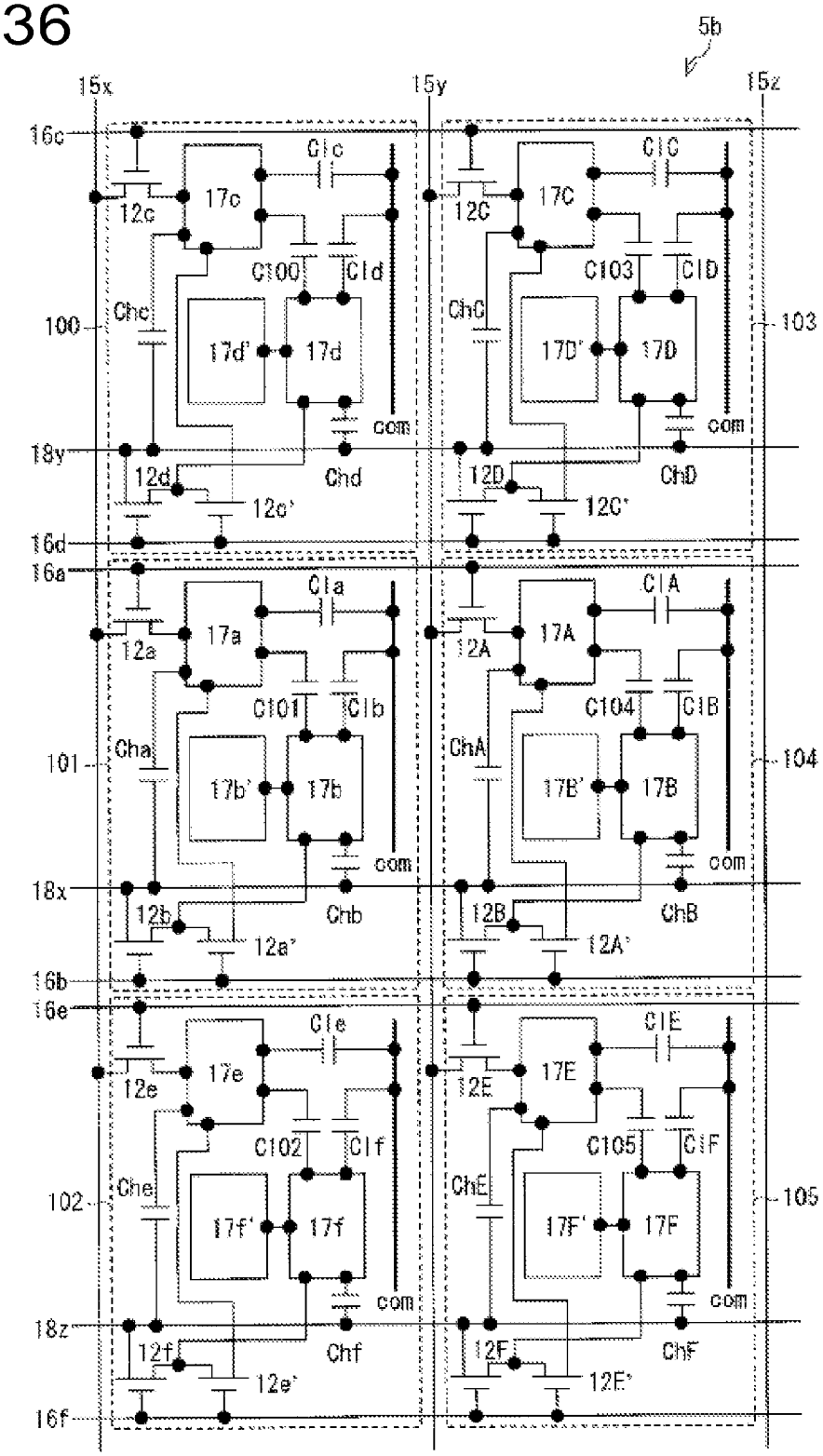
FIG. 36 is a circuit diagram showing another configuration of a liquid crystal panel 5b (specific example 2-3).

An equivalent circuit diagram for a specific example 2-3 of a liquid crystal panel 5b is shown in FIG. 36. The specific example 2-3 of the liquid crystal panel 5b is shown in FIG. 37.

As shown in FIG. 36, each pixel has an identical configuration, in which one data signal line and two scan signal lines are provided to each pixel. Three pixel electrodes 17d, 17c, 17d' are provided in a pixel 100 (FIG. 36 shows a condition that the pixel electrodes 17d, 17d' are electrically connected to each other); three pixel electrodes 17b, 17a, 17b' are provided in a pixel 101, and three pixel electrodes 17f, 17e, 17f' are provided in a pixel 102. Also, three pixel electrodes 17D, 17C, 17D' are provided in a pixel 103; three pixel electrodes 17B, 17A, 17B' are provided in a pixel 104; and three pixel electrodes 17F, 17E, 17F' are provided in a pixel 105. The pixel electrodes 17d, 17D, the pixel electrodes 17c, 17C, the pixel electrodes 17d', 17D', the pixel electrodes 17b, 17B, the pixel electrodes 17a, 17A, the pixel electrodes 17b', 17B', the pixel electrodes 17f, 17F the pixel electrodes 17e, 17E, and the pixel electrodes 17f', 17F' are adjacent to each other in the row direction, respectively.

Taking the pixel 101 as an example, in the pixel 101, the pixel electrodes 17a, 17b are connected to each other via a coupling capacitance C101; the pixel electrode 17a is connected to a data signal 15x via a transistor 12a that is connected to a scan signal line 16a; and the pixel electrodes 17b, 17b' that are electrically connected to each other are capacitively coupled to the pixel electrode 17a, and are connected to a storage capacitance wiring 18x via a transistor 12b connected to a scan signal line 16b. The pixel electrode 17a is further connected to the storage capacitance wiring 18x via a transistor 12a' (third transistor) that is connected to the scan signal line 16b. A storage capacitance Cha is formed between the pixel electrodes 17a and the storage capacitance wiring 18x; a storage capacitance Chb is formed between the pixel electrodes 17b, 17b' and the storage capacitance wiring 18x; a liquid crystal capacitance Cla is formed between the pixel electrode 17a and a common electrode "com"; and a liquid crystal capacitance Clb is formed between the pixel electrodes 17b, 17b' and the common electrode "com."

Figure 37:
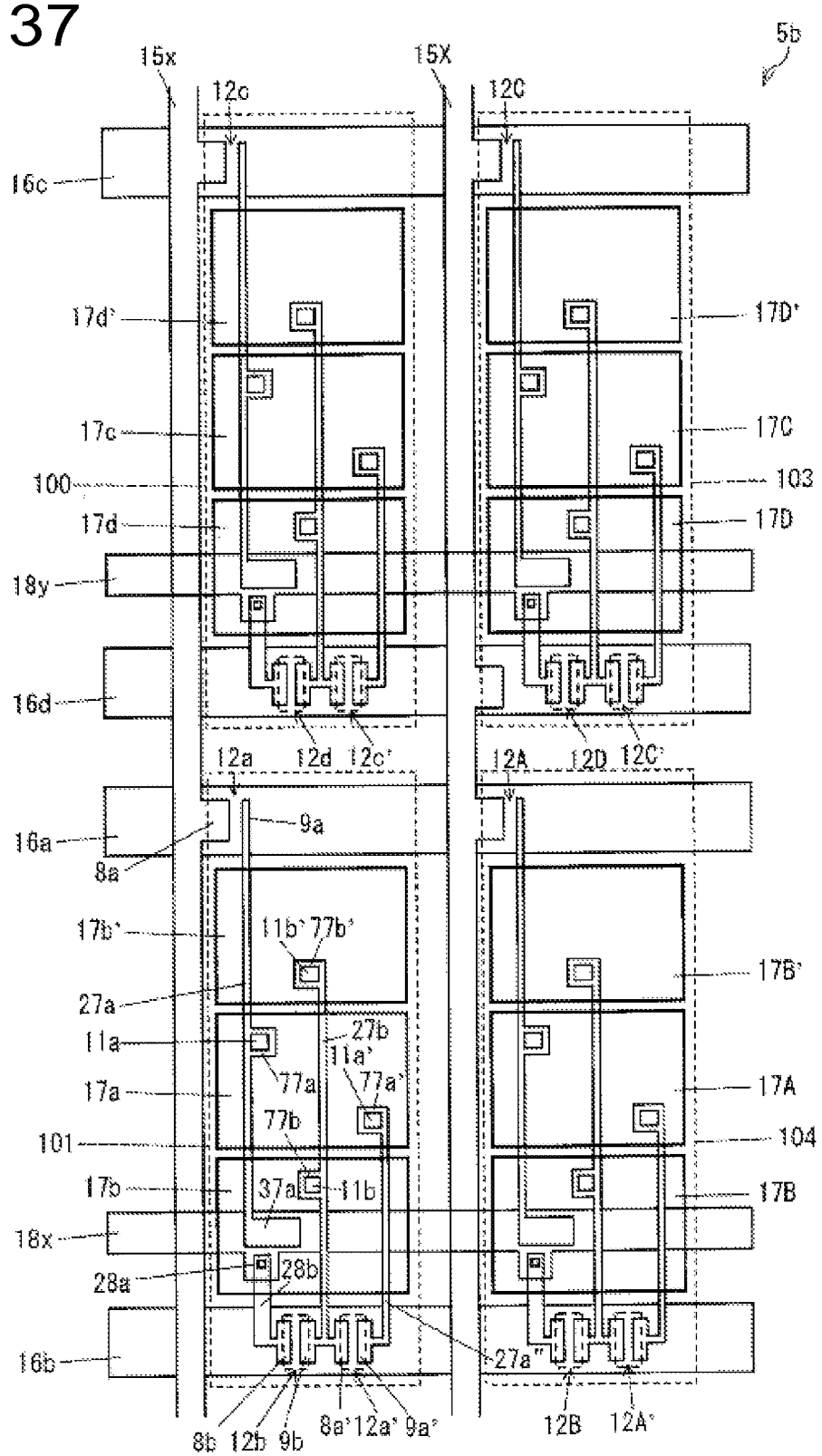
FIG. 37 is a plan view showing another configuration of a liquid crystal panel 5b (specific example 2-3).

In the liquid crystal panel 5b shown in FIG. 37, in a manner similar to that of the liquid crystal panel in FIG. 30, a data signal line 15x is provided so as to align along the pixels 100, 101; a data signal line 15X is provided so as to align along the pixels 103, 104; a storage capacitance wiring 18y passes across the pixels 100, 103, respectively; and a storage capacitance wiring 18x passes across the pixels 101, 104, respectively.

Here, a scan signal line 16c is arranged at one edge of the pixel 100; a scan signal line 16d is arranged at the other edge thereof; and viewed planarly, the pixel electrodes 17d', 17c, 17d are aligned in the column direction between the scan signal lines 16c, 16d. In the same manner, the scan signal line 16c is arranged at one edge of the pixel 103; the scan signal line 16d is arranged at the other edge thereof; and viewed planarly, pixel electrodes 17D', 17C, 17D are aligned in the column direction between the scan signal lines 16c, 16d.

Also, the scan signal line 16a is arranged at one edge of the pixel 101; the scan signal line 16b is arranged at the other edge thereof; and viewed planarly, the pixel electrodes 17b', 17a, 17b are aligned in the column direction between the scan signal lines 16a, 16b. In the same manner, the scan signal line 16a is arranged at one edge of the pixel 104; the scan signal line 16b is arranged at the other edge thereof; and viewed planarly, the pixel electrodes 17B', 17A, 17B are aligned in the column direction between the scan signal lines 16a, 16b.

In the pixel 101, a source electrode 8a and a drain electrode 9a of a transistor 12a are formed over the scan signal line 16a, while a source electrode 8b and a drain electrode 9b of a transistor 12b and also a source electrode 8a' and a drain electrode 9a' of a transistor 12a' are formed over the scan signal line 16b. The source electrode 8a is connected to the data signal line 15x. The drain electrode 9a is connected to a drain lead-out wiring 27a; the drain lead-out wiring 27a is connected to a coupling capacitance electrode 37a and to a contact electrode 77a; and the contact electrode 77a is connected to the pixel electrode 17a via a contact hole 11a. The coupling capacitance electrode 37a overlaps the pixel electrode 17b via an interlayer insulating film, thereby forming a coupling capacitance C101 (see FIG. 36) between the pixel electrodes 17a, 17b.

Also, the source electrode 8b of the transistor 12b is connected to a source lead-out wiring 28b, and the source lead-out wiring 28b is connected to the storage capacitance wiring 18x via a contact hole 28a. The drain electrode 9b is connected to a drain lead-out wiring 27b; the drain lead-out wiring 27b is connected to a contact electrode 77b; and the contact electrode 77b is connected to the pixel electrode 17b via a contact hole 11b. The drain lead-out wiring 27b is further connected to a contact electrode 77b', and the contact electrode 77b' is connected to the pixel electrode 17b' via a contact hole 11b'.

Also, the source electrode 8a' of the transistor 12a' is connected to the drain electrode 9b of the transistor 12b. The drain electrode 9a' is connected to a drain lead-out wiring 27a"; the drain lead-out wiring 27a" is connected to a contact electrode 77a'; and the contact electrode 77a' is connected to the pixel electrode 17a via a contact hole 11a'.

Also, the coupling capacitance electrode 37a overlaps the storage capacitance wiring 18x via a gate insulating film, thereby forming a storage capacitance Cha (see FIG. 36), and also forming a storage capacitance Chb (see FIG. 36) between the pixel electrode 17b and the storage capacitance wiring 18x. Here, the configuration (geometry and alignment of each component and connection relation therebetween) of other pixels is identical to that of the pixel 101.

According to the aforementioned configuration, subpixels including the pixel electrode 17a are "bright" while subpixels including the pixel electrodes 17b, 17b' are "dark." Therefore, the bright subpixels that belong to different pixels are not aligned adjacently to each other, which gives an advantage that a natural display is possible as compared with cases in which the bright subpixels that belong to different pixels are aligned adjacently to each other.

Figure 38:
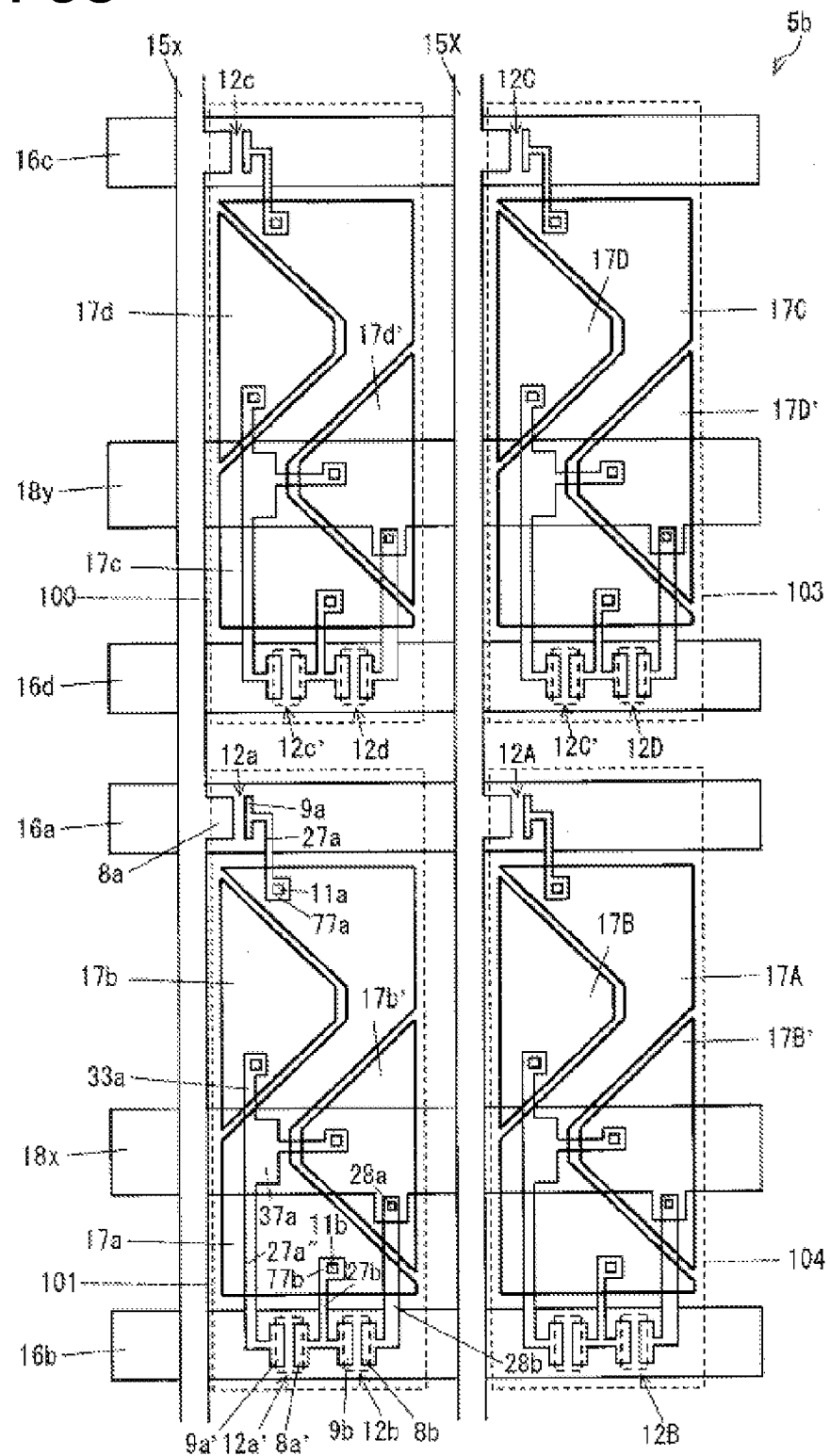
FIG. 38 is a plan view showing another configuration of a liquid crystal panel 5b shown in FIG. 37.

Also, the liquid crystal panel 5b shown in the present specific example 2-3 can alternatively be configured as shown in FIG. 38. Specifically, in a manner similar to that of the liquid crystal panel 5b shown in FIG. 35, the shapes of the pixel electrodes in the liquid crystal panel 5b shown in FIG. 38 is different from those of the pixel electrodes of the liquid crystal panel 5b shown in FIG. 37. In particular, taking the pixel 101 as an example, the pixel electrodes 17b, 17a, 17b' are arranged respectively so that a portion of the pixel electrode 17b is adjacent to the scan signal line 16a; a portion of the pixel electrode 17b' is adjacent to the scan signal line 16b; and one edge of the pixel electrode 17a is adjacent to the scan signal line 16a while the other edge thereof is adjacent to the scan signal line 16b. In other words, at least a portion of each of the pixel electrodes 17b, 17b' is arranged adjacent to the scan signal lines 16a, 16b, respectively, and the pixel electrode 17a is arranged so as to extend in the column direction to bridge the scan signal lines 16a, 16b. Here, because components in FIG. 38 that are given reference characters identical to those shown in FIG. 37 possess identical functions, the description thereof is omitted herein.

According to the aforementioned configuration, subpixels including the pixel electrode 17a are "bright" while subpixels including the pixel electrodes 17b, 17b' are "dark." In this configuration, in the same manner as the configuration in FIG. 35, it is advantageous in that the possibility of wiring disconnection of lead-out wirings can be reduced and also the aperture ratio can be improved.

(Driving Method of Liquid Crystal Display Device)

Regarding a driving method for a liquid crystal display device including the liquid crystal panel 5b of the present second embodiment, it is possible to apply each of the driving methods (driving method 1, driving method 2, driving method 3, driving method 4) that are explained in the aforementioned first embodiment.

In the liquid crystal display device including the liquid crystal panel 5b of the present second embodiment, each of pixel electrodes in one pixel area is connected to the storage capacitance wiring 18x via transistors that are connected to the scan signal line for discharging electric charge. Specifically, taking the liquid crystal panel 5b shown in FIG. 34 as an example, pixel electrodes 17a, 17a' in the pixel 101 are connected to the storage capacitance wiring 18x via transistors 12a', 12b, while the pixel electrode 17b therein is connected to the storage capacitance wiring 18x via the transistor 12b. Also, in the liquid crystal panel 5b in FIG. 36, the pixel electrode 17a in the pixel 101 is connected to the storage capacitance wiring 18x via the transistors 12a', 12b, while the pixel electrodes 17b, 17b' therein are connected to the storage capacitance wiring 18x via the transistor 12b. As described above, each of the pixel electrodes (17a, 17a', 17b, 17b') in one pixel area are connected to the storage capacitance wiring 18x via the corresponding transistors (12a', 12b).

Figure 39:
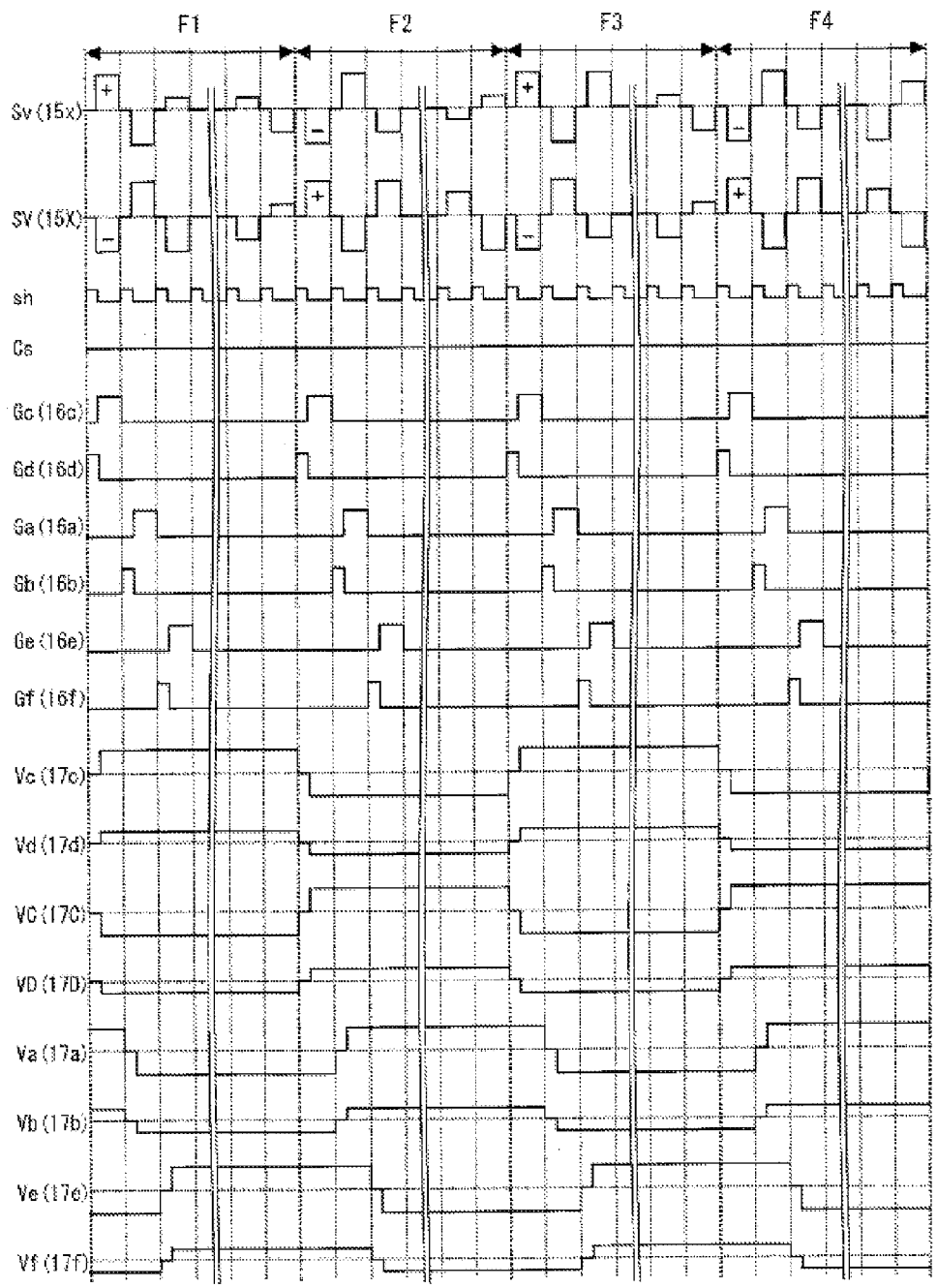
FIG. 39 is a timing chart showing another driving method of the driving method 1 shown in FIG. 18.
Figure 40:
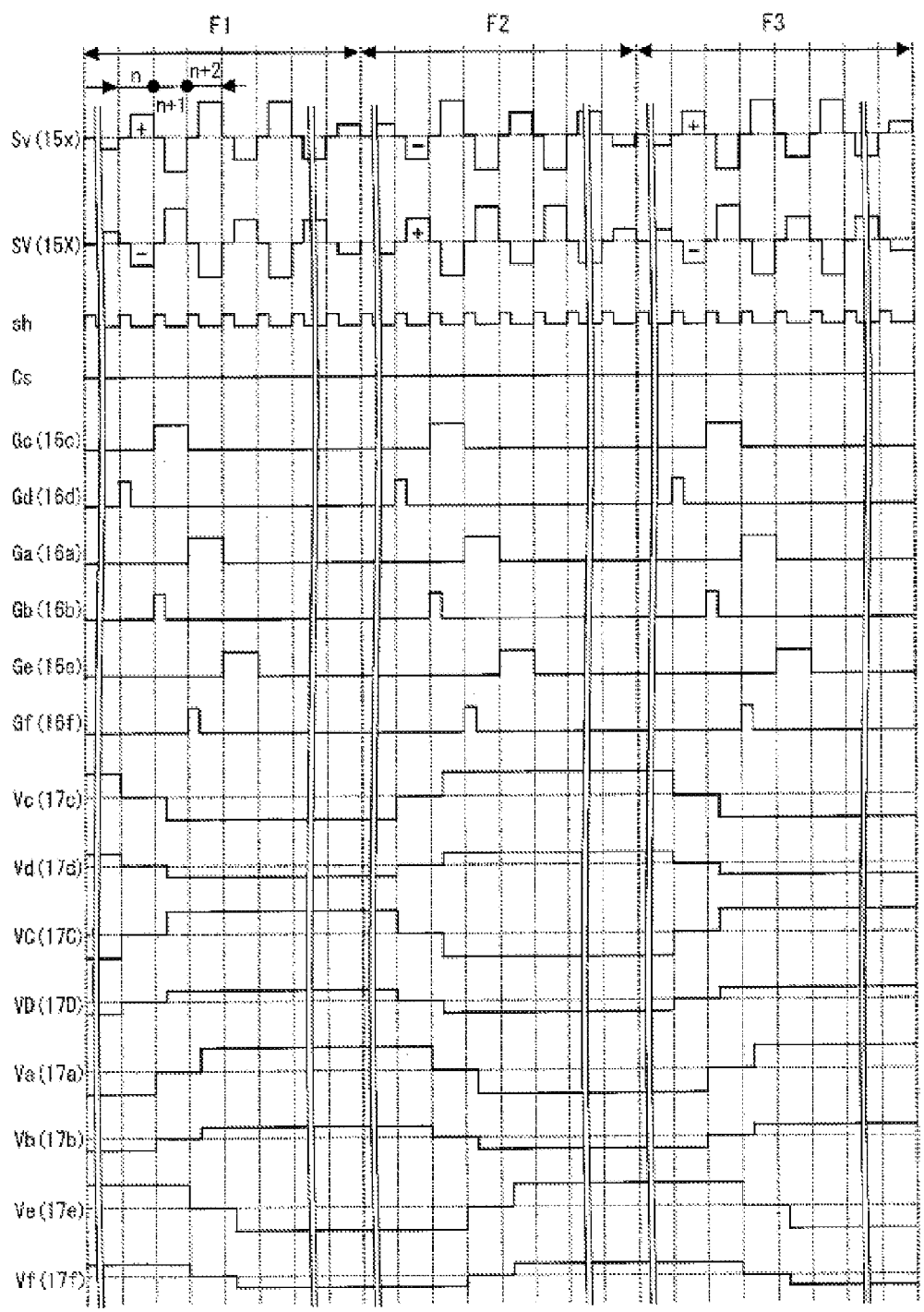
FIG. 40 is a timing chart showing another driving method of the driving methods 2 and 3 shown in FIG. 21 and FIG. 24.
Figure 41:
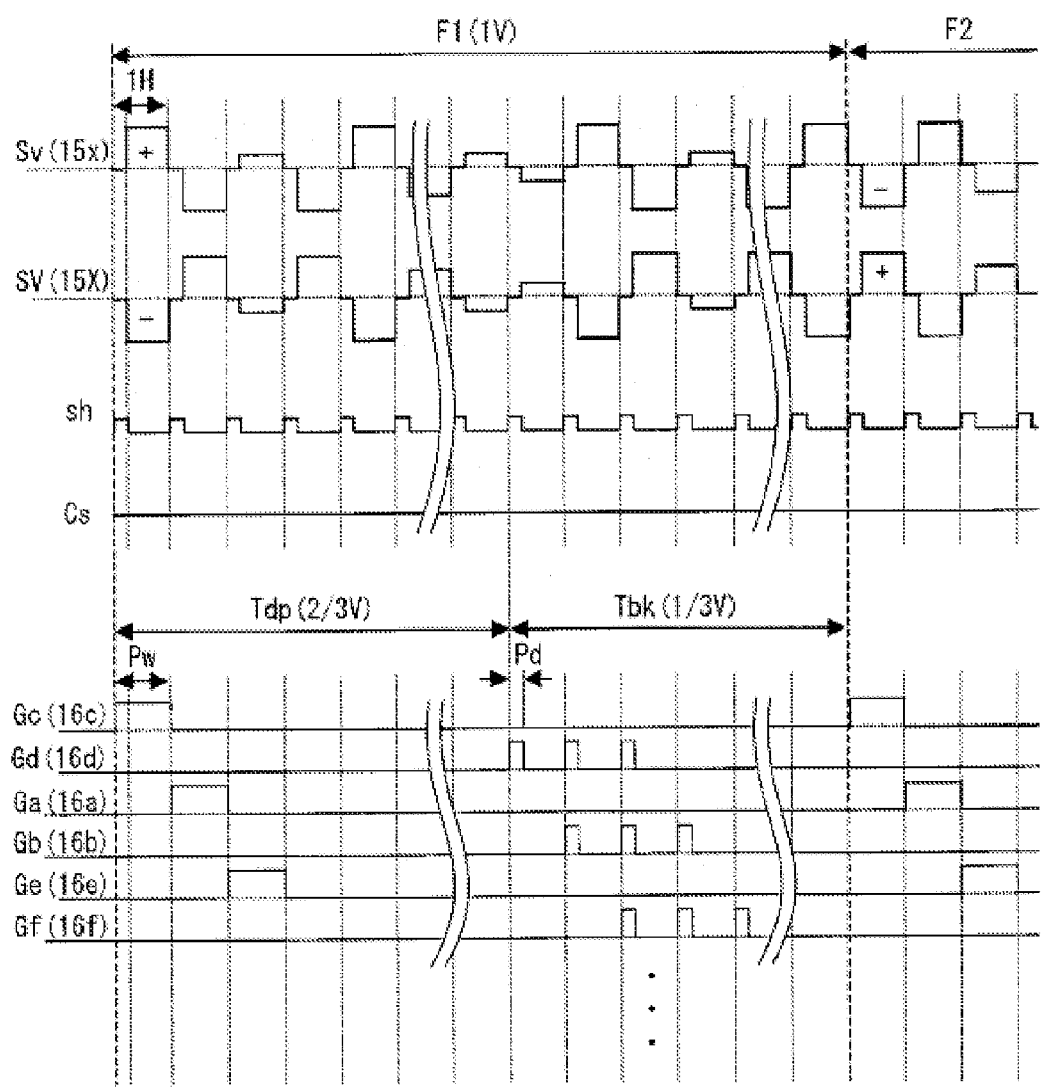
FIG. 41 is a timing chart showing another driving method of the driving method 4 shown in FIG. 27.

Therefore, in the driving method of the liquid crystal display device of the present second embodiment, when applying one of the above-mentioned driving methods (driving method 1, driving method 2, driving method 3, driving method 4), the method can be modified so as to select only the scan signal lines for discharging electric charge (16b, 16d, 16f), thereby supplying a Cs potential (Vcom) to each of the pixel electrodes. Timing charts that show this method are shown in FIGS. 39 to 41. FIG. 39 corresponds to the driving method 1 shown in FIG. 18; FIG. 40 corresponds to the driving methods 2, 3 shown in FIGS. 21, 24; and FIG. 41 corresponds to the driving method 4 shown in FIG. 27. According to these driving methods, it is possible to reset a potential (fix it to a Vcom potential) of each pixel electrode in one pixel area. As a result, it becomes possible to ensure the discharge of accumulated electric charges from the capacitance coupling electrode and also to prevent the deterioration of display quality.

Figure 42:
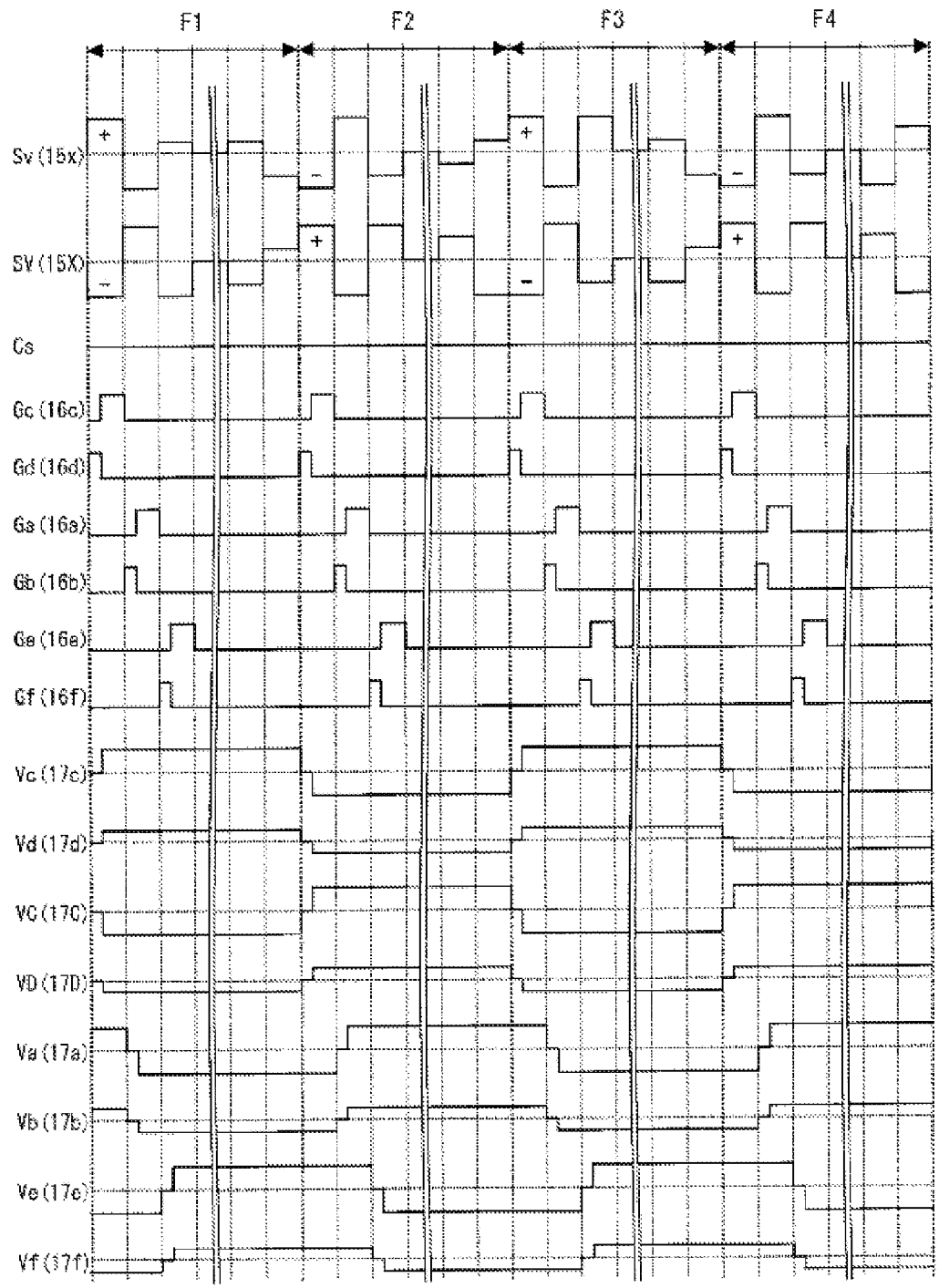
FIG. 42 is a timing chart showing another driving method of the driving method shown in FIG. 39.
Figure 43:
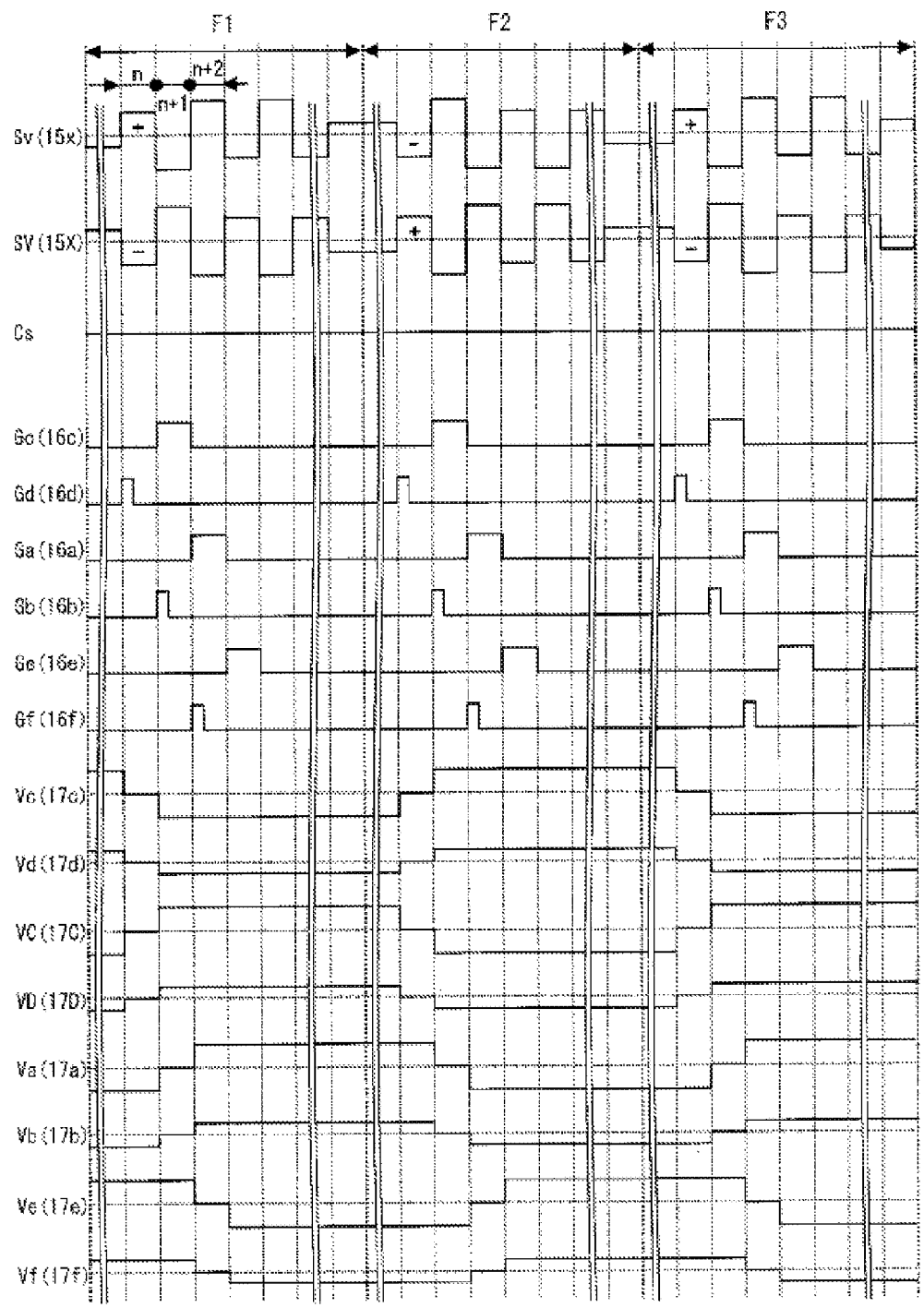
FIG. 43 is a timing chart showing another driving method of the driving method shown in FIG. 40.
Figure 44:
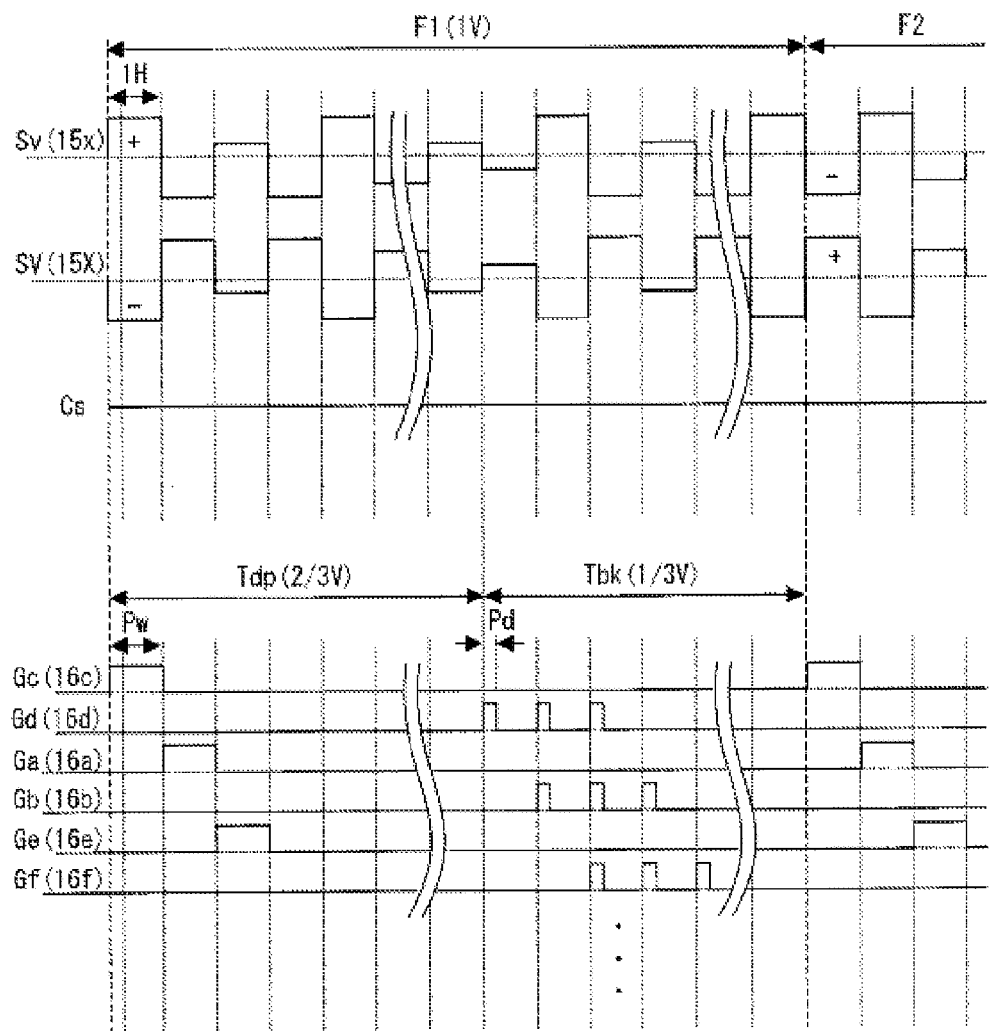
FIG. 44 is a timing chart showing another driving method of the driving method shown in FIG. 41.

Also, according to the driving methods shown in FIGS. 39 to 41, it is possible to supply a Cs potential (Vcom) to each of the pixel electrodes by selecting only the scan signal lines for discharging electric charge (16b, 16d, 16f), and it is therefore not necessary to adopt a charge-sharing method. FIGS. 42 to 44 are timing charts for such cases in which the driving methods shown in FIGS. 39 to 41 do not use a charge-sharing method.

Figure 45:
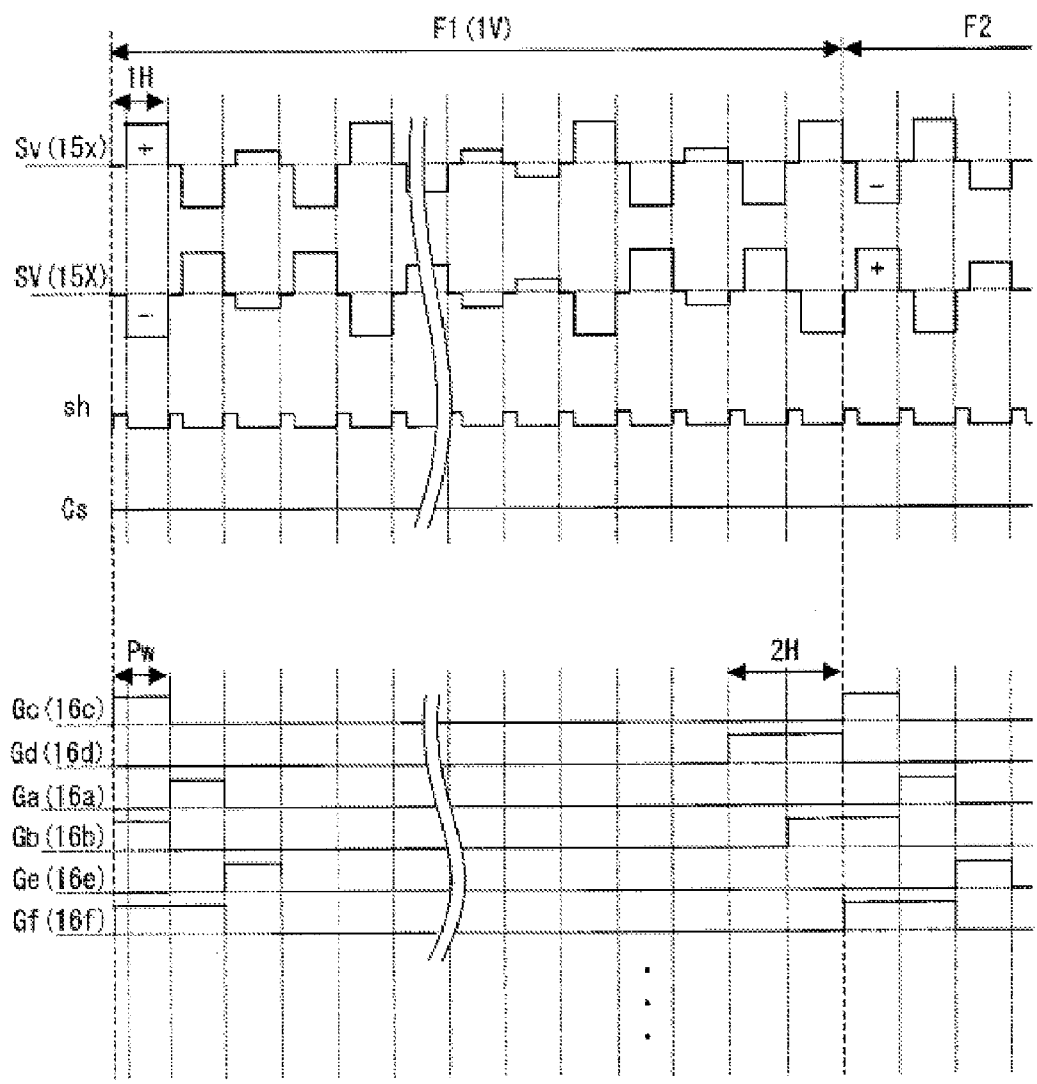
FIG. 45 is a timing chart showing another driving method of the driving method shown in FIG. 40.

Further, in the liquid crystal display device of the present second embodiment, a driving method shown in FIG. 45 can also be adopted. Specifically, as shown in FIG. 45, a period during which the respective scan signal line for discharging electric charge (16b, 16d, 16f) is on (gate-on pulse width) is set to two horizontal scanning periods (2H). In this method, in the pixel 101 of the liquid crystal panel 5b shown in FIG. 34, for example, a Cs potential (Vcom) is supplied to each of the pixel electrodes 17a, 17b, 17a' that are connected to the storage capacitance wiring 18x via the transistors 12a', 12b in the two horizontal scanning periods (2H) immediately prior to the normal writing. As a result, it is possible to securely fix the potential of the each of the pixel electrodes 17a, 17b, 17a' to Vcom prior to the normal writing, which ensure the discharge of accumulated electric charges from the capacitance coupling electrode and also to prevent the deterioration of display quality. Here, the period during which the scan signal lines for discharging electric charges (16b, 16d, 16f) are on is not limited to 2H periods, but can be set to a larger period as desired. Also, it is not necessary to adopt the charge-sharing method for this driving method, either.

Figure 46:
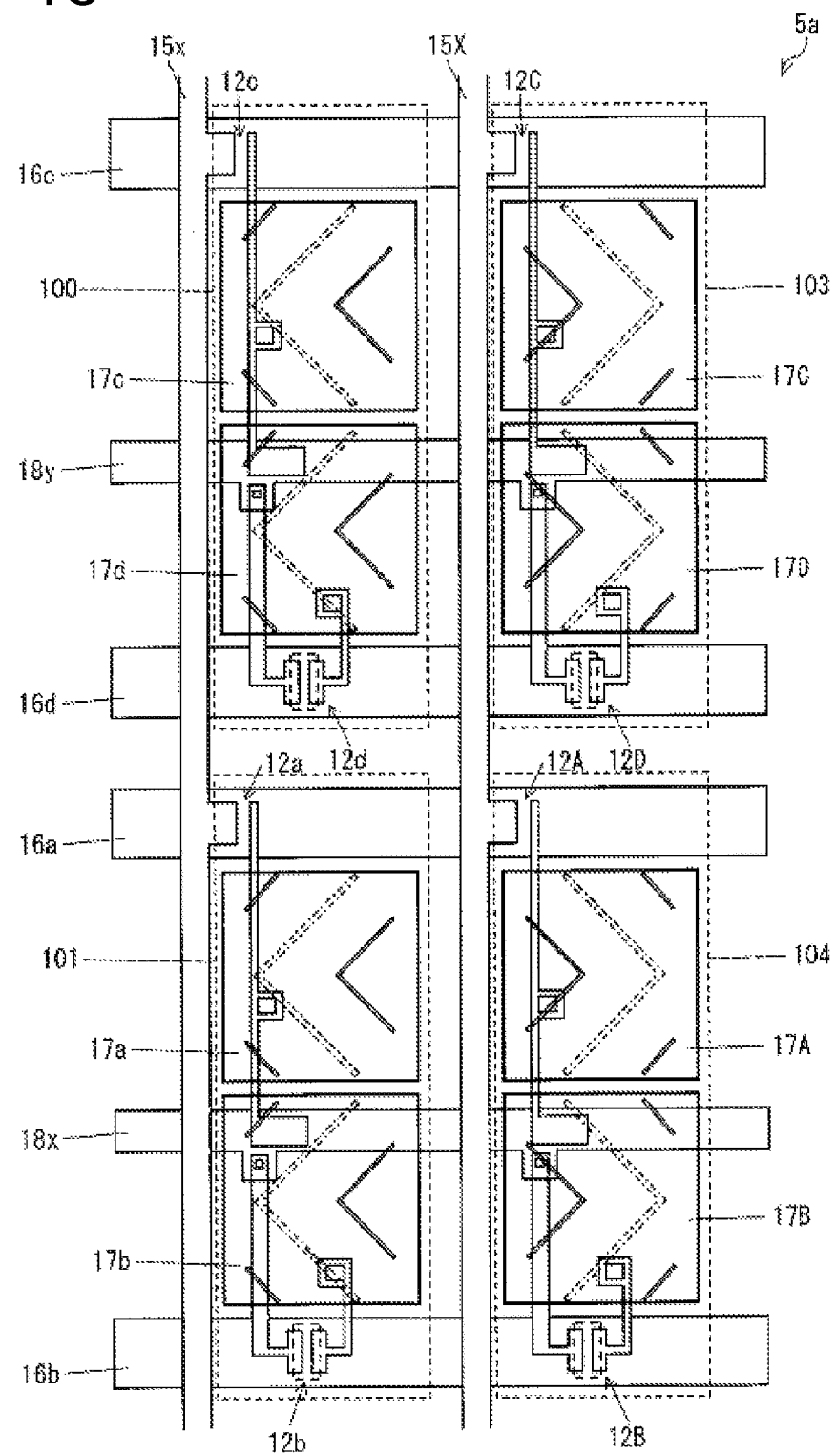
FIG. 46 is a plan view showing a configuration of a liquid crystal panel 5a having a MVA structure.
Figure 47:
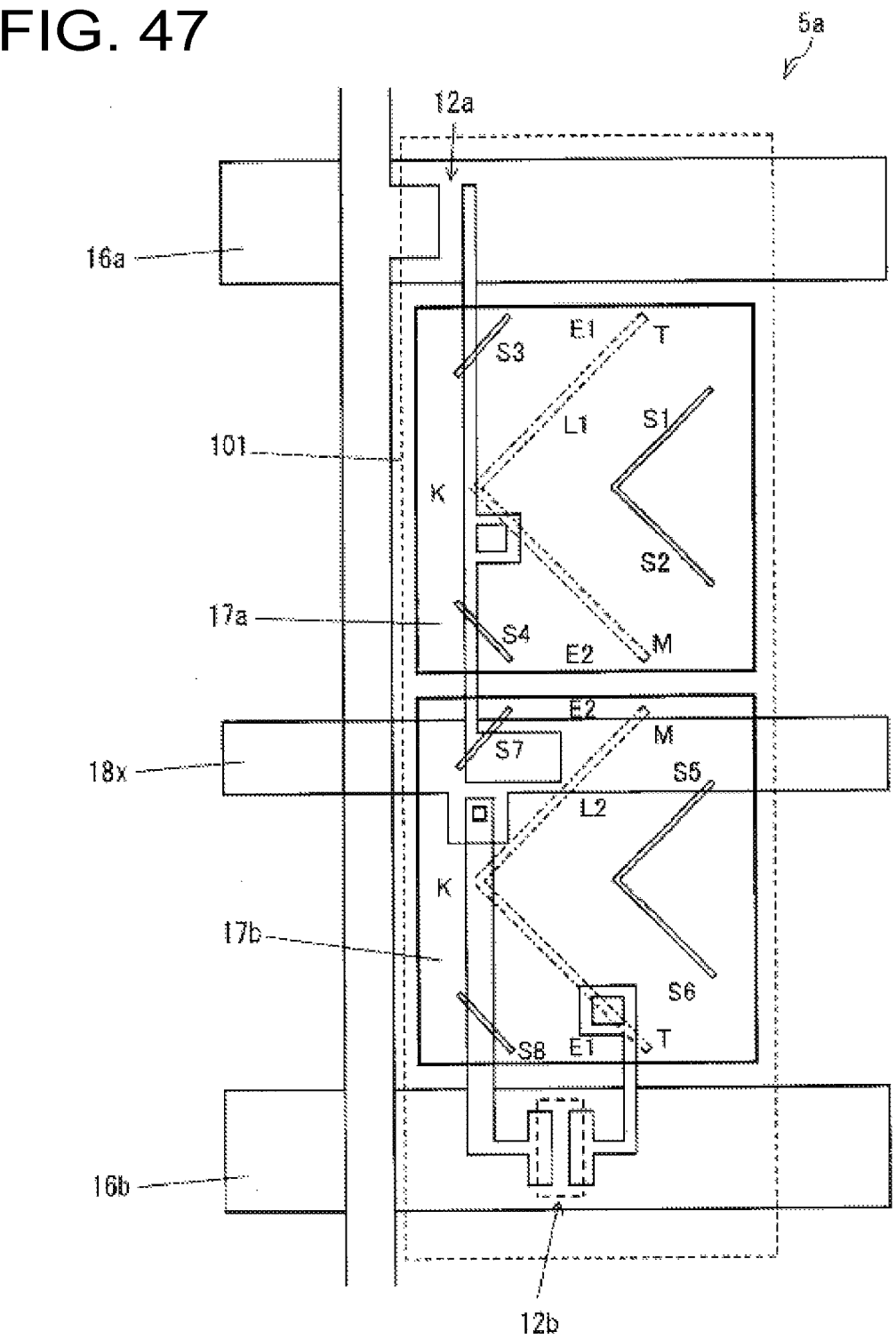
FIG. 47 is a plan view showing an enlarged portion of a liquid crystal panel 5a shown in FIG. 46.

Here, each of the liquid crystal panels 5a, 5b of the above-described first and second embodiments may also be combined with a conventional configuration, such as a MVA (Multidomain Vertical Alignment) structure, for example, as shown in FIG. 46. FIG. 46 shows a configuration in which the liquid crystal panel 5a shown in FIG. 2 is modified to have a MVA structure. Here, while the present liquid crystal panel 5a includes an active matrix substrate, a liquid crystal layer, and a color filter substrate, the liquid crystal layer is not shown in FIG. 46, and only the ribs of the color filter substrate thereof is shown therein. FIG. 47 is a plan view that shows an enlarged portion of FIG. 46. The following description uses a pixel 101 as an example.

As shown in FIG. 47, the pixel 101 includes a subpixel including a pixel electrode 17a (hereinafter referred to as a first subpixel) and also includes a subpixel including a pixel electrode 17b (hereinafter referred to as a second subpixel). The first subpixel is provided with a first alignment control structure, which includes a first rib L1 and slits (pixel electrode slits) S1 to S4. The second subpixel is provided with a second alignment control structure, which includes a second rib L2 and slits (pixel electrode slits) S5 to S8.

In the pixel 101, the first subpixel, which is located on the side of a scan signal line 16a, possesses an edge E1 that lies along the scan signal line 16a and an edge E2 that faces the edge E1; and the second subpixel, which is located on the side of a scan signal line 16b, possesses an edge E1 that lies along the scan signal line 16b and an edge E2 that faces the same edge E1. Here, at a portion of the color filter substrate corresponding to the first subpixel, the first rib L1, which forms a V-shape when viewed in the row direction (left-right direction in the diagram), is provided so that a beginning edge T is located at the edge E1 and an ending edge M is located at the edge E2. Also, at a portion of the color filter substrate corresponding to the second subpixel, the second rib L2, which forms a V-shape when viewed in the row direction (left-right direction in the diagram), is provided so that a beginning edge T is located at the edge E1 and an ending edge M is located at the edge E2. In other words, the orientations of the first rib L1 and that of the second rib L2 are the same.

Further, in the pixel electrode 17a, a plurality of slits S1 to S4 are provided in correspondence with the first rib L1, while in the pixel electrode 17b, a plurality of slits S5 to S8 are provided in correspondence with the second rib L2. Here, the slits S1, S3 are provided on respective sides of a section of the first rib L1 between the beginning edge T and a bend K so as to be approximately in parallel with that section; the slits S2, S4 are provided on respective sides of a section of the first rib L1 between the bend K and the ending edge M so as to be approximately in parallel with that section; the slits S6, S8 are provided on respective sides of a section of the second rib L2 between the beginning edge T and a bend K so as to be approximately in parallel with that section; and the slits S5, S7 are provided on respective sides of a section of the second rib L2 between the bend K and the ending edge M so as to be approximately in parallel with that section. As a result, the geometry of the slits S5 to S8 and arrangement positions thereof respect to the second rib L2 are the same as the geometry of the slits S1 to S4 and the arrangement positions thereof with respect to the first rib L1. Here, in each of the first and second ribs L1, L2, an angle formed by the beginning edge T, the bend K, and the ending edge M (∠TKM) is approximately 90 degrees.

As described above, the slit S1, one side (section TK) of the first rib L1, and the slit S3 are parallel to each other and extend diagonally with respect to the scan signal line 16a (forming an angle of approximately −135°); the slit S2, one side (section KM) of the first rib L1, and the slit S4 are parallel to each other and extend diagonally respect to the scan signal line 16a (forming an angle of approximately −45°); and a portion of the one side (section TK) of the first rib L1 and a portion of the slit S3 are located at the edge E1 of the first subpixel (a section lying along the scan signal line 16a). Meanwhile, the slit S6, one side (section TK) of the second rib L2, and the slit S8 are parallel to each other and extend diagonally with respect to the scan signal line 16b (forming an angle of 135°); the slit S5, one side (section KM) of the second rib L2, and the slit S7 are parallel to each other and extend diagonally with respect to the scan signal line 16b (forming an angle of 45°); and a portion of the one side (section TK) of the second rib L2 and a portion of the slit S8 are located at the edge E1 of the second subpixel (a section lying along the scan signal line 16b).

According to the liquid crystal display device using the present liquid crystal panel 5a, an advantage that a wider viewing range can be realized is obtained. Also, in the present liquid crystal panel 5a, as shown in FIG. 46, the orientation of the ribs L1, L2 is set to be opposite between two pixels that are adjacent in the row direction (for example, the pixels 101, 104), thereby eliminating the influence of alignment disorder caused by a bias towards a certain alignment area. As a result, a liquid crystal display device with superior viewing angle characteristics can be realized.

Here, the present liquid crystal panel is shown to be formed with the ribs provided to the color filter substrate. However, the configuration does not have to be limited thereto, and slits may be provided instead of the ribs on the color filter substrate.

(Configurations of Liquid Crystal Display Unit and Liquid Crystal Display Device)

Figure 48:
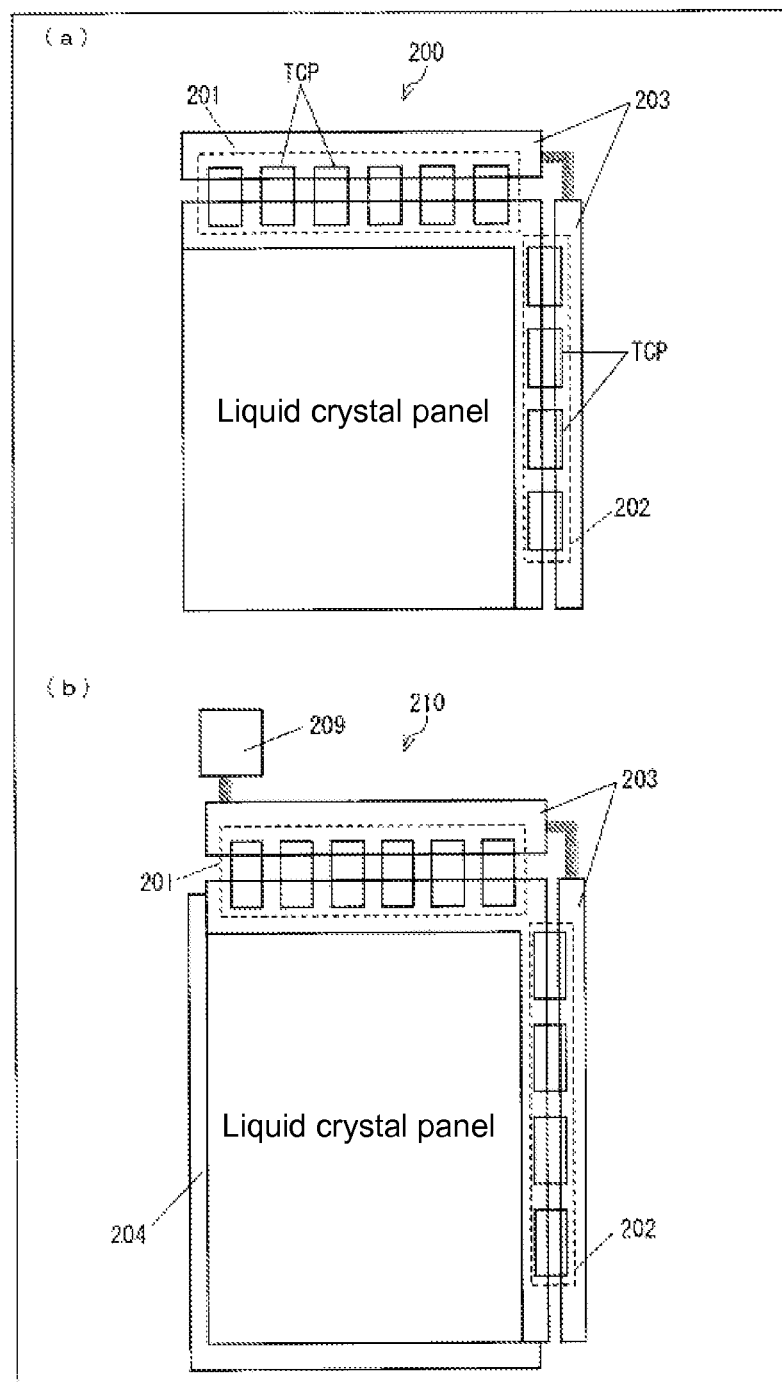
FIG. 48(a) is a schematic view showing a configuration of the present liquid crystal display unit.
FIG. 48(b) is a schematic view showing a configuration of the present liquid crystal display device.

Lastly, configuration examples of a liquid crystal display unit and a liquid crystal display device of the present invention are described in the following. According to each of the above-described embodiments, the present liquid crystal display unit and liquid crystal display device are configured as follows. That is, two polarizers A, B are attached to respective sides of liquid crystal panel 5a, 5b so that the polarizing axis of the polarizer A and that of the polarizer B are perpendicular to each other. Here, an optical compensation sheet and or the like may be laminated on the polarizer, if necessary. Next, as shown in FIG. 48(a), drivers (gate driver 202, source driver 201) are connected. Here, as one example, a connection of drivers using a TCP (Tape Career Package) method is described as follows. First, an ACF (Anisotropic Conductive Film) is temporarily attached by pressure to terminals of the liquid crystal panel. Next, TCPs on which the drivers are mounted are cut out from a carrier tape, aligned to the panel terminal electrodes, heated, and are permanently bonded by pressure. After that, circuit substrates 203 (PWB (Printed Wiring Board)) for linking the driver TCPs are connected to input terminals of the TCPs via ACF. As a result, a liquid crystal display unit 200 is completed. After that, as shown in FIG. 48(b), a display control circuit 209 is connected to each of the drivers (201, 202) of the liquid crystal display unit via the circuit substrate 203 and is combined with a lighting device (backlight unit) 204 to construct a liquid crystal display device 210.

Figure 49:
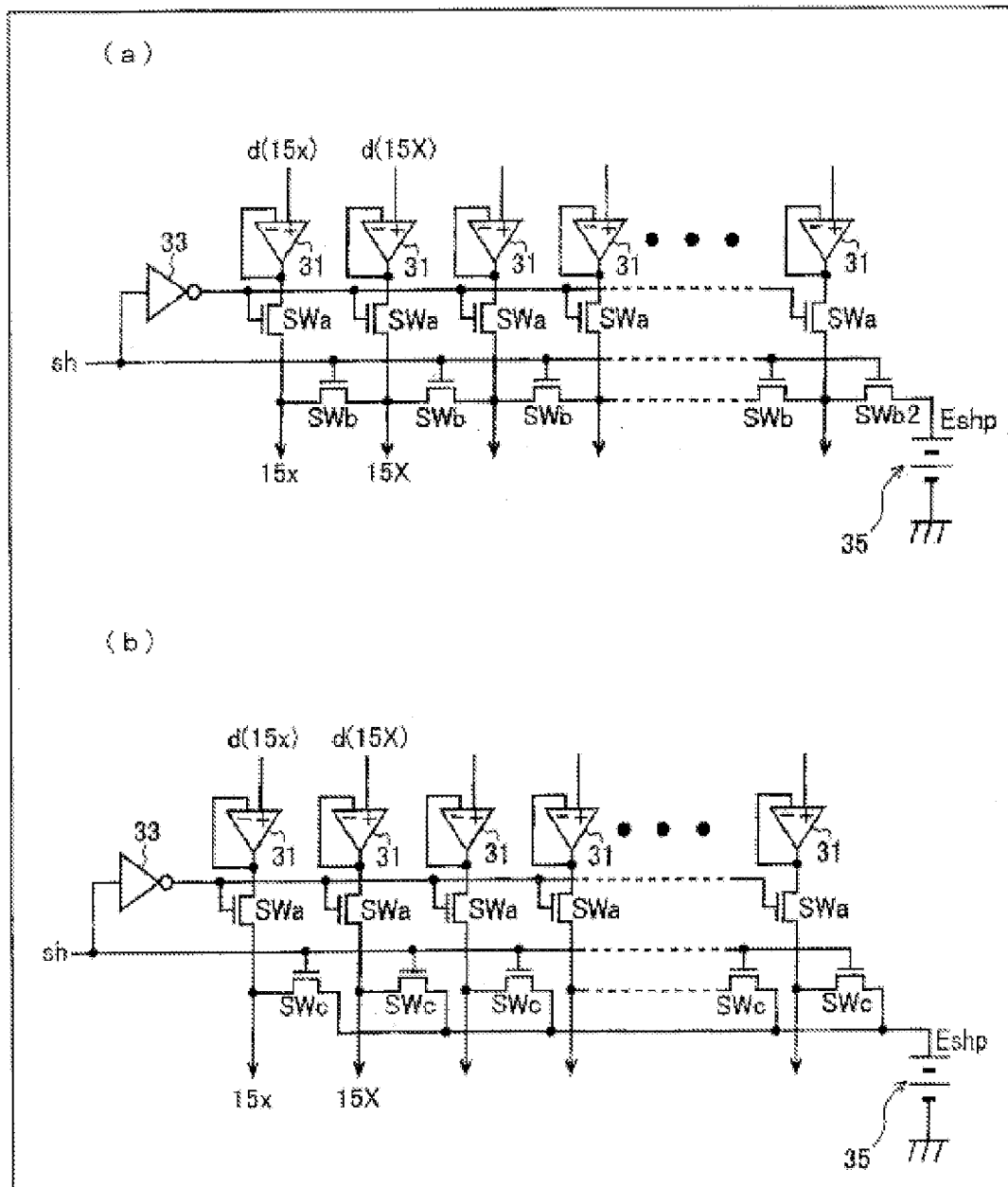
FIGS. 49(a), 49(b) are circuit diagrams showing another configuration of a source driver.

FIG. 49(a) shows a configuration of a source driver in case that a refreshing period is provided for the present liquid crystal display device. As shown in FIG. 49(a), the source driver in this case is equipped with a buffer 31, a data output switch SWa, and a refresh switch SWb for each data signal line. Corresponding data d is inputted to the buffer 31, and an output from the buffer 31 is connected to an output terminal for a data signal line via the data output switch SWa. Also, the output terminals that correspond respectively to two adjacent data signal lines are connected to each other via the refresh switch SWb. In other words, each of the refresh switches SWb is connected in series, and one end thereof is connected to a refresh potential supply source 35 (Vcom). Here, to the gate terminal of the data output switch SWa, a charge-sharing signal sh is inputted via an inverter 33, and to a gate terminal of the refresh switch SWb, the charge-sharing signal sh is inputted.

Here, the source driver shown in FIG. 49(a) may be configured as shown in FIG. 49(b). Specifically, in such a configuration, a refresh switch SWc is connected only to a corresponding data signal line and a refresh potential supply source 35 (Vcom), thereby not connecting the refresh switches SWc in series. As a result, it becomes possible to supply a refresh potential immediately to each data signal line.

Figure 50:
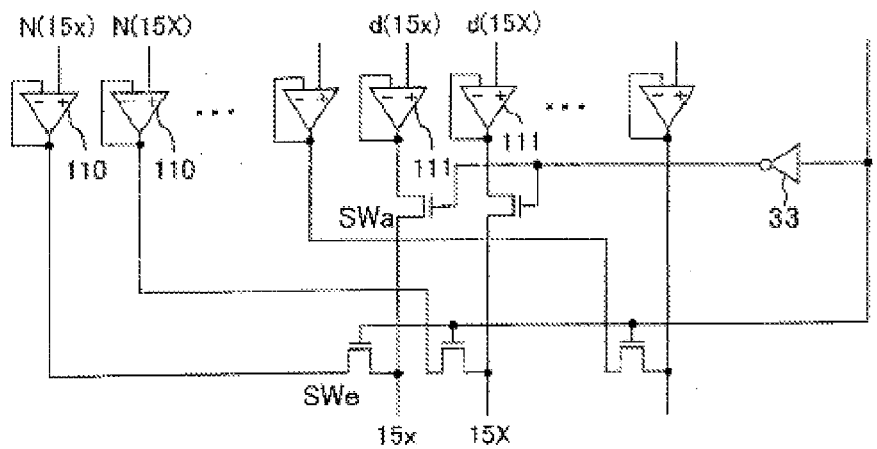
FIG. 50 is a circuit diagram showing still another configuration of a source driver.

Here, according to the above-described configuration of the source driver, the refresh potential is designated as Vcom. But the present invention is not limited to such an example. For example, an appropriate refresh potential for a given data signal line may be calculated according to the level of a signal potential supplied to that data signal line during one previous horizontal scanning period and also according to a signal potential to be supplied to that data signal line during the current horizontal scanning period. The calculated refresh potential then is supplied to that data signal line. A configuration of the source driver in such a case is shown in FIG. 50. According to this configuration, for each data signal line, a data output buffer 111, a refresh buffer 110, a data output switch SWa, and a refresh switch SWe are provided. To the data output buffer 111, corresponding data d is inputted, and an output from the data output buffer 111 is connected to an output terminal for the data signal line via the data output switch SWa. To the refresh buffer 110, corresponding non-image data N (data corresponding to an appropriate refresh potential that is determined according to the level of a signal potential supplied during one preceding horizontal scanning period and also according to a signal potential to be be supplied during the current horizontal scanning period) is inputted. An output from the refresh buffer 110 is connected to the output terminal for the data signal line via the refresh switch SWe.

The expression "polarity of a potential" in the present invention indicates high (positive) or low (negative) relative to a reference potential. Here, the reference potential may be Vcom (common potential), which is a potential of a common electrode (the opposite electrode), or any other potential that may arbitrarily be selected.

Figure 51:
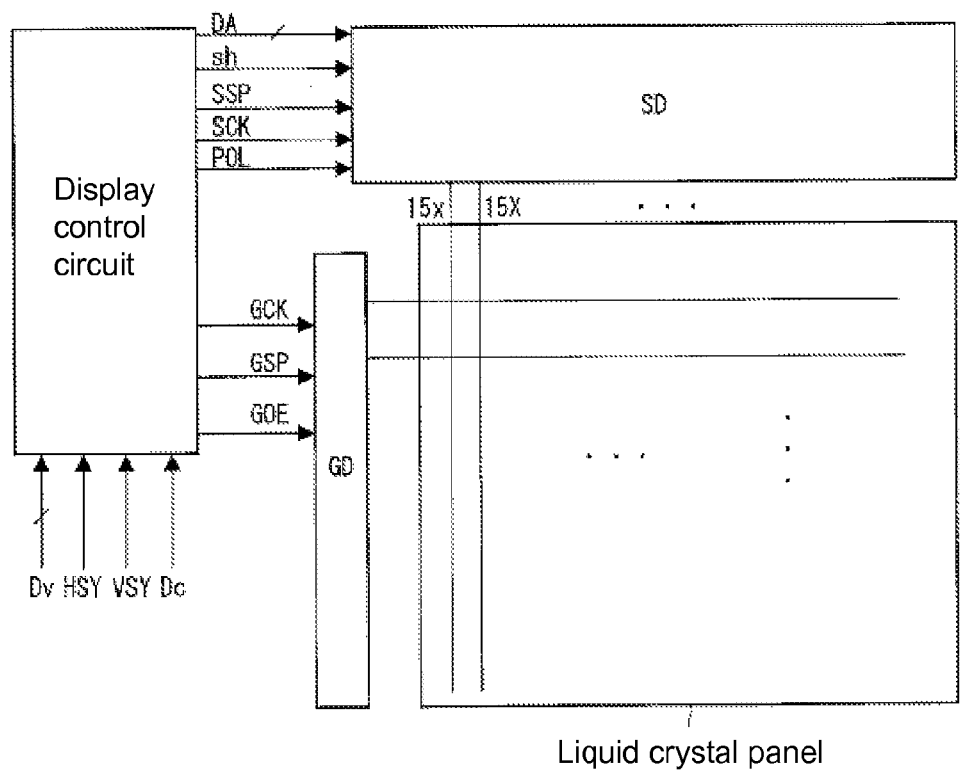
FIG. 51 is a block diagram explaining an entire construction of the present liquid crystal display device.

FIG. 51 is a block diagram showing a configuration of the present liquid crystal display device. As shown in the diagram, the present liquid crystal display device is equipped with a display (liquid crystal panel), a source driver (SD), a gate driver (GD), and a display control circuit. The source driver drives data signal lines; the gate driver drives scan signal lines; and the display control circuit controls the source driver and the gate driver.

The display control circuit receives from an outside signal source (for example, a tuner) a digital video signal Dv expressing an image that should be displayed; horizontal and vertical synchronizing signals HSY and VSY for the digital video signal Dv; and a control signal Dc for controlling display operations. Also, based on the received signals Dv, HSY, VSY, Dc, the display control circuit generates and outputs a data start pulse signal SSP, a data clock signal SCK, a charge-sharing signal sh, a digital image signal DA expressing an image to be displayed (a signal corresponding to the video signal Dv), a gate start pulse signal GSP, a gate clock signal GCK, and a gate driver output control signal (scan signal output control signal) GOE, as the signals instructing the display part to display the image expressed by the digital video signal Dv.

More specifically, after performing, if necessary, a timing adjustment on the video signal Dv using an internal memory, the display control circuit outputs the digital image signal DA; generates the data clock signal SCK as a signal that is composed of pulses corresponding to respective pixels of the image expressed by the digital image signal DA; generates the data start pulse signal SSP as a signal that becomes high (level H) only for a predetermined period during every one horizontal scanning period based on the horizontal synchronizing signal HSY; generates the gate start pulse signal GSP as a signal that becomes high (level H) only for a predetermined period during every one frame period (every one vertical scanning period) based on the vertical synchronizing signal VSY; generates the gate clock signal GCK based on the horizontal synchronizing signal HSY; and generates the charge-sharing signal sh and the gate driver output control signal GOE based on the horizontal synchronizing signal HSY and the control signal Dc.

Of the signals generated by the display control circuit as describe above, the digital image signal DA, the charge-sharing signal sh, a signal POL that controls the polarity of a signal potential (data signal potential), the data start pulse signal SSP, and the data clock signal SCK are inputted to the source driver; while the gate start pulse signal GSP, the gate clock signal GCK, and the gate driver output control signal GOE are inputted to the gate driver.

Based on the digital image signal DA, the data clock signal SCK, the charge-sharing signal sh, the data start pulse signal SSP, and the polarity reversing signal POL, the source driver sequentially generates analogue potentials (signal potential) that correspond to pixel values on each scan signal line of the image expressed by the digital image signal DA in every horizontal scanning period, and outputs the resultant data signals to the data signal lines (such as 15x, 15X).

Based on the gate start pulse signal GSP, the gate clock signal GCK, and the gate driver output control signal GOE, the gate driver generates gate-on pulse signals and outputs the gate-on pulse signals to the scan signal lines, thereby selectively driving the scan signal lines.

As the source driver and the gate driver drive the data signal lines and the scan signal lines of the display (liquid crystal panel) as described above, the signal potentials are written from the data signal lines to the respective pixel electrode via the transistors (TFTs) connected to the selected scan signal line. As a result, a voltage is applied to the liquid crystal layer of each subpixel, thereby controlling the amount of light transmission from the backlight to display the image indicated by the digital video signal Dv on each subpixel.

Figure 52:
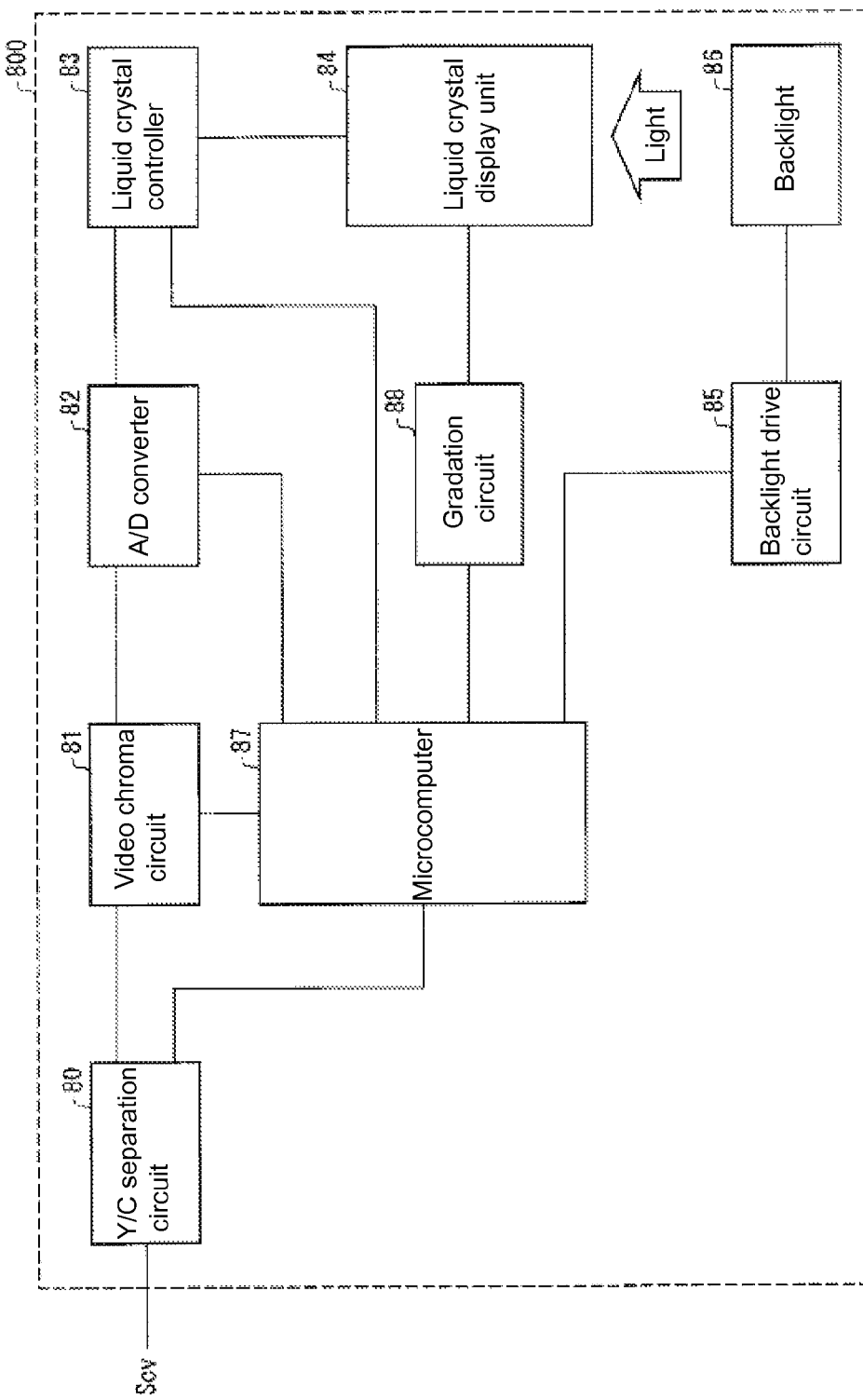
FIG. 52 is a block diagram explaining functions of the present liquid crystal display device.

Next, one configuration example of the present liquid crystal display device that is applied to a television receiver is described as follows. FIG. 52 is a block diagram showing a configuration of a liquid crystal display device 800 for a television receiver. The liquid crystal display device 800 is equipped with a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. Here, the liquid crystal display unit 84 is composed of a liquid crystal panel as well as a source driver and a gate driver for driving the liquid crystal panel.

First, in the liquid crystal display device 800 according to the above-described configuration, a multi-color image signal Scv as a television signal is inputted from outside to the Y/C separation circuit 80 and is separated into a luminance signal and a color signal. The luminance signal and the color signal are converted via the video chroma circuit 81 into analogue RGB signals that correspond to three primary colors of light. These analogue RGB signals are further converted via the A/D converter 82 into digital RGB signals. These digital RGB signals are inputted to the liquid crystal controller 83. At the Y/C separation circuit 80, horizontal and vertical synchronizing signals are also extracted from the multi-color image signal Scv inputted from outside and are inputted into the liquid crystal controller 83 via the microcomputer 87.

The digital RGB signals from the liquid crystal controller 83 are inputted to the liquid crystal display unit 84 at a predetermined timing along with a timing signal determined by the above-mentioned synchronizing signals. Also, in the gradation circuit 88, a gradation potential is generated respectively for each of three primary colors R, G, B, for color display and is supplied to the liquid crystal display unit 84. In the liquid crystal display unit 84, driving signals (data signal (signal potential), scan signal, and such) are generated by the internal source and gate drivers and the like in accordance with the aforementioned RGB signals, the timing signals and the gradation potentials. According to these driving signals, a color image is displayed on the internal liquid crystal panel. Here, to display an image using this liquid crystal display unit 84, it is necessary to radiate light from behind the liquid crystal panel of the liquid crystal display unit. In this liquid crystal display device 800, the backlight drive circuit 85 drives the backlight 86 under the control of the microcomputer 87 to radiate light to the back side of the liquid crystal panel. The microcomputer 87 controls the entire system, including the above-described processes. Here, image signals (multi-color image signals) inputted from outside are not limited to image signals based on the television broadcasting, but can be image signals captured by cameras or supplied via the Internet. This liquid crystal display device 800 is capable of displaying images based on various image signals.

Figure 53:
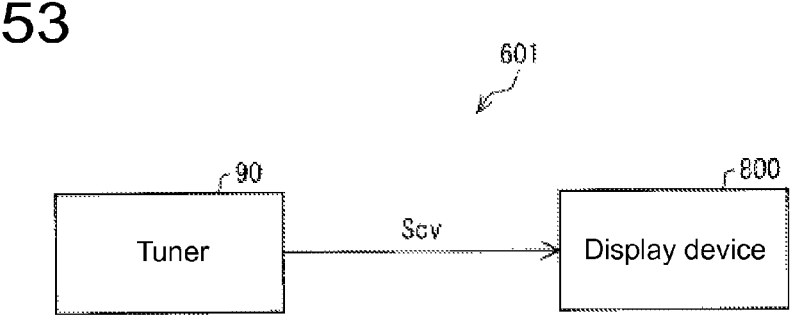
FIG. 53 is a block diagram explaining functions of the present television receiver.

When displaying an image by the liquid crystal display device 800 based on the television broadcasting, a tuner 90 is connected to the liquid crystal display device 800 as shown in FIG. 53, thereby constructing the present television receiver 601. The tuner 90 extracts signals for a channel that should be received from reception waves (high frequency signals) received by an antenna (not shown); converts the extracted signals to intermediate frequency signals; and extracts multi-color image signals Scv as television signals by detection through the intermediate frequency signals. The multi-color image signals Scv are inputted to the liquid crystal display device 800, as already explained, and an image based on these multi-color image signals Scv is displayed by the liquid crystal display device 800.

Figure 54:
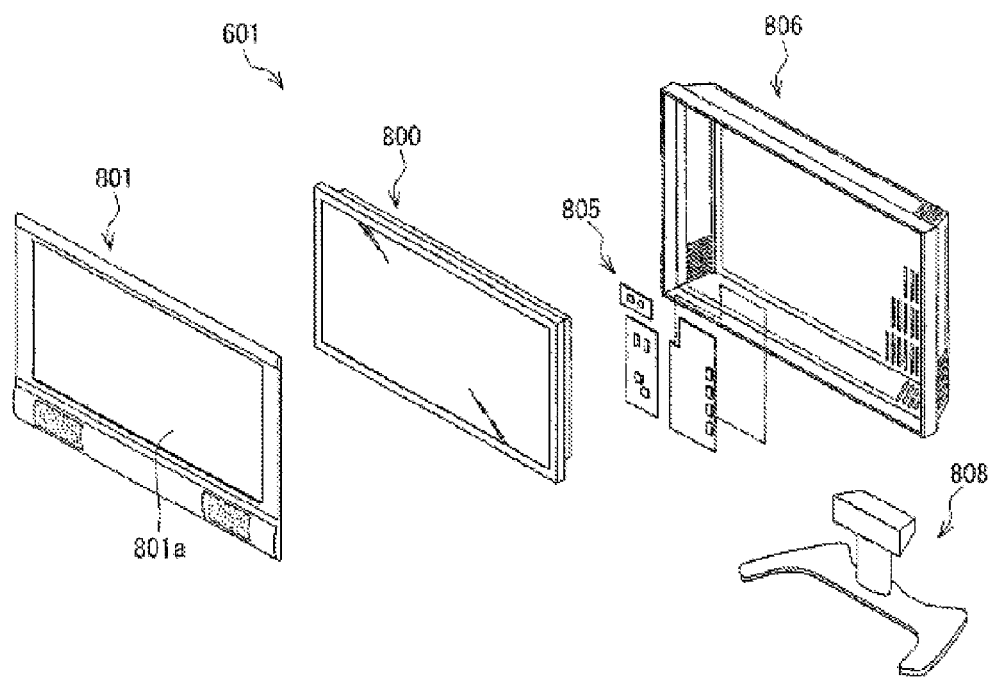
FIG. 54 is an exploded perspective view showing a configuration of the present television receiver.
Figure 55:
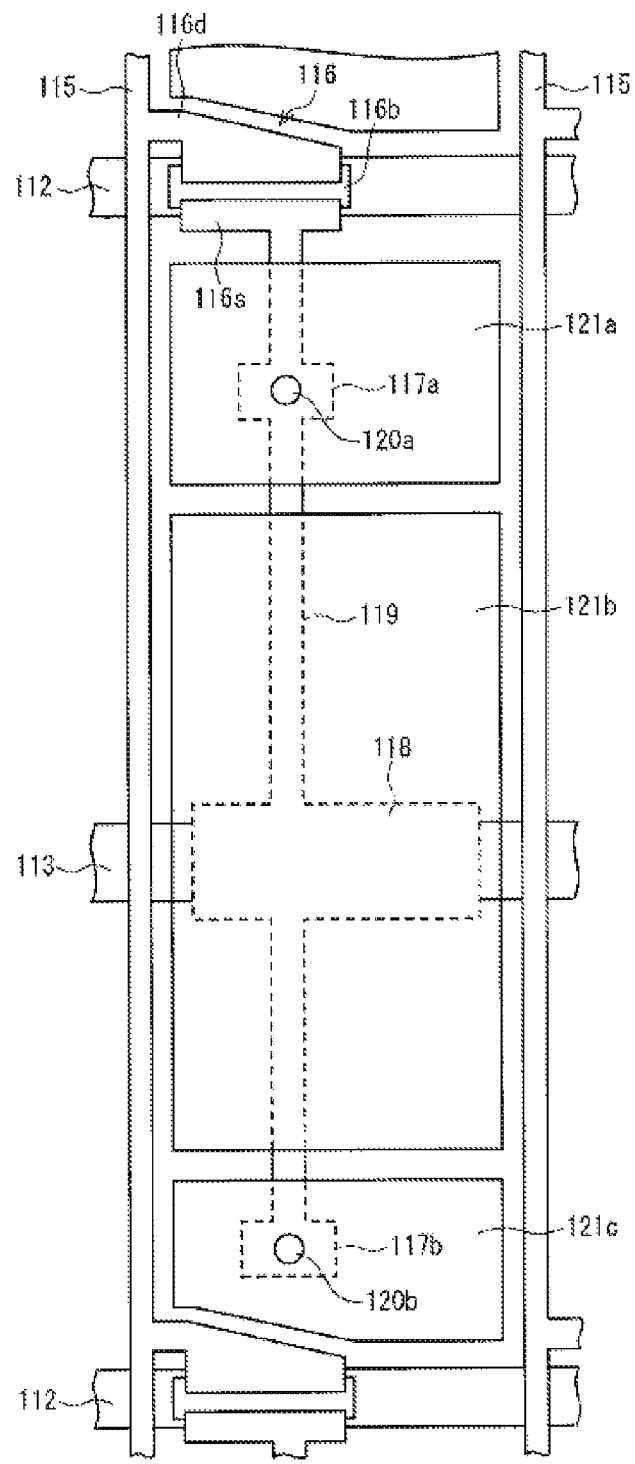
FIG. 55 is a plan view showing a configuration of a conventional liquid crystal panel.
Figure 56:
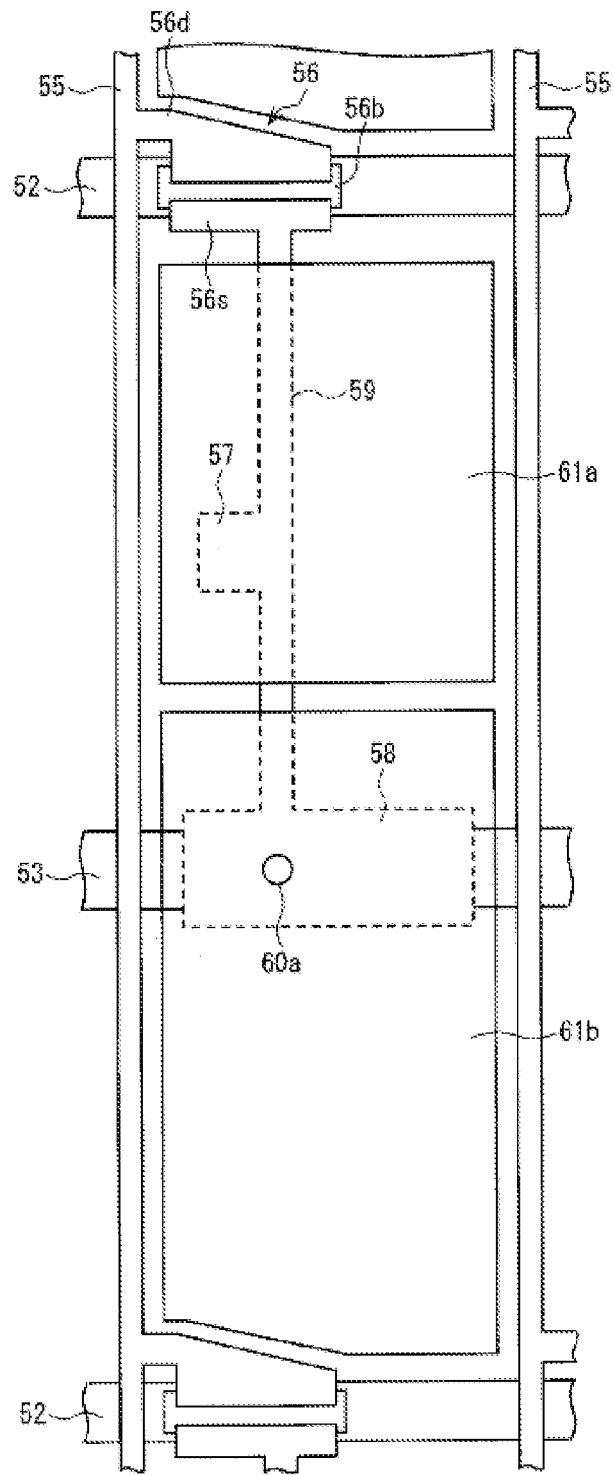
FIG. 56 is a plan view showing a configuration of a conventional liquid crystal panel.
Figure 57:
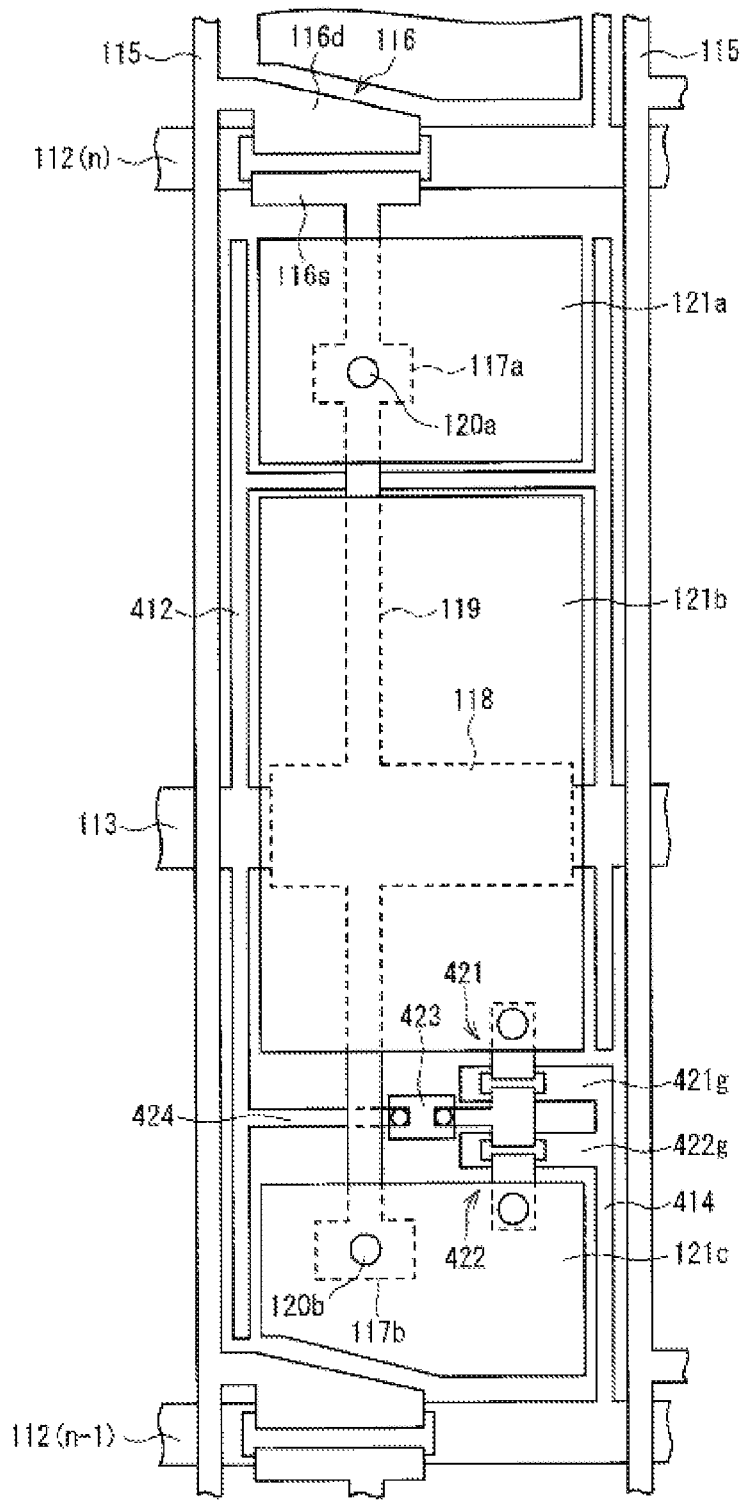
FIG. 57 is a plan view showing a configuration of a conventional liquid crystal panel.

FIG. 54 is an exploded perspective view showing one configuration example of the present television receiver. As shown in the figure, the present television receiver 601 possesses a first case 801 and a second case 806 in addition to the liquid crystal display device 800 as its components and is configured such that the liquid crystal display device 800 is sandwiched between, and is enclosed in, the first and second cases 801, 806. In the first case 801, an aperture 801a is formed to transmit an image displayed by the liquid crystal display device 800. Also, the second case 806 is provided to cover the back side of the liquid crystal display device 800 and is provided with an operation circuit 805 for operating the display device 800 and with a supporter 808 attached to the bottom thereof.

The present invention is not limited to the above-described embodiments, but includes various other embodiments, which may be obtained by modifying the above-described embodiments based on common technical knowledge or by combining any of such modifications.

INDUSTRIAL APPLICABILITY

A liquid crystal panel and a liquid crystal display device of the present invention are particularly suitable for a liquid crystal television, for example.

DESCRIPTION OF REFERENCE CHARACTERS 5a, 5b liquid crystal panel
11a, 11a', 11b, 11b' contact hole
12a to 12f, 12A to 12F transistor
15x, 15X data signal line
16a to 16f scan signal line
17a to 17f pixel electrode
17A to 17F pixel electrode
17a' to 17f' pixel electrode
17A' to 17F' pixel electrode
18x to 18z storage capacitance wiring
21 organic gate insulating film
22 inorganic gate insulating film
24 semiconductor layer
25 inorganic interlayer insulating film
26 organic interlayer insulating film
27a, 27b, 27a" drain lead-out wiring
27a' extended coupling capacitance electrode
28a contact hole
28b source lead-out wiring
28b' extension (first extension)
28b" extension (second extension)
37a coupling capacitance electrode
67b storage capacitance electrode
11a, 11a', 11b, 11b' contact hole
77a, 77a', 77b, 77b' contact electrode
84 liquid crystal display unit
100 to 105 pixel
200, 210 liquid crystal display unit
601 television receiver
800 liquid crystal display device
C100 to C105 coupling capacitance

What is claimed is:
1. An active matrix substrate comprising:
a data signal line;
a storage capacitance wiring;
a first scan signal line and a second scan signal line;
a first transistor connected to the data signal line and to the first scan signal line;

a second transistor connected to the storage capacitance wiring and to the second scan signal line; and first and second pixel electrodes formed in a pixel area, the first pixel electrode being connected to the data signal line via the first transistor, the second pixel electrode being connected to the first pixel electrode via a capacitance, the second pixel electrode being connected to the storage capacitance wiring via the second transistor.

2. The active matrix substrate according to claim 1, further comprising:

a third pixel electrode formed in the pixel area, the third pixel electrode being electrically connected to the first pixel electrode.

3. The active matrix substrate according to claim 2, further comprising:

a third transistor connected to the second scan signal line, wherein the third pixel electrode is further connected to the storage capacitance wiring via the third transistor.

4. The active matrix substrate according to claim 3, comprising:

a coupling capacitance electrode overlapping the second pixel electrode via an interlayer insulating film, wherein a first lead-out wiring led out from a conductive electrode of the first transistor, a fourth lead-out wiring led out from a conductive electrode of the third transistor, and the coupling capacitance electrode are connected to each other in a same layer, the first lead-out wiring and the first pixel electrode are connected via a contact hole, and the fourth lead-out wiring and the third pixel electrode are connected via a contact hole, wherein a second lead-out wiring led out from one conductive electrode of the second transistor is connected to the storage capacitance wiring via a contact hole, and wherein a third lead-out wiring led out from the other conductive electrode of the second transistor is connected to the second pixel electrode via a contact hole.

5. The active matrix substrate according to claim 2, wherein the pixel area is divided into two sections by the storage capacitance wiring crossing the pixel area, the first pixel electrode is arranged at one of the two sections while the third pixel electrode is arranged at the other thereof, and the second pixel electrode is arranged between the first pixel electrode and the third pixel electrode.

6. The active matrix substrate according to claim 2, wherein the first pixel electrode, the second pixel electrode, and the third pixel electrode are arranged such that at least a portion of the first pixel electrode lies adjacent to the first scan signal line, such that at least a portion of the third pixel electrode lies adjacent to the second scan signal line, and such that one edge of the second pixel electrode lies adjacent to the first scan signal line while the other edge thereof lies adjacent to the second scan signal line.

7. The active matrix substrate according to claim 2, further comprising:

a coupling capacitance electrode overlapping the second pixel electrode via an interlayer insulating film, wherein a first lead-out wiring led out from a conductive electrode of the first transistor and the coupling capacitance electrode are connected to each other in a same layer, and the first lead-out wiring and the first pixel electrode are connected via a contact hole, wherein a second lead-out wiring led out from one conductive electrode of the second transistor is connected to the storage capacitance wiring via a contact hole, wherein a third lead-out wiring led out from the other conductive electrode of the second transistor is connected to the second pixel electrode via a contact hole; and wherein an extended coupling capacitance electrode connected to the coupling capacitance electrode is connected to the third pixel electrode via a contact hole.

8. The active matrix substrate according to claim 2, wherein when applied to a liquid crystal display device, subpixels including the first pixel electrode and the third pixel electrode become bright subpixels, and subpixels including the second pixel electrode become dark subpixels.

9. The active matrix substrate according to claim 1, further comprising:

a third pixel electrode formed in the pixel area, the third pixel electrode being connected to the first pixel electrode via a capacitance, the third pixel electrode being electrically connected to the second pixel electrode.

10. The active matrix substrate according to claim 9, further comprising:

a third transistor connected to the second scan signal line, wherein the first pixel electrode is further connected to the storage capacitance wiring via the third transistor.

11. The active matrix substrate according to claim 10, comprising:

a coupling capacitance electrode overlapping the second pixel electrode via an interlayer insulating film, wherein a first lead-out wiring led out from a conductive electrode of the first transistor and the coupling capacitance electrode are connected to each other in a same layer, and the first lead-out wiring and the first pixel electrode are connected via a contact hole, wherein a second lead-out wiring led out from one conductive electrode of the second transistor is connected to the storage capacitance wiring via a contact hole, wherein a third lead-out wiring led out from the other conductive electrode of the second transistor is connected to the second pixel electrode via a contact hole, and the third lead-out wiring is connected to the third pixel electrode via a contact hole, and wherein a fourth lead-out wiring led out from a conductive electrode of the third transistor is connected to the first pixel electrode via a contact hole.

12. The active matrix substrate according to claim 9, wherein the pixel area is divided into two sections by the storage capacitance wiring crossing the pixel area, the second pixel electrode is arranged at one of the two sections while the third pixel electrode is arranged at the other thereof, and the first pixel electrode is arranged between the second pixel electrode and the third pixel electrode.

13. The active matrix substrate according to claim 9, wherein the first pixel electrode, the second pixel electrode, and the third pixel electrode are arranged such that at least a portion of the second pixel electrode lies adjacent to the first scan signal line, such that at least a portion of the third pixel electrode lies adjacent to the second scan signal line, and such that one edge of the first pixel electrode lies adjacent to the first scan signal line while the other edge thereof lies adjacent to the second scan signal line.

14. The active matrix substrate according to claim 9, further comprising:

a coupling capacitance electrode overlapping the second pixel electrode via an interlayer insulating film, wherein a first lead-out wiring led out from a conductive electrode of the first transistor and the coupling capacitance electrode are connected to each other in a same layer, and the first lead-out wiring and the first pixel electrode are connected via a contact hole, wherein a second lead-out wiring led out from one conductive electrode of the second transistor is connected to the storage capacitance wiring via a contact hole, and wherein a third lead-out wiring led out from the other conductive electrode of the second transistor is connected to the second pixel electrode via a contact hole, and the third lead-out wiring is connected to the third pixel electrode via a contact hole.

15. The active matrix substrate according to claim 9, comprising:

a coupling capacitance electrode overlapping the second pixel electrode via an interlayer insulating film, wherein a first lead-out wiring led out from a conductive electrode of the first transistor and the coupling capacitance electrode are connected to each other in a same layer, and the first lead-out wiring and the first pixel electrode are connected via a contact hole, wherein a second lead-out wiring led out from one conductive electrode of the second transistor is connected to the storage capacitance wiring via a contact hole, wherein a third lead-out wiring led out from the other conductive electrode of the second transistor is connected to the second pixel electrode via a contact hole, and wherein a fourth lead-out wiring led out from a conductive electrode of the third transistor is connected to the first pixel electrode via a contact hole.

16. The active matrix substrate according to claim 9, wherein when applied to a liquid crystal display device, subpixels including the first pixel electrode become bright subpixels, and subpixels including the second pixel electrode and the third pixel electrode become dark subpixels.

17. The active matrix substrate according to claim 16, wherein the storage capacitance wiring includes an extended storage capacitance wiring branching off therefrom, and wherein when viewed planarly, the extended storage capacitance wiring is provided so as to overlap a portion of an edge of the second pixel electrode and the third pixel electrode or to extend along an outer side thereof.

18. The active matrix substrate according to claim 1, further comprising:

a third transistor connected to the second scan signal line, wherein the first pixel electrode is further connected to the storage capacitance wiring via the third transistor.

19. The active matrix substrate according to claim 18, wherein the second transistor and the third transistor are formed such that each conductive electrode thereof does not overlap the second scan signal line.

20. The active matrix substrate according to claim 1, wherein the second transistor is formed such that each conductive electrode there of does not overlap the second scan signal line.

21. The active matrix substrate according to claim 1, wherein the storage capacitance wiring forms a storage capacitance with the first pixel electrode.

22. The active matrix substrate according to claim 21, wherein the storage capacitance wiring further forms a storage capacitance with the second pixel electrode.

23. The active matrix substrate according to claim 22, further comprising a storage capacitance electrode formed in a same layer as conductive electrodes of the first transistor and the second transistor, the storage capacitance electrode being electrically connected to the first pixel electrode, the storage capacitance electrode overlapping the storage capacitance wiring via a gate insulating film.

24. The active matrix substrate according to claim 23, wherein at least a portion of a section of the gate insulating film overlapping the storage capacitance electrode is thinned.

25. The active matrix substrate according to claim 24, wherein the gate insulating film is composed of an inorganic insulating film and an organic insulating film, and the organic insulating film is removed from at least a portion of a section of the gate insulating film overlapping the storage capacitance electrode.

26. The active matrix substrate according to claim 22, further comprising a coupling capacitance electrode formed in a same layer as conductive electrodes of the first transistor and the second transistor, the coupling capacitance electrode being electrically connected to the first pixel electrode, the coupling capacitance electrode overlapping the second pixel electrode via an interlayer insulating film, the coupling capacitance electrode overlapping the storage capacitance wiring via a gate insulating film.

27. The active matrix substrate according to claim 26, wherein at least a portion of a section of the interlayer insulating film overlapping the coupling capacitance electrode is thinned.

28. The active matrix substrate according to claim 1, further comprising:

a coupling capacitance electrode overlapping the second pixel electrode via an interlayer insulating film, wherein a first lead-out wiring led out from a conductive electrode of the first transistor and the coupling capacitance electrode are connected to each other in a same layer, and the first lead-out wiring and the first pixel electrode are connected via a contact hole, wherein a second lead-out wiring led out from one conductive electrode of the second transistor is connected to the storage capacitance wiring via a contact hole, and wherein a third lead-out wiring led out from the other conductive electrode of the second transistor is connected to the second pixel electrode via a contact hole.

29. The active matrix substrate according to claim 28, wherein the second lead-out wiring overlaps the second pixel electrode via an interlayer insulating film, and wherein at least a portion of the interlayer insulating film is thinned.

30. The active matrix substrate according to claim 29, wherein the interlayer insulating film is composed of an inorganic insulating film and an organic insulating film, and the organic insulating film is removed from at least a portion of a section of the interlayer insulating film overlapping the coupling capacitance electrode.

31. The active matrix substrate according to claim 30, wherein the organic insulating film contains at least one of acrylic resin, epoxy resin, polyimide resin, polyurethane resin, novolak resin, and siloxane resin.

32. The active matrix substrate according to claim 1, wherein a storage capacitance is formed between at least one of the first pixel electrode and the second pixel electrode provided in a pixel area of a current row and at least one of the first scan signal line and the second scan signal line for a pixel area of a previous row.

33. The active matrix substrate according to claim 1, wherein when an extension direction of scan signal lines is regarded as a row direction, two scan signal lines correspond to two pixel areas arranged in the row direction, and two pixel electrodes are aligned in the column direction in each of the pixel areas, and wherein a transistor connected to one of the two pixel electrodes adjacent in the row direction is connected to one of the two scan signal lines, and a transistor connected to the other of the two pixel electrodes is connected to the other of the two scan signal lines.

34. The active matrix substrate according to claim 1, wherein when applied to a liquid crystal display device, subpixels including the first pixel electrode become bright subpixels, and subpixels including the second pixel electrode become dark subpixels.

35. The active matrix substrate according to claim 34, wherein the storage capacitance wiring includes an extended storage capacitance wiring branching off therefrom, and
wherein when viewed planarly, the extended storage capacitance wiring is provided so as to overlap a portion of an edge of the second pixel electrode or to extend along an outer side thereof.

36. The active matrix substrate according to claim 35, wherein the extended storage capacitance wiring is formed by:
a first extension formed in a same layer as the storage capacitance wiring; and
a second extension connected to the first extension via a contact hole and also to an lead-out wiring led out from one conductive electrode of the second transistor.

37. A liquid crystal display device comprising:
the active matrix substrate according to claim 1,
wherein the second scan signal line is selected at least once during display.

38. The liquid crystal display device according to claim 37, wherein a common electrode potential has been supplied to the storage capacitance wiring when the second transistor is turned off.

39. The liquid crystal display device according to claim 38, wherein the first transistor remains on when the second transistor is turned off, or the first transistor is turned off at the same time when the second transistor is turned off.

40. The liquid crystal display device according to claim 37, wherein potentials of the first pixel electrode and the second pixel electrode become substantially a common electrode potential when the second transistor is turned off.

41. The liquid crystal display device according to claim 37, wherein a first gate-on pulse signal supplied to the first scan signal line and a second gate-on pulse signal supplied to the second scan signal line become active during a same horizontal scanning period, and
wherein the second gate-on pulse signal has a pulse width shorter than that of the first gate-on pulse signal, and the second gate-on pulse signal becomes inactive before the first gate-on pulse signal becomes inactive.

42. The liquid crystal display device according to claim 37, wherein a first gate-on pulse signal supplied to the first scan signal line and a second gate-on pulse signal supplied to the second scan signal line become active during a horizontal scanning period immediately prior to a period during which a signal potential of a data signal to be displayed is supplied to the first pixel electrode, and
wherein the second gate-on pulse signal becomes inactive while the first gate-on pulse signal is active.

43. The liquid crystal display device according to claim 37, wherein a second gate-on pulse signal supplied to the second scan signal line becomes active two or more horizontal scanning periods prior to a period during which a signal potential of a data signal to be displayed is supplied to the first pixel electrode, and
wherein the second gate-on pulse signal remains inactive while the first gate-on pulse signal supplied to the first scan signal line is active.

44. The liquid crystal display device according to claim 37, wherein a second gate-on pulse signal supplied to the second scan signal line becomes active two or more horizontal scanning periods prior to a period during which a signal potential of a data signal to be displayed is supplied to the first pixel electrode, and
wherein the second gate-on pulse remains inactive when a first gate-on pulse signal supplied to the first scan signal line becomes active.

45. The liquid crystal display device according to claim 37, wherein a common electrode potential is supplied at least twice in each frame to all pixel electrodes of one pixel area.

46. The liquid crystal display device according to claim 45, wherein the common electrode potential is supplied at least twice in each frame to all pixel electrodes of one pixel area after two-thirds of a frame period has passed after a signal potential of a data signal to be displayed is supplied to the first pixel electrode.

47. The liquid crystal display device according to claim 37, wherein a polarity of a signal potential of a data signal supplied to each data signal line is reversed every horizontal scanning period,
wherein when the polarity of the signal potential of the data signal is reversed, a supply of a data signal to each data signal line is terminated for a predetermined period, and each data signal line is short-circuited to each other, and
wherein the first transistor and the second transistor remain on during the predetermined period.

48. The liquid crystal display device according to claim 37, further comprising:
a scan signal line drive circuit driving each scan signal line,
wherein a first gate-on pulse signal and a second gate-on pulse supplied to the first scan signal line and the second scan signal line, respectively, are generated using an output from a same stage of a single shift register included in the scan signal line drive circuit.

49. The liquid crystal display device according to claim 48, wherein the scan signal line drive circuit comprises the shift register, a plurality of logic circuits arranged in the column direction, and an output circuit, and
wherein pulse widths of the first gate-on pulse signal and the second gate-on pulse signal that are outputted from the output circuit are determined based on an output of the shift register and an output control signal controlling an output of the scan signal line drive circuit, both of which are inputted to the logic circuit.

50. The liquid crystal display device according to claim 37, wherein a polarity of a signal potential supplied to the first pixel electrode is reversed every frame.

51. The liquid crystal display device according to claim 37, wherein a polarity of a signal potential supplied to a first data signal line is reversed every horizontal scanning period.

52. The liquid crystal display device according to claim 37, wherein during a single horizontal scanning period, signal potentials having reversed polarities are supplied, respectively, to a first data signal line and to a data signal line adjacent thereto.

53. A television receiver comprising:
the liquid crystal display device according to claim 37; and
a tuner for receiving television broadcasting.

54. A liquid crystal panel comprising:
the active matrix substrate according to claim 1.

55. A liquid crystal display unit comprising:
the liquid crystal panel according to claim 54; and
a driver.

56. A liquid crystal display device comprising:
the liquid crystal display unit according to claim 55; and
a light source device.

* * * * *